(12) United States Patent
Fujii et al.

(10) Patent No.: US 7,537,748 B2
(45) Date of Patent: May 26, 2009

(54) HYDROGEN STORAGE MATTER AND MANUFACTURING METHOD AND APPARATUS FOR THE SAME

(75) Inventors: Hironobu Fujii, Hiroshima (JP); Takayuki Ichikawa, Hiroshima (JP); Haiyan Leng, Hiroshima (JP); Shigehito Isobe, Hiroshima (JP); Nobuko Hanada, Hiroshima (JP); Toyoyuki Kubokawa, Chiba (JP); Kazuhiko Tokoyoda, Chiba (JP); Keisuke Okamoto, Chiba (JP); Shinkichi Tanabe, Chiba (JP); Shigeru Matsuura, Chiba (JP); Kenji Ogawa, Chiba (JP)

(73) Assignees: National University Corporation, Hiroshima University, Hiroshima (JP); Taiheiyo Cement Corporation, Tokyo (JP)

(*) Notice: Subject to any disclaimer, the term of this patent is extended or adjusted under 35 U.S.C. 154(b) by 390 days.

(21) Appl. No.: 11/351,244

(22) Filed: Feb. 9, 2006

(65) Prior Publication Data

US 2006/0127304 A1 Jun. 15, 2006

Related U.S. Application Data

(63) Continuation of application No. PCT/JP2004/009538, filed on Jul. 5, 2004.

(30) Foreign Application Priority Data

| Aug. 11, 2003 | (JP) | ............................. 2003-291672 |
| Oct. 23, 2003 | (JP) | ............................. 2003-362943 |
| Feb. 13, 2004 | (JP) | ............................. 2004-036967 |
| Mar. 24, 2004 | (JP) | ............................. 2004-086925 |
| Mar. 31, 2004 | (JP) | ............................. 2004-101759 |
| Mar. 31, 2004 | (JP) | ............................. 2004-101948 |
| May 14, 2004 | (JP) | ............................. 2004-144850 |
| Jun. 24, 2004 | (JP) | ............................. 2004-186449 |
| Jun. 24, 2004 | (JP) | ............................. 2004-186450 |

(51) Int. Cl.
*B01J 20/04* (2006.01)
*B01J 20/30* (2006.01)

(52) U.S. Cl. .................. 423/413; 423/646; 423/647; 423/658.2

(58) Field of Classification Search ............... 423/248, 423/648.1, 413, 645–647, 658.1; 96/108; 206/0.7; 502/526; 420/900; 429/19, 218.2
See application file for complete search history.

(56) References Cited

U.S. PATENT DOCUMENTS

| 6,106,801 A | 8/2000 | Bogdanovic et al. |
| 6,946,112 B2* | 9/2005 | Chen et al. .................. 423/645 |
| 6,967,012 B2* | 11/2005 | Meisner et al. ............. 423/413 |

(Continued)

FOREIGN PATENT DOCUMENTS

JP 59-047599 A 3/1984

(Continued)

*Primary Examiner*—Frank M Lawrence
(74) *Attorney, Agent, or Firm*—Frishauf, Holtz, Goodman & Chick, P.C.

(57) ABSTRACT

A hydrogen storage matter contains at least a nano-structured and organized lithium imide compound precursor complex. In the hydrogen stroge matter, the lithium imide compound precursor complex has been nano-structured and organized by mixing fine powder lithium amide with fine powder lithium hydride at a predetermined ratio to prepare a mixture as a starting material, and then processing the mixture by a predetermined complex formation processing method.

22 Claims, 23 Drawing Sheets

U.S. PATENT DOCUMENTS

| | | | |
|---|---|---|---|
| 7,029,649 B2 * | 4/2006 | Meisner et al. | 423/658.2 |
| 7,341,703 B2 * | 3/2008 | Pinkerton et al. | 423/413 |
| 2001/0051130 A1 | 12/2001 | Jensen et al. | |
| 2003/0013605 A1 | 1/2003 | Klassen et al. | |
| 2005/0191236 A1 * | 9/2005 | Pinkerton et al. | 423/658.2 |
| 2005/0271581 A1 * | 12/2005 | Meyer et al. | 423/658.2 |

FOREIGN PATENT DOCUMENTS

| | | |
|---|---|---|
| JP | 62-108702 A | 5/1987 |
| JP | 2000-120996 A | 4/2000 |
| JP | 2001-302224 A | 10/2001 |
| JP | 2002-122294 A | 4/2002 |
| JP | 2002-221297 A | 8/2002 |
| JP | 2002-340430 A | 11/2002 |
| JP | 2003-230832 A | 8/2003 |

* cited by examiner

HYDROGEN STORAGE MATTER AND MANUFACTURING METHOD AND APPARATUS FOR THE SAME

This application is a continuation application of International Application PCT/JP2004/009538 filed Jul. 5, 2004.

BACKGROUND OF THE INVENTION

1. Field of the Invention

The present invention relates to a hydrogen storage matter for efficiently storing hydrogen used as a source material in fuel cells and a manufacturing method and manufacturing apparatus for the same; a hydrogen generating method; a hydrogen storage matter precursor used for a hydrogen storage matter and a manufacturing method for the same; a hydrogen storage matter packing container for packing a hydrogen storage matter therein and a movable body equipped with the same; and a gas refining apparatus used for hydrogen charge and discharge to and from a hydrogen storage matter.

2. Description of the Related Art

Fuel cells have been actively developed and some of them are already in practical use, as a clean energy source which does not emit a harmful substance, such as $NO_X$ or $SO_X$, or a greenhouse effect gas, such as $CO_2$. One of the important techniques to back up the fuel cell technology is a technique for storing hydrogen used as a source material in fuel cells. Various techniques for storing hydrogen have also been proposed, such as compression storage utilizing high-pressure cylinders and cooling storage utilizing liquid hydrogen.

However, in the case of hydrogen storage utilizing high-pressure cylinders, the hydrogen pressure is required to be higher to increase the hydrogen storage amount. In this case, the containers need to have a large weight, and the valves and so forth may cause problems in withstand pressure and reliability. On the other hand, as one of the methods for storing hydrogen as liquid, insulated containers are used for storing liquid hydrogen. In this case, since liquid hydrogen has a very low boiling point, it is necessary to use a large energy to liquefy hydrogen. Further, it is said that, when liquid hydrogen is supplied into insulated containers, hydrogen vaporizes and causes a loss of 10 to 20% in general, and a loss of 8% even with thermal insulation, which is economically unfavorable.

In order to solve the problems described above, attention is focused on a hydrogen storage technique utilizing hydrogen storage substances, which is advantageous in dispersion storage and transportation. As disclosed in R&D News Kansai 2002.7, pages 38-40, known as hydrogen storage substances are metal materials of, e.g., the rare earth family, titanium family, vanadium family, and magnesium family; light-weight element inorganic compound family materials, such as alanates (e.g., $NaAlH_4$), utilizing a reversible disproportionation reaction; and carbon family materials, such as carbon nanotubes, activated charcoal. Of them, the light-weight element inorganic compound family materials and carbon family materials are promising as light-weight materials, wherein they are powder type materials.

In consideration of this, it is desired to develop an efficient storage technique utilizing such powder type light-weight materials: specifically, to develop a hydrogen storage matter with a high hydrogen storage rate per unit weight; a hydrogen storage matter with a high hydrogen storage rate per unit volume; a hydrogen storage matter showing hydrogen absorption and release performance within a low temperature range; and a hydrogen storage matter with good durability.

Further, it is necessary to provide designs suitable for respective hydrogen storage matters, concerning a mass production method and apparatus for manufacturing a powder type hydrogen storage matter; a method for efficiently preserving a hydrogen storage matter (specifically, a packing method to a predetermined container); a method of easily discharging hydrogen from a hydrogen storage matter packed in a predetermined container or the like; a method of efficiently charging hydrogen into a hydrogen storage matter precursor, which is a state of a hydrogen storage matter after hydrogen is discharged (or before hydrogen is charged); and a method of supplying a fuel cell with a fuel gas containing, as the main component, hydrogen discharged from a hydrogen storage matter.

Accordingly, at first, conventional powder type hydrogen storage matters will be discussed from the aspect of materials. As light-weight hydrogen storage matters, alanate family materials, such as $NaAlH_4$ and $LiAlH_4$, are well known and studied. Further, a hydrogen storage method using lithium nitride expressed by the following formula (1) is reported by Ruff, O. and Goerges, H., Berichte der Deutschen Chemischen Gesellschaft zu Berlin, Vol. 44, 502-6 (1911). Recently, the hydrogen storage method using lithium nitride expressed by the following formula (1) was restudied, as reported by Ping Chen et al., Interaction of hydrogen with metal nitrides and imides, NATURE Vol. 420, 21 Nov. 2002, pages 302-304.

$$Li_3N+2H_2 \Leftrightarrow Li_2NH+LiH+H_2 \Leftrightarrow LiNH_2+2LiH \quad (1)$$

As reported by these documents, where lithium nitride ($Li_3N$) is used, it has been confirmed that hydrogen starts being absorbed from about 100° C., and hydrogen absorption reaches 9.3 mass % at 255° C. for 30 minutes. As regards the release characteristic of absorbed hydrogen, where heating is performed slowly at a low temperature-up rate, absorbed hydrogen changes through two level steps, such that it becomes 6.3 mass % at a temperature slightly lower than 200° C., and 3 mass % at a temperature of 320° C. or more.

In other words, this means that the reaction between lithium amide ($LiNH_2$) and lithium hydride ($LiH$) starts at a temperature slightly lower than 200° C. This reaction is shown by the following formula (2) that corresponds to the right side of the formula (1). Further, the reaction between lithium imide ($Li_2NH$) and LiH starts at a temperature of 320° C. or more. This reaction is shown by the following formula (3) that corresponds to the left side of the formula (1).

$$LiNH_2+2LiH \rightarrow Li_2NH+LiH+H_2\uparrow \quad (2)$$

$$Li_2NH+LiH \rightarrow Li_3N+H_2\uparrow \quad (3)$$

FIG. 1 is a view showing gas emission spectrum characteristic lines of desorption gas from an $Li_3N$ sample heated after it was charged with hydrogen at a hydrogen pressure of 3 MPa and 200° C. by the same method as disclosed in the documents described above. The sample was heated at a temperature-up rate of 5° C./minute. In FIG. 1, a characteristic line A denotes a hydrogen emission spectrum line, and a characteristic line B denotes an ammonia gas ($NH_3(g)$) emission spectrum line. As shown in FIG. 1, the hydrogen release characteristic obtained by the conventional method rendered a wide temperature range of 200 to 400 ° C., and had a large peak on the high temperature side (near 320° C.).

The technique disclosed in the documents described above is an effective hydrogen storage method using lithium nitride, which is a light-weight metal compound. However, the effective hydrogen storage rate thereof is small within a low temperature range of around 200° C., and thus it is necessary to perform heating within a high temperature range of 320° C. or more in order to realize hydrogen charge and discharge with a high volume. Further, according to the technique disclosed in the documents described above, the temperature-up rate is set smaller as the temperature is closer to the hydrogen absorption and release peak temperatures. Consequently, the heating takes long time and thereby makes it difficult to obtain a high response, which is not practical.

Next, conventional techniques will be discussed in relation to a manufacturing method and manufacturing apparatus for a powder type hydrogen storage matter. For example, the present inventors have disclosed, in Jpn. Pat. Appln. KOKAI Publication No. 2001-302224, that nano-structured graphite can be formed by a mechanical crushing process within a hydrogen atmosphere. Because such fine crushing requires high energy, Jpn. Pat. Appln. KOKAI Publication No. 2001-302224 discloses use of a planetary ball mill that can perform mechanical crushing with high energy. This crushing method is applicable to lithium family materials, such as lithium nitride described above, and alanate family materials.

However, while the planetary ball mill can give high energy to a process object to be crushed, there is a limit of increase in size because it is of the gravity type, which is not suitable for mass production. Further, since the crushing process performed by the planetary ball mill is dry crushing, a problem arises such that, when the crushing proceeds and the process object is turned into fine particles, the particles are easily agglomerated and thereby hindering progress of crushing. Furthermore, when the hydrogen storage matter formed by the crushing process is transferred to another container, a hydrogen storage matter of a certain type requires this transfer to be performed in an inactive atmosphere to prevent contact with air or the like. In this case, it is not easy to handle the hydrogen storage matter formed by the crushing process.

If a hydrogen storage matter precursor is formed by a method other than a method using mechanical crushing to form a hydrogen storage matter, there is a chance of increasing the hydrogen storage rate. Accordingly, it is strongly demanded to develop a hydrogen storage matter precursor and a manufacturing method for the same, which can increase the hydrogen storage rate.

Next, conventional techniques will be discussed in relation to a method of preserving a hydrogen storage matter. In general, research and development have been made for hydrogen storage tanks that can store a large amount of hydrogen by a small volume, in place of hydrogen cylinders. Hydrogen storage alloys have been developed as hydrogen storage matters to be contained in hydrogen storage tanks of this kind. Hydrogen storage tanks using a hydrogen storage alloy are disclosed in Jpn. Pat. Appln. KOKAI Publication No. 2000-120996, No. 2002-122294, No. 2002-221297, and No. 2002-340430.

However, hydrogen storage alloys show a low hydrogen storage rate per unit weight, and thus hydrogen storage tanks using a hydrogen storage alloy are not yet in practical use. On the other hand, light-weight powder type hydrogen storage matters, such as alanate family materials, carbon family materials, and lithium family materials, e.g., lithium nitride, show powder characteristics and hydrogen absorption and release characteristics different from those of conventional storage alloys. Accordingly, unless a packing container for packing such a material has a structure suitable for its characteristics, it is difficult to achieve a sufficient hydrogen storage amount per unit volume. However, packing containers for a light-weight powder type hydrogen storage matter of this kind have not yet been well developed.

Next, conventional techniques will be discussed in relation to supply of a fuel gas to a fuel cell. In the case of compression storage utilizing high-pressure cylinders and cooling storage utilizing liquid hydrogen, both conventionally used, there is a common problem such that, during hydrogen charge or discharge being handled, moisture mixes therein along with air, and may cause poisoning of a fuel cell when the moisture enters the fuel cell. In order to solve this problem, Jpn. Pat. Appln. KOKAI Publication No. 59-47599 discloses use of a removing agent, which is formed of an absorbent mixture of a metal hydride and a molecular sieve.

However, in the case of the lithium family material shown in the formula (1), when it is heated, $NH_3(g)$ may be generated along with hydrogen by decomposition or the like of $LiNH_2$. If the hydrogen containing $NH_3(g)$ enters a fuel cell, it causes a problem about poisoning of the fuel cell. However, there is no refining apparatus proposed so far to remove impurities from such hydrogen containing $NH_3(g)$.

BRIEF SUMMARY OF THE INVENTION

The present invention was made in light of the problems described above. A first object of the present invention is to provide a hydrogen storage matter operable at a low temperature with high efficiency, and a manufacturing method for the same, and a hydrogen generating method. A second object of the present invention is to provide a manufacturing apparatus and manufacturing method for a hydrogen storage matter, which can perform mechanical crushing at a mass production level to form a powder type hydrogen storage matter with high hydrogen storage ability, and allow the hydrogen storage matter formed by the crushing process to be easily handled. A third object of the present invention is to provide a hydrogen storage matter precursor which can improve characteristics of a hydrogen storage matter, and a manufacturing method for the same. A fourth object of the present invention is to provide a hydrogen storage matter packing container, which can allow packing of a hydrogen storage matter to efficiently perform hydrogen charge and discharge, and increase the hydrogen storage rate per unit weight or per unit volume, and a movable body equipped with the same, and further to provide a gas refining apparatus which can supply high-purity hydrogen, thereby prolonging the service life of a fuel cell and a hydrogen storage matter.

According to a first aspect of the present invention, there is provided a hydrogen storage matter containing at least a nano-structured and organized lithium imide compound precursor complex, wherein the lithium imide compound precursor complex has been nano-structured and organized by mixing fine powder lithium amide with fine powder lithium hydride at a predetermined ratio to prepare a mixture as a starting material, and then processing the mixture by a predetermined complex formation processing method.

According to a second aspect of the present invention, there is provided a manufacturing method for a hydrogen storage matter, the method comprising the steps of: preparing a mixture by mixing fine powder lithium amide with fine powder lithium hydride at a predetermined ratio; and then processing the mixture by a predetermined complex formation processing method to form a nano-structured and organized lithium imide compound precursor complex.

In the first and second aspects of the present invention, "nano-structured and organized" means that the mixed particles in a sample are miniaturized to a nanometer size (for example, an average particle diameter of 10 to 100 nm), and form complexes of a nanometer level to have a desired structure and shape.

Further, in the first and second aspects of the present invention, the complex formation processing method may comprise a method of utilizing a mechanical milling process (which will be referred to as "MeM process" hereinafter) to crush and mix a sample by hard balls, or a method of utilizing a jet mill to crush and mix a sample by pressurized gas blasting.

In the present invention, the complex formation processing method most preferably comprises an MeM process. This is so, because the MeM process allows the starting material mixture to be sufficiently nano-structured and organized, as described later. Specifically, the MeM process is a processing method that comprises the steps of introducing a sample along with a crushing medium into an airtight container, and performing rotation or mechanical milling to crush, press, and knead the sample, so as to form a material having physical properties different from those of the starting material. More specifically, the MeM process is a process comprising the steps of: introducing a mixture powder sample containing a plurality of components into an airtight container together with steel balls used as a crushing medium; setting the atmosphere inside the container to be a reducing gas atmosphere or inactive gas atmosphere with a pressure not lower than atmospheric pressure; and causing on-axis rotation and revolution of the container, thereby kneading up the sample to turn it into a complex of a nanometer size. During this MeM process, the crushing medium repeats microscopic collisions with the starting material mixture and applies impulsive and compressive force thereto, so that plastic deformation (forging deformation), work hardening, crushing, chipping, and final kneading are performed on the mixture.

In this specification, "knead" means that, where a mixture sample can easily cause plastic deformation, the mixture sample is processed by crushing, stretching, bending, folding, dividing while tangling, and tangling while dividing, so that it is nano-structured and organized.

According to the present invention, the starting material mixture of $LiNH_2$ and $LiH$ is subjected to an MeM process in a hydrogen atmosphere to from a nano-structured and organized lithium imide compound precursor complex. At this time, in accordance with a reaction shown in the following formula (4) due to heating up, hydrogen is generated and a nano-structured $Li_2NH$ is produced.

$$LiNH_2 + LiH \rightarrow Li_2NH + H_2 \uparrow \quad (4)$$

In the starting material, the ratio of LiH relative to $LiNH_2$ is preferably set to be larger than the stoichiometric reaction ratio (which means the reaction ratio shown in the formula (4)) to suppress generation of $NH_3(g)$ due to the reaction shown in the following formula (5). In this case, the excessive addition amount of LiH is preferably set to be not more than 20 mass % of the regular LiH reaction amount relative to $LiNH_2$ (which means the reaction amount shown in the formula (4)). In other words, the total amount of LiH is preferably set to be more than the regular LiH reaction amount relative to $LiNH_2$ (100 mass %) but not more that 120 mass % thereof. This is so, because the excessive addition amount of LiH for suppressing generation of $NH_3(g)$ is sufficient within this range, while, if it is increased beyond this range, the effective hydrogen storage rate is disadvantageously decreased. Accordingly, in the present invention, it is preferable that the upper limit of the excessive addition amount of LiH relative to $LiNH_2$ is set at 20 mass % of the regular LiH reaction amount.

$$2LiNH_2 \rightarrow Li_2NH + NH_3(g) \uparrow \quad (5)$$

Further, where one or more of metal simple substances selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of alloys or compounds thereof are added as a catalyst, the reaction shown in the formula (4) can be efficiently promoted. The catalyst addition amount is preferably set to be within a range of 0.5 to 5 mole %. If the catalyst addition amount is lower than 0.5 mole %, it is difficult to uniformly disperse it in the lithium imide compound precursor complex. On the other hand, if the catalyst addition amount is higher than 5 mole %, the effective hydrogen storage rate is decreased.

The catalyst is preferably mixed with $LiNH_2$ and $LiH$ when the lithium imide compound precursor complex is formed by an MeM process, so that it is nano-structured and organized by the MeM process. This is so, because, if catalyst particles are separately added to the sample after the complex formation process, it is difficult for the catalyst particles to enter the nano-structure organization of the lithium imide compound precursor complex.

The pressure used for the complex formation processing method is preferably set to be within a range of 0.1 to 10 MPa. If the process pressure is lower than atmospheric pressure (0.1 MP), hydrogen and nitrogen, which are effective components, may be carried away. On the other hand, the present inventors have developed an MeM processing apparatus, which has a functional limit at 10 MPa on the high pressure side, and thus a process pressure beyond this value is not practical.

After the starting material or powder mixture of $LiNH_2$ and LiH is subjected to an MeM process to form a lithium imide compound precursor complex (i.e. after the complex formation process), the lithium imide compound precursor complex may be heated to a temperature within a predetermined range, so that $LiNH_2$ and LiH thus nano-structured and organized react with each other to from $Li_2NH$, which is a reversible disproportionation reaction. In this case, the heating temperature for the reversible disproportionation reaction is preferably set at 250° C. or less, and more preferably at 200° C. or less. In this specification, "reversible disproportionation reaction" means that a reaction reversibly proceeds and causes decomposition to produce different components.

According to the first and second aspects of the present invention, it is possible to provide a hydrogen storage matter that uses a light-weight non-metal compound and is operable at a low temperature with high efficiency. Further, where the mixture material of $LiNH_2$ and LiH is subjected to the MeM process within an inactive gas atmosphere, such as nitrogen ($N_2$), helium (He), or argon (Ar), or a reactive gas atmosphere, such as hydrogen, to form a lithium imide compound precursor complex, and the temperature is increased to proceed with the reaction shown in the formula (4), $Li_2NH$ can be produced while hydrogen is being released.

Furthermore, where the ratio of LiH relative to $LiNH_2$ is set to be about 0 to 20% larger than the reaction ratio at the regular molar ratio 1:1, it is possible to suppress generation of $NH_3(g)$ due to the reaction shown in the formula (5).

Furthermore, where one or more of simple substances selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of alloys or compounds thereof are added as a catalyst prior to the MeM process, the reaction shown in the formula (4) can be efficiently promoted, so that the hydrogen storage is more efficiently performed than in the conventional technique. For example, the hydrogen storage rate per unit weight or unit volume is increased, and hydrogen absorption and release can be sharply performed within a low temperature range, so the durability thereof is improved. In addition, the hydrogen absorption efficiency can be improved, using a pressure condition within a wide range of about 0.1 to 10 MPa.

Such a hydrogen storage matter is suitably applicable to fuel cells using hydrogen and oxygen as fuels for power generation, and more specifically to power sources of, e.g., automobiles, power generators for household use, vending machines, mobile phones, cordless home electric appliances including laptop personal computers, and self-supported robotic micro-machines, which are present over a broad range of technical fields.

According to a third aspect of the present invention, there is provided a hydrogen storage matter containing a mixture, complex product, or reaction product of a metal hydride and a metal amide compound, which comprises at least two metal elements.

According to a foruth aspect of the present invention, there is provided a hydrogen storage matter containing a mixture, complex product, or reaction product of a metal hydride and a metal amide compound, which comprises lithium and magnesium as two metal elements.

According to the third and fourth aspects of the present invention, it is possible to provide a hydrogen storage matter that has a hydrogen generation temperature and a hydrogen release peak temperature both far lower than those of the conventional technique.

According to a fifth aspect of the present invention, there is provided a manufacturing method for a hydrogen storage matter containing a metal hydride and a metal amide compound to generate hydrogen by a reaction therebetween, the method comprising the steps of: causing a metal hydride and ammonia to react with each other to compose a metal amide compound; and mixing a metal hydride with the metal amide compound thus composed.

According to the fifth aspect of the present invention, it is possible to easily manufacture a high purity metal amide compound as a single body. For example, even where a metal composing the metal hydride differs from a metal composing metal amide compound, a hydrogen storage matter can be manufactured to have a high purity. Further, a mixture of different metal amide compounds can be also easily formed.

According to an sixth aspect of the present invention, there is provided a hydrogen storage matter formed by a predetermined mechanical crushing process to miniaturize a mixture, complex product, or reaction product of lithium hydride and lithium amide, wherein the hydrogen storage matter has a specific surface area of 15 $m^2/g$ or more determined by a BET method.

According to a seventh aspect of the present invention, there is provided a hydrogen storage matter formed by a predetermined mechanical crushing process to miniaturize a mixture, complex product, or reaction product of lithium hydride and magnesium amide, wherein the hydrogen storage matter has a specific surface area of 7.5 $m^2/g$ or more determined by a BET method.

According to a eighth aspect of the present invention, there is provided a hydrogen storage matter formed by a predetermined mechanical crushing process to miniaturize a mixture, complex product, or reaction product of magnesium hydride and lithium amide, wherein the hydrogen storage matter has a specific surface area of 7.5 $m^2/g$ or more determined by a BET method.

According to a nineth aspect of the present invention, there is provided a hydrogen storage matter formed by hydrogenating a mixture, complex product, or reaction product of magnesium nitride and lithium imide, wherein the hydrogen storage matter has a specific surface area of 5 $m^2/g$ or more determined by a BET method.

According to the fifth to nineth aspects of the present invention, it is possible to provide a hydrogen storage matter that has a hydrogen release temperature lower than the conventional technique. In this case, it is possible to decrease the energy necessary for heating the hydrogen storage matter to release hydrogen therefrom, and to relax restrictions on the material and structure of a container or the like to pack the hydrogen storage matter therein.

According to a tenth aspect of the present invention, there is provided a manufacturing apparatus for a hydrogen storage matter, the apparatus comprising: a cylindrical crushing container configured to crush a hydrogen storage matter source material therein; a hydrogen introducing portion configured to introduce hydrogen into the crushing container to maintain a hydrogen atmosphere inside the crushing container; a hydrogen storage matter source material introducing portion configured to introduce a hydrogen storage matter source material into the crushing container while maintaining a hydrogen atmosphere inside the crushing container; a hydrogen storage matter output portion configured to output a hydrogen storage matter from inside the crushing container; a plurality of crushing rollers disposed along an inner wall of the crushing container and each having a rotational axis with a longitudinal direction aligning with a longitudinal direction of the crushing container; and a drive mechanism configured to cause relative rotational movement between the crushing container and the plurality of crushing rollers and on-axis rotation of each of the plurality of crushing rollers, wherein the apparatus is arranged to introduce a hydrogen storage matter source material into the crushing container, in which a hydrogen atmosphere is formed, and mechanically crush the hydrogen storage matter source material by compressive force and shearing force between an inner wall of the crushing container and the crushing rollers, to manufacture a hydrogen storage matter.

According to a eleventh aspect of the present invention, there is provided a manufacturing apparatus for a hydrogen storage matter, the apparatus comprising: a crushing container including an inner cylinder and an outer cylinder coaxially disposed to define an annular crushing chamber therebetween; a hydrogen introducing portion configured to introduce hydrogen into the annular crushing chamber to maintain a hydrogen atmosphere inside the annular crushing chamber; a hydrogen storage matter source material introducing portion configured to introduce a hydrogen storage matter source material into the annular crushing chamber while maintaining a hydrogen atmosphere inside the annular crushing chamber; a hydrogen storage matter output portion configured to output a hydrogen storage matter from inside the annular crushing chamber; and a drive mechanism configured to cause relative rotational movement between the inner cylinder and the outer cylinder, wherein the apparatus is arranged to introduce a hydrogen storage matter source material and a crushing medium into the annular crushing chamber, in which a hydrogen atmosphere is formed, and mechanically crush the hydrogen storage matter source material by relative rotational shift between the inner cylinder and the outer cylinder, to manufacture a hydrogen storage matter.

According to a twelfth aspect of the present invention, there is provided a manufacturing apparatus for a hydrogen storage matter, the apparatus comprising: a rotatable cylindrical crushing container configured to crush a hydrogen storage matter source material therein; a hydrogen introducing portion configured to introduce hydrogen into the crushing container to maintain a hydrogen atmosphere inside the crushing container; a hydrogen storage matter source material introducing portion configured to introduce a hydrogen storage matter source material into the crushing container while maintaining a hydrogen atmosphere inside the crushing container; a hydrogen storage matter output portion configured to output a hydrogen storage matter from inside the crushing container; an impeller disposed inside the crushing container and having a rotational axis with a longitudinal direction aligning with a longitudinal direction of the crushing container; and a drive mechanism configured to rotate the crushing container and the impeller in opposite directions, wherein the apparatus is arranged to introduce a hydrogen storage matter source material and a crushing medium into the crushing container, in which a hydrogen atmosphere is formed, and mechanically crush the hydrogen storage matter source material by rotating the crushing container and the impeller in opposite directions, to manufacture a hydrogen storage matter.

According to a thirteenth aspect of the present invention, there is provided a manufacturing apparatus for a hydrogen storage matter, the apparatus comprising: a bottomed cylindrical crushing container configured to crush a hydrogen storage matter source material therein, and having a hydrogen storage matter output port at a lower portion of a sidewall to output a crushed hydrogen storage matter; a housing configured to accommodate the crushing container and maintain a predetermined gas atmosphere therein; one or more inner pieces each having a columnar curved surface and disposed to form a predetermined gap between the curved surface and a sidewall inner surface of the crushing container; a holder member holding the inner piece(s); and a container rotation mechanism configured to rotate the crushing container and/or the holder member such that width of the gap between the crushing container and the inner piece(s) is substantially unchanged, wherein the housing comprises a gas introducing portion to introduce hydrogen thereinto, a hydrogen storage matter source material introducing portion configured to introduce a hydrogen storage matter source material into the crushing container while maintaining a hydrogen atmosphere therein, a hydrogen storage matter output portion configured to output, from its inside to outside, a part of a hydrogen storage matter discharged from the crushing container through the hydrogen storage matter output port, and a hydrogen storage matter circulation portion configured to return into the crushing container a part of the hydrogen storage matter discharged from the crushing container through the hydrogen storage matter output port, and wherein the apparatus is arranged to introduce a hydrogen storage matter source material into the crushing container while forming a hydrogen atmosphere inside the housing, and mechanically crush the hydrogen storage matter source material by compressive force and shearing force between a sidewall of the crushing container and the inner piece(s), to manufacture a hydrogen storage matter.

According to the tenth to thirteenth aspects of the present invention, a hydrogen storage function material that shows a hydrogen storage function can be crushed with high energy by fine particle formation using mechanical crushing within a hydrogen atmosphere, so a hydrogen storage matter with high hydrogen storage ability can be formed. In addition, because of its crushing mechanism, there are no such restrictions on the crushing amount that are caused in planetary ball mills, and thus it is possible to sufficiently meet mass production by industrialization. Further, where a hydrogen storage matter is manufactured from a hydrogen storage function material that shows a hydrogen storage function, by fine particle formation using mechanical crushing within a hydrogen atmosphere, a metal component having the function of dissociating hydrogen molecules to hydrogen atoms may be added in the middle of mechanically crushing the hydrogen storage function material. In this case, the metal component is loaded in a highly dispersed state, while it is not thickly covered with the hydrogen storage function material, so that high hydrogen storage ability can be obtained by the agency of the metal component.

According to a fourteenth aspect of the present invention, there is provided a hydrogen storage matter precursor including a metal imide compound which is changed by a reaction with hydrogen to a hydrogen storage matter containing a metal hydride and a metal amide compound together, wherein the metal imide compound has been composed without utilizing a reaction between the metal hydride and the metal amide compound.

According to a fifteenth aspect of the present invention, there is provided a hydrogen storage matter precursor which is reversibly changed by a reaction with hydrogen to a hydrogen storage matter capable of releasing hydrogen, wherein the hydrogen storage matter precursor includes a metal imide compound produced by thermal decomposition of a metal amide compound.

According to the fourteenth and fifteenth aspects of the present invention, it is possible to form a hydrogen storage matter with a high hydrogen release rate from a hydrogen storage matter precursor thus obtained. Further, it is possible to form a hydrogen storage matter with a low hydrogen release start temperature.

According to a sixteenth aspect of the present invention, there is provided a hydrogen storage matter packing container for packing a solid hydrogen storage matter, which contains a hydrogen storage material having a hydrogen absorption or release function to be activated at a temperature of 80° C. or more, and a catalyst to enhance the hydrogen absorption or release function of the hydrogen storage material, wherein the hydrogen storage matter packing container comprises: a container body for enclosing the hydrogen storage matter; a flow path forming member configured to form a hydrogen flow path inside the container body and communicate with an outside portion; and heating means for heating the hydrogen storage matter at a temperature of 80° C. or more.

According to the sixteenth aspect of the present invention, when the hydrogen storage matter is heated by the heating means, the hydrogen absorption or release function of the hydrogen storage matter is activated, so hydrogen can be swiftly charged or discharged. Consequently, it is possible to provide a hydrogen storage matter packing container particularly optimum to lithium family materials. Further, as compared to hydrogen storage alloys or the like, lithium family materials have a larger hydrogen storage rate per unit weight, and thus the packing container can have a larger hydrogen storage rate per unit mass. As a result, the hydrogen storage matter packing container can be utilized for a hydrogen supply apparatus disposed in fuel cell type automobiles and so forth, a buffer tank for stationary fuel cells, and a storing container system of hydrogen stations, and further can be generally applied to hydrogen storage apparatuses used in a hydrogen energy society expected to come in future.

Further, the hydrogen storage matter packing container according to the sixteenth aspect can efficiently heat the hydrogen storage matter, and thus can perform hydrogen charge and discharge in a short time. Furthermore, where the surface area of a gas distribution tube is increased, the hydrogen storage matter can more efficiently absorb or release hydrogen.

According to a seventeenth aspect of the present invention, there is provided a movable body equipped with a hydrogen storage matter packing container according to the thirty-fifth aspect.

With the movable body according to the thirty-sixth aspect, for example, it is possible to realize a light-weight fuel cell type automobile or hydrogen engine automobile, which can drive over a long distance only with one supply.

According to a seventeenth aspect of the present invention, there is provided a gas refining apparatus in which a flow path for a gas is provided with a filter, wherein the gas comprises hydrogen containing ammonia and/or water vapor, or a mixture thereof with one or more gases selected from the group consisting of He, Ne, Ar, and $N_2$, and the filter contains an alkaline metal hydride and/or an alkaline earth metal hydride.

According to the eighteenth aspect of the present invention, ammonia and/or water poisonous to fuel cells can be removed with high efficiency to a remaining concentration of the order of PPM, from the gasses suitably used for fuel cells or the like.

DETAILED DESCRIPTION OF THE INVENTION

Embodiments of the present invention will now be described with reference to the accompanying drawings.

At first, an explanation will be given of a hydrogen storage matter that contains at least a nano-structured and organized lithium imide compound precursor complex. Since hydrogen storage ability of metal family compounds and non-metal family compounds relates to nanometer-scale organization structures, it is possible to fabricate a high-performance hydrogenated material by controlling nanometer-scale organization structures or making the material nano-organized and structured.

An MeM process is known as one of the methods for causing a powder type material to be nano-structured and organized. The MeM process is a method comprising the steps of introducing a source material along with hard balls called a crushing medium into an airtight container, and performing rotation or mechanical milling to crush, press, and knead the source material, so as to form a material having physical properties different from those of the starting material. An example of a sequence performed by the present inventors for fabricating a hydrogen storage substance will be described below, in which the substance is nano-organized and structured by an MeM process. As a matter of course, the specific method, conditions, and so forth of the MeM process are not limited to those shown below.

Attention was directed to hydrogen absorption and release reaction, which utilizes a reversible disproportionation reaction shown in the formula (4) mentioned previously (which is shown again below), starting from $LiNH_2$ and $LiH$.

$$LiNH_2 + LiH \rightarrow Li_2NH + H_2\uparrow \quad (4)$$

According to this reaction, it is possible to reversibly absorb and release hydrogen at a theoretical value of 6.5 mass %. At this time, the hydrogenation reaction has a standard enthalpy of $\Delta H=-44.5$ (kJ/mole $H_2$), and thus hydrogen absorption and release at a low temperature can be expected from a thermodynamic aspect as well.

COMPARATIVE EXAMPLE 1

In light of this, at first, commercially available $LiNH_2$ and $LiH$ were weighed at a ratio of 1:1 by molecule number ratio, and mixed by an agate mortar for several minutes to form a mixture (i.e., a sample according to the comparative example 1). The mixture thus obtained was heated at a temperature-up rate of 5° C./minute, and desorption gas due to this heating was analyzed in terms of the mass number.

Figure 1:
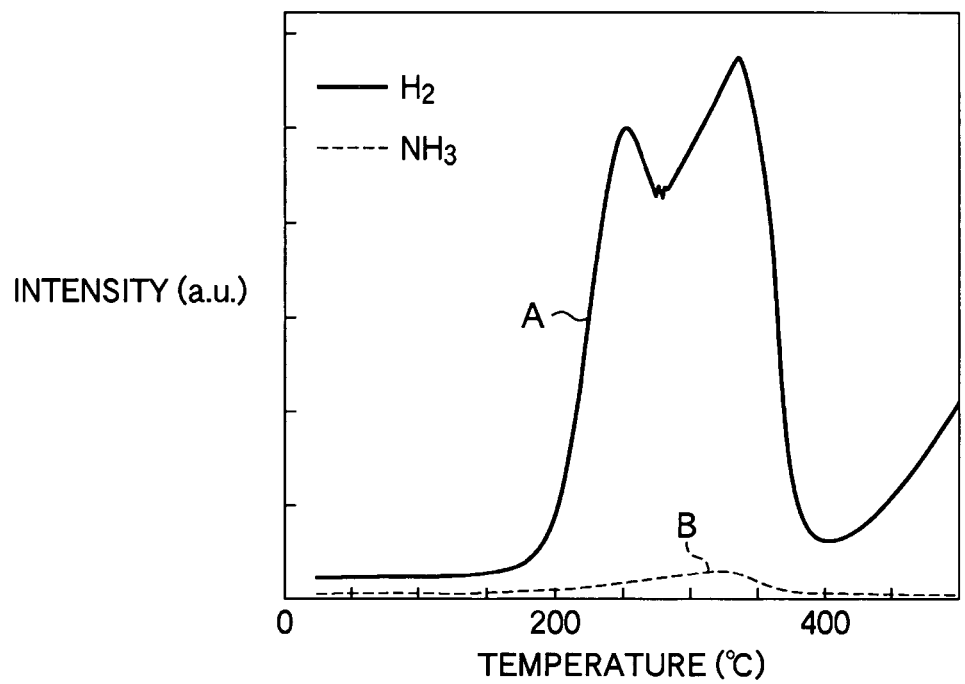
FIG. 1 is a view showing gas emission spectrum characteristic lines of desorption gas from a conventional hydrogen storage matter using lithium nitride ($Li_3N$) as a starting material.
Figure 2:
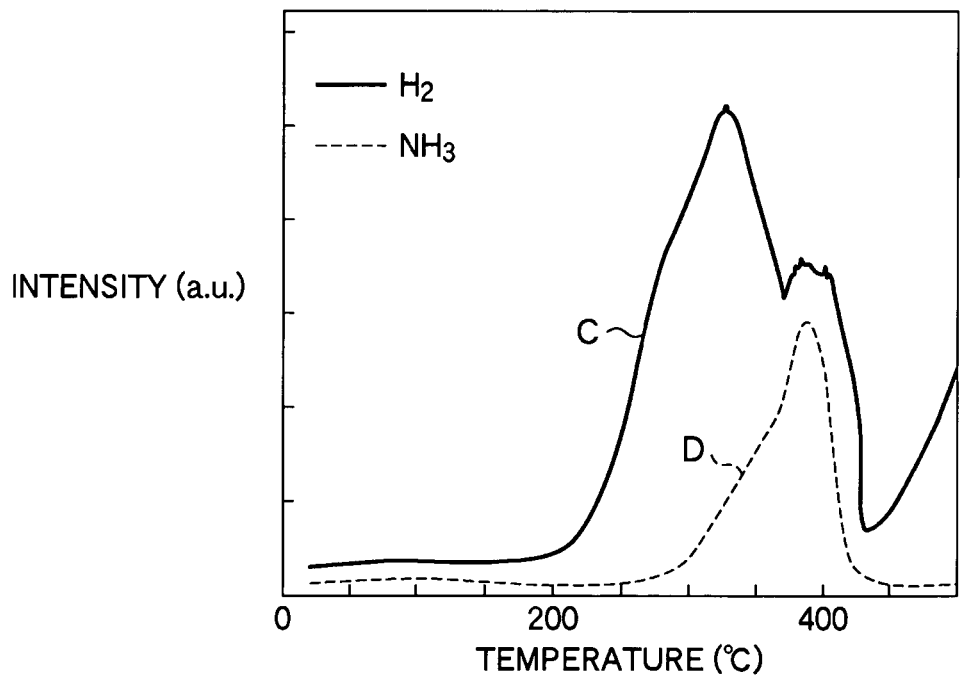
FIG. 2 is a view showing gas emission spectrum lines as a result of mass number analysis performed on desorption gas due to heating of a comparative example 1.

FIG. 2 is a view showing gas emission spectrum lines as a result of mass number analysis performed on desorption gas due to heating of the sample according to the comparative example 1. In FIG. 2, the horizontal axis indicates temperature (° C.), and the vertical axis indicates gas emission spectrum intensity (arbitrary unit) obtained by a mass number (MASS) analysis method performed on the desorption gas due to heating. Further, in FIG. 2, a characteristic line C denotes a hydrogen emission spectrum line, and a characteristic line D denotes an ammonia gas ($NH_3(g)$) emission spectrum line. As shown in FIG. 2, the sample according to the comparative example 1 rendered emission of a large amount of $NH_3(g)$ together with hydrogen release. It is thought that this was cased by a thermal decomposition reaction of $LiNH_2$ shown in the formula (5) mentioned previously (which is shown again below).

$$2LiNH_2 \rightarrow Li_2NH + NH_3(g)\uparrow \quad (5)$$

This result supports that, where $LiNH_2$ and $LiH$ are in microscopic contact with each other, a hydrogen release reaction is preferentially caused by $LiNH_2$ and $LiH$. However, where $LiNH_2$ and $LiH$ are not in microscopic contact with each other, progress of the decomposition reaction shown in the formula (5) takes place prior to progress of the reaction shown in the formula (4). Consequently, a thermal decomposition reaction of $LiNH_2$ alone proceeds, thereby emitting a large amount of $NH_3(g)$.

COMPARATIVE EXAMPLE 2

In light of this, in order to increase microscopic contact between $LiNH_2$ and $LiH$ and thereby suppress emission of $NH_3(g)$, $LiNH_2$ and $LiH$ were weighed at a ratio of 1:2 by molecule number ratio, and mixed by an agate mortar for several minutes to form a mixture (i.e. a sample according to the comparative example 2). The mixture thus obtained was heated in the same manner as in the comparative example 1, and desorption gas due to this heating was analyzed in terms of the mass number.

Figure 3:
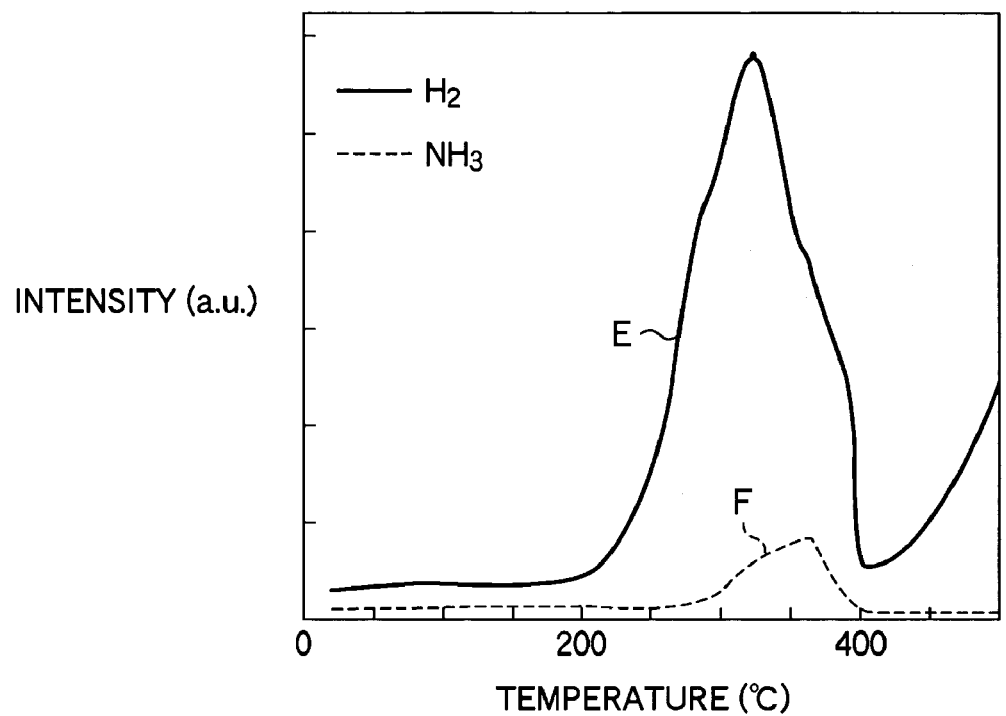
FIG. 3 is a view showing gas emission spectrum lines as a result of mass number analysis performed on desorption gas due to heating of a comparative example 2.

FIG. 3 is a view showing gas emission spectrum lines as a result of mass number analysis performed on desorption gas due to heating of the sample according to the comparative example 2. In FIG. 3, a characteristic line E denotes a hydrogen emission spectrum line, and a characteristic line F denotes an $NH_3(g)$ emission spectrum line. As shown in FIG. 3, the sample according to the comparative example 2 also rendered emission of $NH_3(g)$ together with hydrogen release, but the emission of $NH_3(g)$ was smaller than that of the comparative example 1. From this result, it has been found that, in the hydrogen storage system according to this reaction mechanism (reaction formula (4)), nano-scale structures serve as a parameter that greatly dominates hydrogen absorption and release characteristics.

PRESENT EXAMPLE 1

Accordingly, in the present example 1, in order to make microscopic contact repeated between $LiNH_2$ and $LiH$, $LiNH_2$ fine powder and $LiH$ fine powder were weighed at a ratio of 1:1 by molecule number ratio, and subjected to an MeM process for two hours. Each of the $LiNH_2$ fine powder and $LiH$ fine powder was a reagent having an average particle diameter of several-ten μm (20 to 40 μm).

Specifically, for the MeM process, a mixture powder sample of $LiNH_2$ and $LiH$ mixed at a ratio of 1:1, a small amount of catalyst (0.3 grams), and 20 steel balls (with a diameter of 7 mm) were introduced into a steel pot (with an inner volume of 30 cc), and the interior of the container was set to have an atmosphere of a reducing gas, such as hydrogen, or an inactive gas, such as argon (Ar). Then, the container was driven to cause on-axis rotation and revolution at a rotational speed of 400 rpm to knead up the sample, so as to obtain powder particles of several-micron size that form complexes of $LiNH_2$ and $LiH$ of nanometer size. At this time, a P7-planetary ball mill manufactured by Fritsch Co., Ltd., Germany was used as an MeM processing apparatus.

Next, the microscopic behavior of an MeM process will be explained with reference to FIGS. 4A to 4C. A mixture sample enclosed in an airtight container repeats collisions with hard steel balls (a crushing medium) and receives impulsive and compressive force, so that plastic deformation (forging deformation), work hardening, crushing, chipping, and final kneading are performed on the mixture sample. This kneading of the mixture sample proceeds in phases, as follows.

Figure 4A:
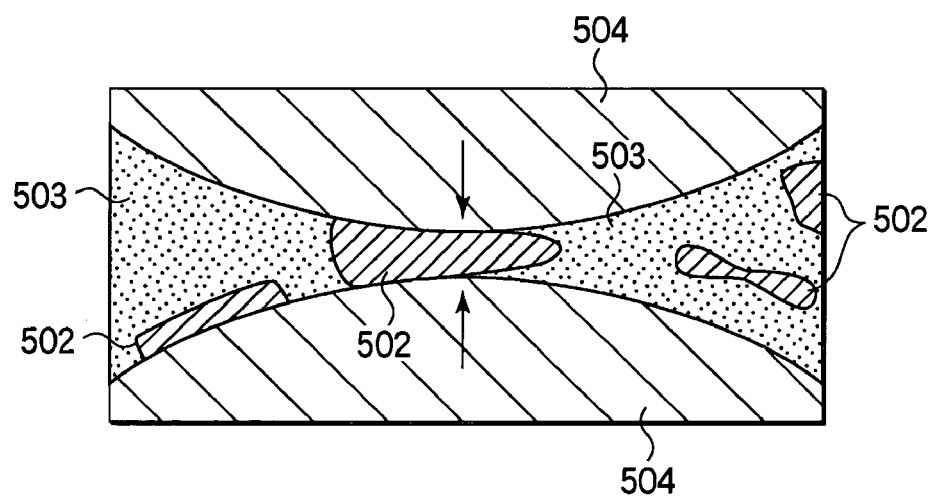
FIG. 4A is an enlarged sectional view schematically showing the initial phase of kneading by an MeM process.
Figure 4B:
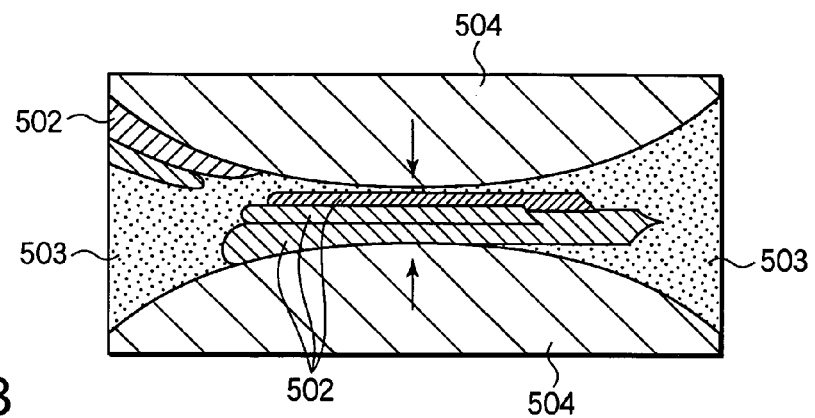
FIG. 4B is an enlarged sectional view schematically showing the middle phase of kneading by the MeM process.
Figure 4C:
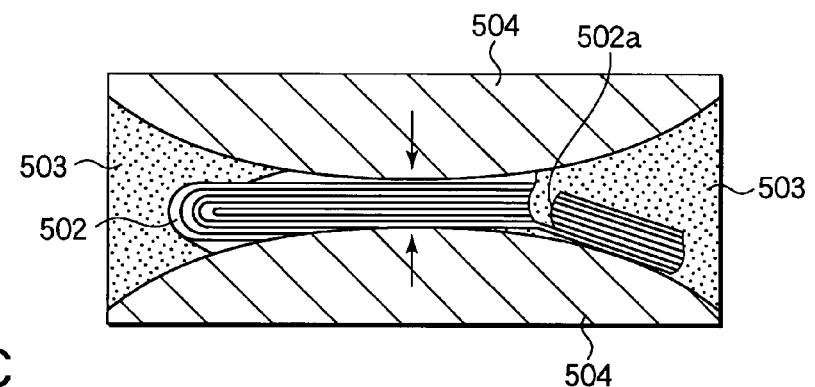
FIG. 4C is an enlarged sectional view schematically showing the later phase of kneading by the MeM process.

In the initial phase of the kneading, as shown in FIG. 4A, sample particles 502 within dispersion particles 503 are pinched and crushed between steel balls 504 while receiving impulsive and compressive force therefrom. In the middle phase of the kneading, as shown in FIG. 4B, the sample particles 502 are further crushed, stretched, chipped, and laminated. In the later phase of the kneading, as shown in FIG. 4C, laminated sample particles 502 are bent, folded, and ruptured, so ruptured faces 502a are provided, i.e., a so-called kneading effect can be observed. Consequently, mixture powder particles of several-micron order size are obtained in a nano-structured and organized state.

Figure 5:
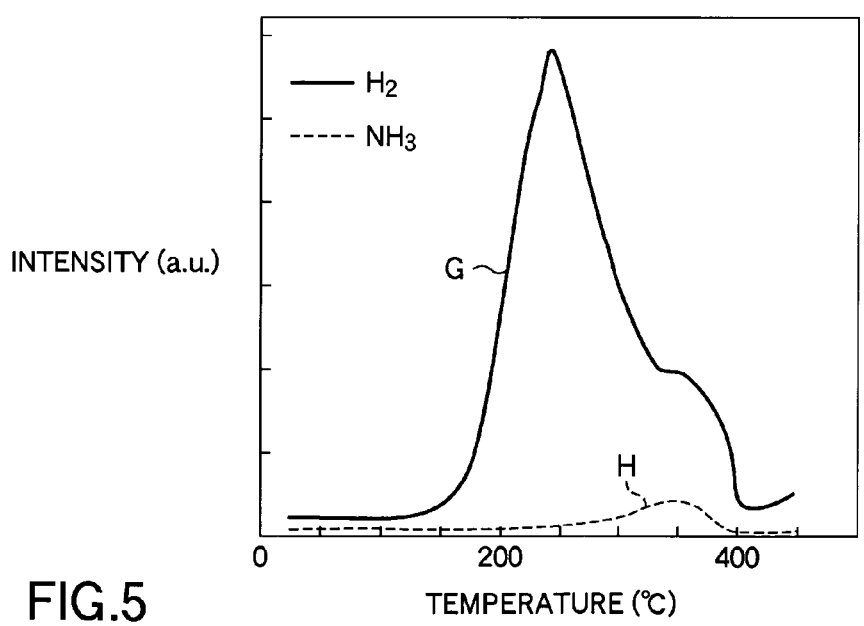
FIG. 5 is a view showing gas emission spectrum lines as a result of mass number analysis performed on desorption gas due to heating of a present example 1.

Using a mixture obtained by such an MeM process, desorption gas due to heating was analyzed in terms of the mass number, as in the comparative examples 1 and 2. FIG. 5 is a view showing gas emission spectrum lines as a result of mass number analysis performed on desorption gas due to heating of the sample according to the present example 1. In FIG. 5, a characteristic line G denotes a hydrogen emission spectrum line, and a characteristic line H denotes an $NH_3(g)$ emission spectrum line.

As shown in FIG. 5, the sample according to the present example 1 rendered emission of $NH_3(g)$ very lower than those of the comparative examples 1 and 2 using an agate mortar for mixing. Accordingly, it has been confirmed that an MeM process plays a very effective and important role for a hydrogen storage system utilizing the disproportionation reaction shown in the formula (4). However, emission of $NH_3(g)$ was still observed.

PRESENT EXAMPLE 2

Next, an explanation will be given of a manufacturing method for a hydrogen storage matter, to which metal particles are added as a catalyst. Use of an MeM process can also facilitate adding a catalyst for increasing the hydrogen absorption and release reaction rate. Ni particles were added, at 1 mole % relative to the number of moles of Li, to a mixture of $LiNH_2$ and LiH mixed at a molar ratio of 1:1, and the mixture was subjected to the same MeM process as in the present example 1 to form a sample. At this time, each of the $LiNH_2$ fine powder and LiH fine powder had an average particle diameter of several-ten μm. Further, the Ni particles were Ni nano-particles having an average particle diameter of 20 nm.

Figure 6:
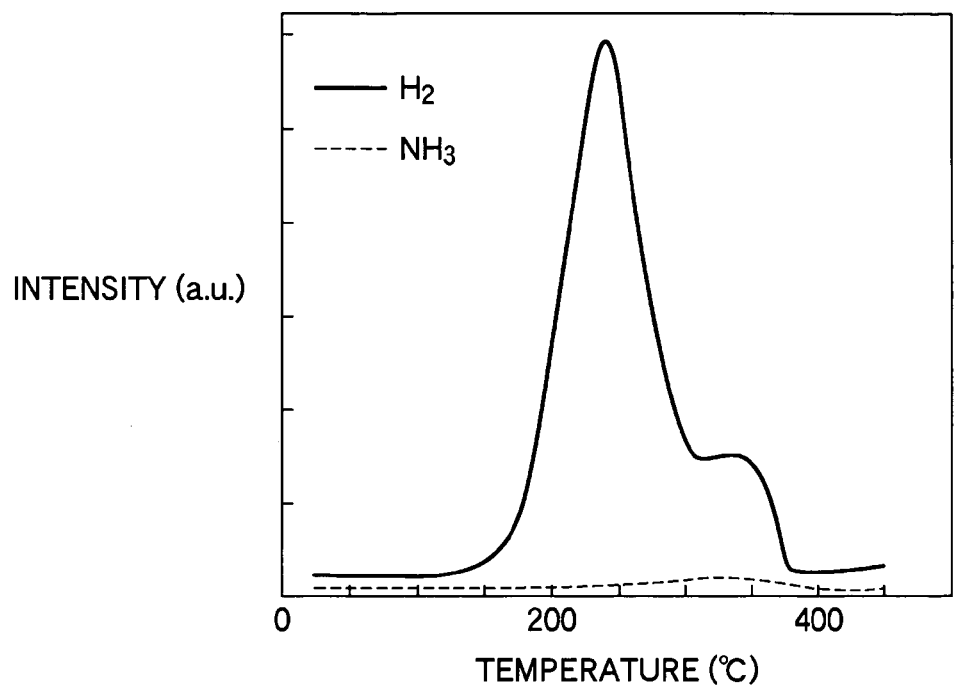
FIG. 6 is a view showing gas emission spectrum lines as a result of mass number analysis performed on desorption gas due to heating of a present example 2.

Using the sample thus obtained, desorption gas due to heating was analyzed in terms of the mass number, as in the comparative example 1 and so forth. FIG. 6 is a view showing gas emission spectrum lines as a result of mass number analysis performed on desorption gas due to heating of the sample according to the present example 2. In FIG. 6, a characteristic line shown by a solid line denotes a hydrogen emission spectrum line, and a characteristic line shown by a broken line denotes an $NH_3(g)$ emission spectrum line.

As evidenced by comparison of FIG. 6 with FIG. 5, the hydrogen emission spectrum became sharp due to addition of the catalyst. Further, the sample according to the present example 2, which was heated at a temperature-up rate of 5° C./minute, almost completed release of hydrogen between 150° C. and 300° C., but then rendered release of hydrogen along with emission of $NH_3(g)$ between 300° C. and 400° C. In this case, however, the peak height of the $NH_3(g)$ emission spectrum relative to the peak height of the hydrogen emission spectrum was lower, as compared to the present example 1. In other words, it was confirmed that the $NH_3(g)$ generation was suppressed.

PRESENT EXAMPLE 3

Next, an explanation will be given of a manufacturing method for a hydrogen storage matter, to which metal compound particles are added as a catalyst. Also in this example, use of an MeM process can facilitate adding a catalyst for increasing the hydrogen absorption and release reaction rate. Titanium trichloride ($TiCl_3$) particles (with an average particle diameter of 2 to 4 μm) were added, at 1 mole % relative to the number of moles of Li, to a mixture of $LiNH_2$ and LiH mixed at a molecule number ratio of 1:1, and the mixture was subjected to the same MeM process as in the present example 1 to form a sample.

Figure 7:
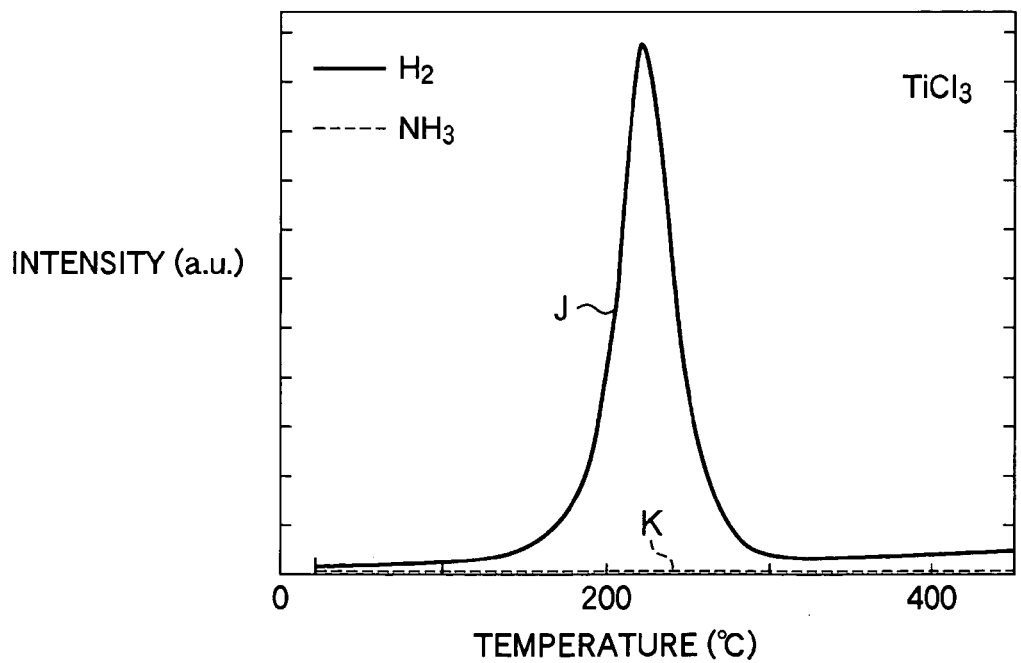
FIG. 7 is a view showing gas emission spectrum lines as a result of mass number analysis performed on desorption gas due to heating of a present example 3.

Using the sample thus obtained, desorption gas due to heating was analyzed in terms of the mass number, as in the comparative example 1 and so forth. FIG. 7 is a view showing gas emission spectrum lines as a result of mass number analysis performed on desorption gas due to heating of the sample according to the present example 3. In FIG. 7, a characteristic line J shown by a solid line denotes a hydrogen emission spectrum line, and a characteristic line K shown by a broken line denotes an $NH_3(g)$ emission spectrum line. As evidenced by comparison of FIG. 7 with FIG. 5, the hydrogen emission spectrum became sharp due to addition of the catalyst. Further, this sample, which was heated at a temperature-up rate of 5° C./minute, completed release of hydrogen between 150° C. and 300° C., and rendered no emission of $NH_3(g)$ during the measurement.

Where $TiCl_3$ is added, it is inferred that $TiCl_3$ is decomposed by heating of a hydrogen storage matter afterward, and Ti becomes present as metal titanium in a lithium imide compound precursor complex.

(Cycle Test and Assessment Result Thereof)

Next, an explanation will be given of the cycle characteristic of a lithium imide compound precursor complex, which contains $TiCl_3$ as a catalyst. $TiCl_3$ particles were added, at 1 mole % relative to the number of moles of Li, to a mixture of $LiNH_2$ and LiH mixed at a molecule number ratio of 1:1, and the mixture was subjected to the same MeM process as in the present example 1 to form a sample as a first cycle sample. Thereafter, the first cycle sample was degassed by vacuum at 220° C. for twelve hours, and then caused to react with hydrogen at 180° C. and a hydrogen pressure of 3 MPa for twelve hours, to form a sample as a second cycle sample. Thereafter, this sample was further subjected to the same process once again to form a sample as a third cycle sample.

Figure 8:
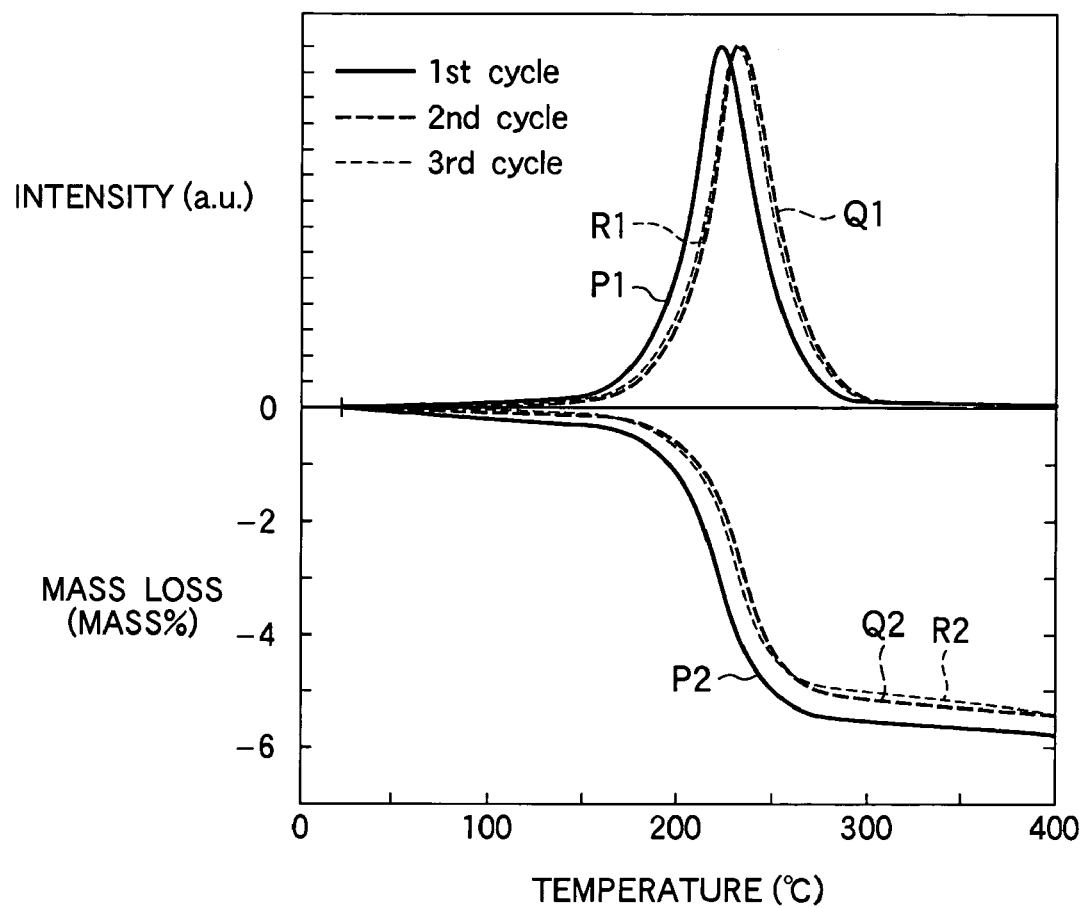
FIG. 8 is a view showing gas emission spectrum lines obtained when hydrogen release and hydrogen storage were repeated in a hydrogen storage matter according to the present invention, and also showing characteristic lines of change in mass decreasing amount due to heating.

FIG. 8 is a view showing gas emission spectrum lines as a result of desorption gas analysis in heating and mass loss lines as a result of thermogravimetry, concerning the three samples thus obtained. In FIG. 8, a characteristic line P1 denotes a gas emission spectrum line of the first cycle sample, a characteristic line Q1 denotes a gas emission spectrum line of the second cycle sample, and a characteristic line R1 denotes a gas emission spectrum line of the third cycle sample. Further, in FIG. 8, a characteristic line P2 denotes a mass loss line of the first cycle sample, a characteristic line Q2 denotes a mass loss line of the second cycle sample, and a characteristic line R2 denotes a mass loss line of the third cycle sample.

As shown in FIG. 8, as compared to the first cycle sample, the second and third cycle samples rendered some characteristic deterioration in relation to the hydrogen release temperature and hydrogen release amount. It is thought that this was so because impurities mixed in the additive (catalyst) or source material from the beginning were changed to stable substances irrelevant to hydrogen absorption and release by the first heating process. However, there was no large difference between the second cycle sample and third cycle sample, and thus the cycle characteristic should be very good. Further, where the desorption gas analysis was performed at a temperature-up rate of 1° C./minute, the peak position of the desorption line became lower to 200° C. or less. Accordingly, it has been confirmed that hydrogen absorption and release are possible at 200° C. or less.

All the hydrogen absorption experiments described above were performed at a pressure of about 3 MPa. However, as a matter of course, in order to improve the hydrogen absorption efficiency, this can be performed at a pressure within a wide range of about 1 to 10 MPa.

Such improvements of the hydrogen release characteristic (emission spectrum sharpening and release temperature decreasing) due to catalyst addition are not peculiar to Ni particles and $TiCl_3$ particles described above. A catalyst effect of the same kind can be also realized in other simple substances, alloys, or compounds containing at least one of elements, such as B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag. Present examples thereof will be described below.

PRESENT EXAMPLES 4 TO 24

The present example 4 was composed of LiH and $LiNH_2$, as in the present example 1, but employed a different test method. The present examples 5 to 24 were respectively composed of LiH and $LiNH_2$ with various catalysts added thereto, as in the present examples 2 and 3, but employed a different test method. As shown in the following Table 1, according to the present examples 5 to 21, LiH, $LiNH_2$, and respective one of various catalysts were mixed at a molar ratio of 1:1:0.01 and weighed within a high-purity Ar glove box to set the total amount at 1.3 g. Further, as show in Table 1, according to the present example 22, LiH, $LiNH_2$, chromium chloride ($CrCl_3$), and $TiCl_3$ were mixed at a molar ratio of 1:1:0.01:0.01 and weighed within a high-purity Ar glove box to set the total amount at 1.3 g. Furthermore, as show in Table 1, according to the present examples 23 and 24, LiH, $LiNH_2$, and a predetermined catalyst were mixed at a molar ratio of 1.2:1:0.01 and weighed within a high-purity Ar glove box to set the total amount at 1.3 g.

TABLE 1

| | Composition (molar ratio) | | | |
|---|---|---|---|---|
| | LiH | $LiNH_2$ | Catalyst | Catalyst type |
| Present example 4 | 1.00 | 1.00 | 0 | (None) |
| Present example 5 | 1.00 | 1.00 | 0.01 | $TiCl_3$ |
| Present example 6 | 1.00 | 1.00 | 0.01 | $CrCl_3$ |
| Present example 7 | 1.00 | 1.00 | 0.01 | $VCl_3$ |
| Present example 8 | 1.00 | 1.00 | 0.01 | $HfCl_4$ |
| Present example 9 | 1.00 | 1.00 | 0.01 | $IrCl_3$ |
| Present example 10 | 1.00 | 1.00 | 0.01 | $CoCl_2$ |
| Present example 11 | 1.00 | 1.00 | 0.01 | $NiCl_2$ |
| Present example 12 | 1.00 | 1.00 | 0.01 | $PtCl_2$ |
| Present example 13 | 1.00 | 1.00 | 0.01 | $FeCl_3$ |
| Present example 14 | 1.00 | 1.00 | 0.01 | $NdCl_2$ |
| Present example 15 | 1.00 | 1.00 | 0.01 | $PdCl_2$ |
| Present example 16 | 1.00 | 1.00 | 0.01 | $MoCl_3$ |
| Present example 17 | 1.00 | 1.00 | 0.01 | $RhCl_3$ |
| Present example 18 | 1.00 | 1.00 | 0.01 | $WCl_4$ |
| Present example 19 | 1.00 | 1.00 | 0.01 | Co |

TABLE 1-continued

| | Composition (molar ratio) | | | |
|---|---|---|---|---|
| | LiH | $LiNH_2$ | Catalyst | Catalyst type |
| Present example 20 | 1.00 | 1.00 | 0.01 | Fe |
| Present example 21 | 1.00 | 1.00 | 0.01 | Ni |
| Present example 22 | 1.00 | 1.00 | 0.02 | $CrCl_3$ + $TiCl_3$ |
| Present example 23 | 1.20 | 1.00 | 0.01 | $TiCl_3$ |
| Present example 24 | 1.20 | 1.00 | 0.01 | $CrCl_3$ |

Thereafter, within a high-purity Ar glove box, a sample thus weighed was introduced into a mill container (250 cm$^3$) having a high chromium steel valve. Then, the interior of the mill container was vacuum-exhausted, and high-purity Ar was supplied into the mill container to set the pressure inside the mill container at 1 MPa. Then, milling was performed by a planetary ball mill apparatus (manufactured by Fritsch Co., Ltd., P5) at room temperature and at 250 rpm for 120 minutes to form a sample. Then, after the interior of the mill container was vacuum-exhausted and filled with Ar, the mill container was opened and the sample was taken out within the high-purity Ar glove box. As metal Ni, metal Co, and metal Fe, products manufactured by Vacuum Metallurgy Co., Ltd. were used (Ni had an average particle diameter of 20 nm and a BET specific surface area of 43.8 m$^2$/g, Co had an average particle diameter 20 nm and a BET specific surface area of 47.9 m$^2$/g, and Fe had an average particle diameter of 20 nm and a BET specific surface area of 46.0 m$^2$/g). As other metal chlorides, products manufactured by Aldrich Co., Ltd. were used (the purity was 95% or more).

Each sample according to the present examples 4 to 24 was weighed to 500 mg within a high-purity Ar glove box, and introduced into a SUS reaction container (with an inner volume of about 50 cm$^3$) having a valve with an inner volume of 50 cm$^3$. The reaction container had a thermocouple to measure the temperature near the upper portion of the sample. The reaction container with the sample contained therein was attached to an experimental apparatus (with an inner volume of about 300 cm$^3$) provided with a pressure sensor, a vacuum pump, and a gas chromatograph (manufactured by Shimadzu Corporation, GC9A, a TCD detector, and a column: Molecular Sieve 5A). Then, the reaction container was vacuum-exhausted, and the sample was heated from room temperature to 300° C. at a temperature-up rate of 10° C./minute, during which gas emitted from the reaction container was measured by the attached gas chromatograph to determine the hydrogen amount at room temperature, 150° C., 200° C., and 250° C. In order to define a hydrogen release rate, the hydrogen amount thus determined was divided by the sample amount before heating. The hydrogen amount colleted by the gas chromatograph and thereby lost at each temperature was calculated and used to compensate the hydrogen release rate.

Figure 9:
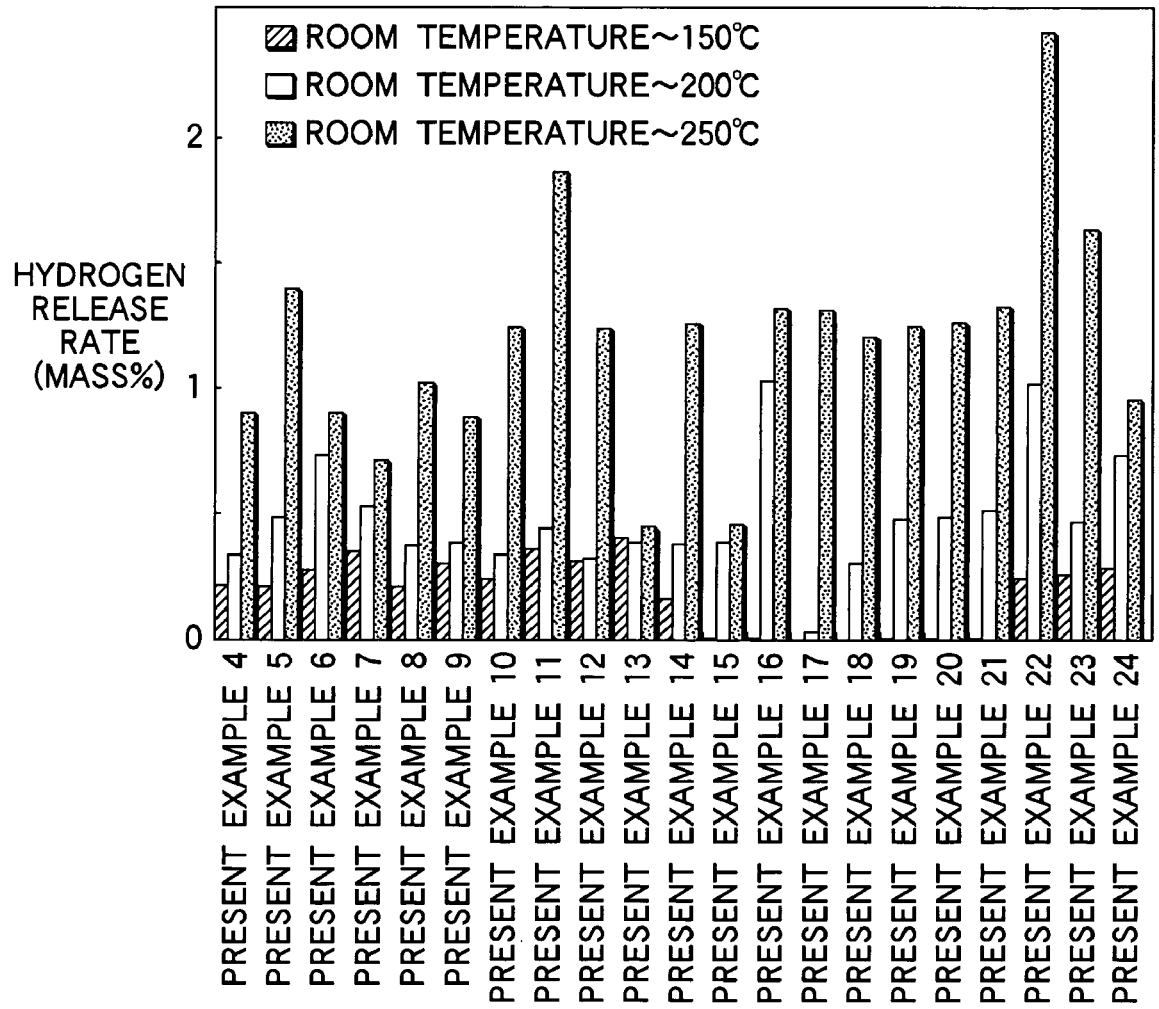
FIG. 9 is a graph showing hydrogen release rates of samples according to present examples 4 to 24 within predetermined temperature ranges.

FIG. 9 is a view showing hydrogen release rates within temperature ranges of from room temperature to 150° C., from room temperature to 200° C., and from room temperature to 250° C. As shown in FIG. 9, each samples except the present examples 7, 13, and 15 rendered a hydrogen release rate around 1 mass % in heating from room temperature to 250° C., which was a good hydrogen release characteristic. Further, the present example 15 rendered a hydrogen release rate higher than 0.4 mass % in heating from room temperature to 200° C., which was a high hydrogen release rate for the relatively low temperature range. Each of the present examples 7 and 13 rendered a hydrogen release rate higher than 0.4 mass % in heating from room temperature to 150° C., i.e., the lowest temperature range, which was a high hydrogen release rate for the lowest temperature range of 150° C. or less.

Next, an explanation will be given of a hydrogen storage matter containing a mixture, complex product, or reaction product (which will be referred to as "mixture or the like") of a metal hydride and a metal amide compound, which comprises at least two metal elements. Hereinafter, "containing a mixture, complex product, or reaction product (i.e., mixture or the like)" means not only a state containing any one of a mixture, complex product, and reaction product, but also a state containing any two of them, or a state containing all of them. Specifically, such a hydrogen storage matter is exemplified by (1) a matter in which the metal composing a metal hydride differs from the metal composing a metal amide compound, (2) a matter which contains a plurality of metal hydrides with different metal components, or (3) a matter which contains a plurality of metal amide compounds with different metal components.

If only a decrease in hydrogen release temperature is taken into consideration, a preferable example is a combination of a metal hydride and a metal amide compound, wherein the metal hydride is lithium hydride (LiH), which has a lower decomposition temperature among metal hydrides, and the metal amide compound at least contains one or mixture of magnesium amide ($Mg(NH_2)_2$) and calcium amide ($Ca(NH_2)_2$), which decompose at a lower temperature than LiH and thereby produce ammonia gas ($NH_3(g)$).

As can be understood by comparing a present example 41 with a present example 43, which will be described later, where a metal amide compound is solely used (single component), the hydrogen release rate decreases with increase in atomic mass of the metal element composing the metal amide compound. Accordingly, it is practically preferable to use a combination of lithium amide ($LiNH_2$), which has the smallest weight, with $Mg(NH_2)_2$ or $Ca(NH_2)_2$ for obtaining a lower temperature.

In the case of a matter using LiH, $LiNH_2$, and $Mg(NH_2)_2$, if these substances are combined to be equivalent, these substances can be used in a combination, as shown in the following formula (9). In the formula (9), it is preferable to satisfy a=b+2c. Further, even if lithium imide is used to be not equivalent (for example, $Li_{2.2}NH$), there is no problem.

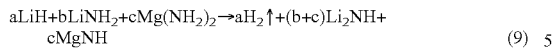
$$aLiH + bLiNH_2 + cMg(NH_2)_2 \rightarrow aH_2\uparrow + (b+c)Li_2NH + cMgNH \quad (9)$$

A mixture or the like of a metal hydride and a metal amide compound is preferably nano-structured and organized by an MeM process. In the case of small production, the MeM process may be performed by a planetary ball mill or the like. In the case of mass production, the MeM process may be performed by one of various mixing/crushing methods described later, such as a roller mill, a rotation type mill with inner and outer cylinders, an atrighter, an inner piece type mill, and an airflow crushing type mill.

A mixture or the like of a metal hydride and a metal amide compound is obtained by a mixing/crushing process of a metal hydride and a metal amide compound, which is performed within an inert gas (such as argon (Ar) or nitrogen ($N_2$)) atmosphere, a hydrogen ($H_2$) atmosphere, or a mixture gas atmosphere of an inert gas and hydrogen. At this time, the pressure of the atmosphere (gas pressure) is preferably set to be not less than atmospheric pressure. With this arrangement, although details are unknown, the mixture or the like subjected to the mixing/crushing process can have an increased hydrogen release amount.

A mixture or the like of a metal hydride and a metal amide compound preferably contains a catalyst to enhance the hydrogen absorption and release function. A preferable example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

The catalyst loadage is preferably set to be 0.1 mass % or more and 20 mass % or less of a mixture or the like of a metal hydride and a metal amide. If the catalyst loadage is less than 0.1 mass %, the effect of promoting the hydrogen generation reaction cannot be obtained. On the other hand, if the catalyst loadage is more than 20 mass %, reactions between reaction substances, such as metal hydrides, are hindered, or the hydrogen release rate per unit mass is decreased.

A catalyst having hydrogen absorption and release function is loaded onto a mixture or the like of a metal hydride and a metal amide compound by any one of the following three methods. Specifically, they are (a) a method in which, when the metal hydride and metal amide compound are mixed and crushed, the catalyst is added so that the catalyst is loaded onto a process object (i.e., the metal hydride, metal amide compound, mixture thereof, or reaction product), (b) a method in which the metal hydride and metal amide compound are mixed and crushed to form a process object, then the catalyst is mixed with the process object so that the catalyst is loaded onto the process object, and (c) a method in which, before the metal hydride and metal amide compound are mixed and crushed, the catalyst having hydrogen absorption and release function is loaded onto at least one of the metal hydride and metal amide compound by a mixing/crushing process or the like.

(Preparation of Various Metal Amides)

For example, $Mg(NH_2)_2$ was prepared, as follows. Specifically, within a high-purity Ar glove box, 1 g magnesium hydride ($MgH_2$) was introduced into a mill container (with an inner volume of 250 cm³) made of high chromium steel. Then, the interior of the mill container was vacuum-exhausted, and a predetermined amount of $NH_3(g)$ was supplied into the mill container to set a molar ratio not less than that shown in the following formula (10) and to set the pressure inside the mill container at 0.4 MPa or less (absolute pressure). Then, the mill container was sealed, and a milling process was performed within atmospheric atmosphere at room temperature and at a rotational speed of 250 rpm for a predetermined time to form the substance. The hydrogen amount in the reaction gas and an XRD measurement were utilized to confirm production of $Mg(NH_2)_2$ within the mill container after the milling process. The same preparation was also performed for $LiNH_2$ and $Ca(NH_2)_2$. Table 2 shows source materials used for preparation of respective metal amides.

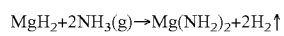
$$MgH_2 + 2NH_3(g) \rightarrow Mg(NH_2)_2 + 2H_2\uparrow \quad (10)$$

TABLE 2

| Source material (chemical formula) | Purity (%) | Manufacturer etc. |
|---|---|---|
| Magnesium hydride($MgH_2$) | 95 | Dealt by Azmax Co., Ltd. |
| Calcium hydride($CaH_2$) | 95 | Manufactured by Sigma-Aldrich Co., Ltd. |
| Lithium hydride(LiH) | 95 | Manufactured by Sigma-Aldrich Co., Ltd. |
| Lithium amide($LiNH_2$) | 95 | Manufactured by Sigma-Aldrich Co., Ltd. |
| Titanium trichloride($TiCl_3$) | 99.999 | Manufactured by Sigma-Aldrich Co., Ltd. |

PRESENT EXAMPLES 31 TO 37

Table 3 shows the arranged compositions of the starting materials of the present examples 31 to 37 described below.

Predetermined source materials selected from the group consisting of LiH, $MgH_2$, $LiNH_2$, $Mg(NH_2)_2$, and $Ca(NH_2)_2$ were weighed within a high-purity Ar glove box, to have a predetermined composition containing two or more metal elements, as shown in Table 3. Titanium trichloride ($TiCl_3$) was also weighed within the box to set it at 1.0 mole % of the total molar quantity of the metal components of the starting materials. They were then introduced into a mill container having a high chromium steel valve. Then, the interior of the mill container was vacuum-exhausted, and high-purity hydrogen was supplied into the mill container to set the pressure inside the mill container at 1 MPa. Then, a milling process was performed by a planetary ball mill apparatus (manufactured by Fritsch Co., Ltd., P5) within atmospheric atmosphere at room temperature and at a rotational speed of 250 rpm for two hours. The sample thus milled was taken out from the mill container within the high-purity Ar glove box after the interior of the mill container was vacuum-exhausted and filled with Ar.

COMPARATIVE EXAMPLES 31 AND 32

Table 3 also shows the arranged compositions of the starting materials of the comparative examples 31 and 32. In order for each of a metal hydride and a metal amide compound to contain one metal, LiH and $LiNH_2$ were weighed for the comparative example 31, and $MgH_2$ and $Mg(NH_2)_2$ were weighed for the comparative example 32, within a high-purity Ar glove box, to have a predetermined composition, as shown in Table 3. $TiCl_3$ was also weighed within the box to set it at 1.0 mole % of the total molar quantity of the metal components of the starting materials. They were then introduced into a mill container having a high chromium steel valve. Then, the interior of the mill container was vacuum-exhausted, and high-purity hydrogen was supplied into the mill container to set the pressure inside the mill container at 1 MPa. Then, a milling process was performed by a planetary ball mill apparatus within atmospheric atmosphere at room temperature and at a rotational speed of 250 rpm for two hours. The sample thus milled was taken out from the mill container within the high-purity Ar glove box after the interior of the mill container was vacuum-exhausted and filled with Ar.

TABLE 3

| Sample name | Source material and combination ratio | | | | | Theoretical hydrogen release rate (mass %) | Hydrogen release peak temperature (° C.) |
|---|---|---|---|---|---|---|---|
| | LiH | $MgH_2$ | $LiNH_2$ | $Mg(NH_2)_2$ | $Ca(NH_2)_2$ | | |
| Present example 31 | 2 | 0 | 0 | 1 | 0 | 5.54 | 209 |
| Present example 32 | 3 | 0 | 1 | 0 | 0 | 5.82 | 224 |
| Present example 33 | 2 | 0 | 0 | 0 | 1 | 4.55 | 205 |
| Present example 34 | 3 | 0 | 1 | 0 | 1 | 5.05 | 221 |
| Present example 35 | 4 | 0 | 2 | 1 | 0 | 5.97 | 227 |
| Present example 36 | 5 | 0 | 3 | 1 | 0 | 6.06 | 230 |
| Present example 37 | 5 | 0 | 1 | 2 | 0 | 5.7 | 215 |
| Comparative example 31 | 1 | 0 | 1 | 0 | 0 | 6.47 | 239 |
| Comparative example 32 | 0 | 1 | 0 | 1 | 0 | 4.84 | 317 |

(Sample Assessment)

Each sample fabricated as described above was heated at a temperature-up rate of 5° C./minute, using a TG-MASS apparatus (thermal weight and mass analysis apparatus) disposed within a high-purity Ar glove box, and desorption gas from the sample at this time was collected and analyzed.

(Result)

Figure 10:
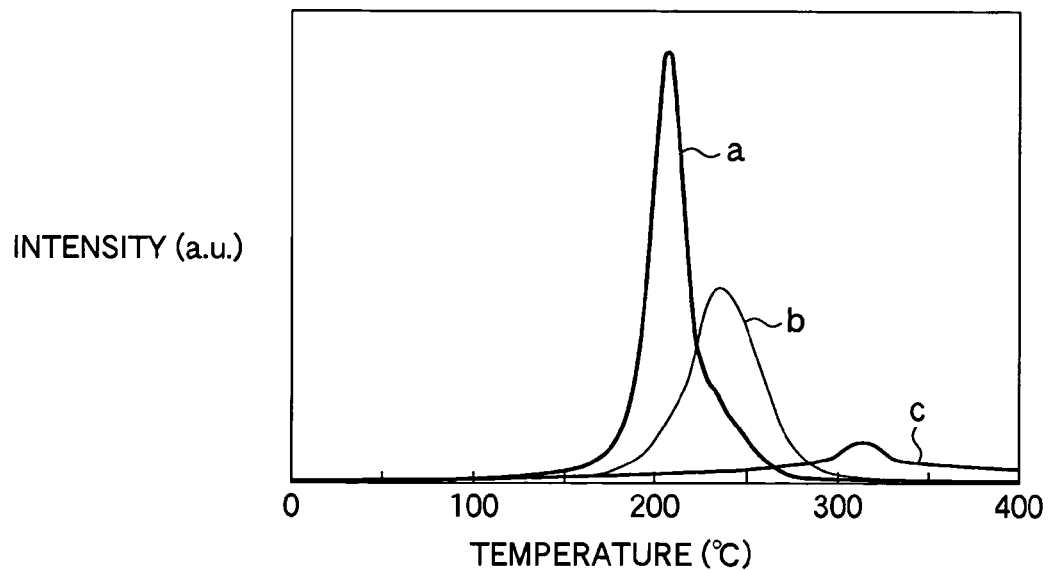
FIG. 10 is a view showing emission spectrum lines of desorption gas due to heating of a present example 41 and comparative examples 41 and 42, obtained by a TG-MASS apparatus.
Figure 12:
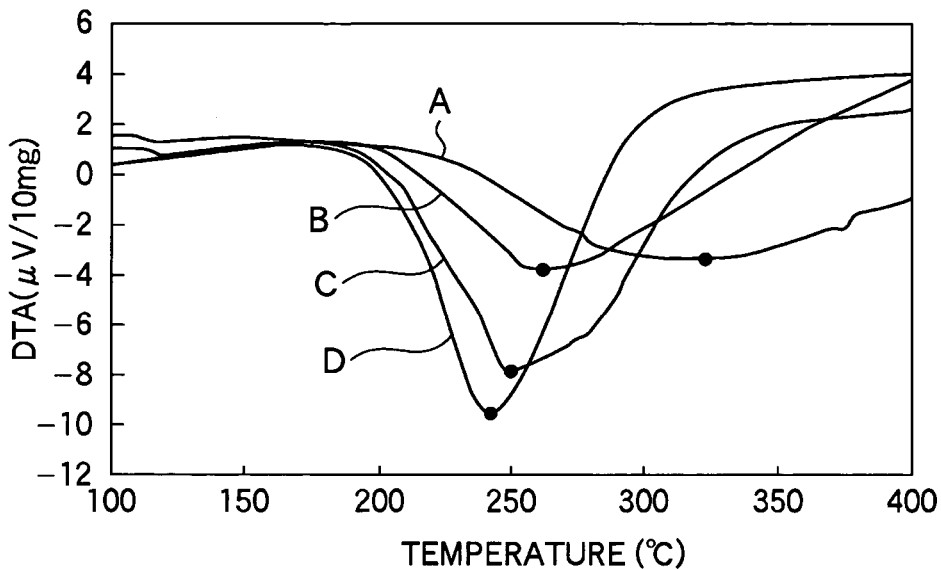
FIG. 12 is a view showing the DTA curves of hydrogen storage matters comprising a lithium hydride and a lithium amide.

FIG. 10 is a view showing the emission spectrum of desorption hydrogen due to heating by the TG-MASS apparatus, i.e., explaining the relationship between the temperature and hydrogen emission intensity. In FIG. 12, a characteristic line a denotes the present example 31, a characteristic line b denotes the comparative example 31, and a characteristic line c denotes the comparative example 32. Further, Table 3 shows, for each sample, the theoretical hydrogen release rate (mass %) and the peak temperature (° C.) (which will be referred to as "hydrogen release peak temperature") of the hydrogen emission spectrum curve.

As shown in FIG. 10, as regards the hydrogen release peak temperature, the present example 31 rendered 209° C., while the comparative example 31 rendered 239° C. and the comparative example 32 rendered 317° C. Accordingly, it was confirmed that the present example 31 decreased the hydrogen release peak temperature as compared to the comparative examples 31 and 32. Further, as shown in Table 3, it was confirmed that the present examples 32 to 37 also decreased the hydrogen release peak temperature as compared to the comparative example 31.

Next, an explanation will be given of a hydrogen storage matter containing a mixture, complex product, or reaction product (mixture or the like) of a metal hydride and a metal amide compound, which comprises lithium (Li) and magnesium (Mg) as two metal elements. Specifically, such a hydrogen storage matter is exemplified by (1) a matter in which the metal composing a metal hydride is Li and the metal composing a metal amide compound is Mg, (2) a matter in which the metal composing a metal hydride is Li and the metal composing a metal amide compound is Mg and Li, (3) a matter in which the metal composing a metal hydride is Mg and the metal composing a metal amide compound is Li, (4) a matter in which the metal composing a metal hydride is Mg and the metal composing a metal amide compound is Mg and Li, and (5) a matter which the metal composing a metal hydride is Mg and Li and the metal composing a metal amide compound is Mg and/or Li.

In a preferable example, the metal hydride is lithium hydride (LiH), and the metal amide compound contains magnesium amide ($Mg(NH_2)_2$) alone or a mixture thereof with lithium amide ($LiNH_2$).

In the case of a matter using LiH and $Mg(NH_2)_2$, if these substances are combined to be equivalent, these substances can be combined as shown in the following formula (11). Further, in the case of a matter using magnesium hydride ($MgH_2$) and $LiNH_2$, these substances can be combined as shown in the following formula (12). According to the combinations described above, the theoretical hydrogen storage rate is 5.48 mass %.

$$2LiH + Mg(NH_2)_2 \Leftrightarrow Li_2NH + MgNH + 2H_2\uparrow \quad (11)$$

$$MgH_2 + 2LiNH_2 \Leftrightarrow Li_2NH + MgNH + 2H_2\uparrow \quad (12)$$

Further, in the case of a matter using LiH and $Mg(NH_2)_2$, it is preferable to use LiH to be 1.5 moles or more and 4 moles or less relative to 1 mole of $Mg(NH_2)_2$. Furthermore, it is more preferable to use LiH to be 2.5 moles or more and 3.5 moles or less relative to 1 mole of $Mg(NH_2)_2$. For example, the following formula (13) shows a case where 2.67 moles of LiH is used relative to 1 mole of $Mg(NH_2)_2$ ($8LiH+3Mg(NH_2)_2$). According to the combination shown in the following formula (13), the theoretical hydrogen storage rate is 6.85 mass %, and thus the hydrogen storage rate becomes higher than in the case shown in the formula (11).

$$8LiH + 3Mg(NH_2)_2 \Leftrightarrow 4Li_2NH + Mg_3N_2 + 8H_2\uparrow \quad (13)$$

On the other hand, in the case of a matter using $MgH_2$ and $LiNH_2$, it is preferable to use a mixture ratio of $MgH_2$ to be 0.5 moles or more and 2 moles or less relative to 1 mole of $LiNH_2$. Furthermore, it is more preferable to use a mixture ratio of $MgH_2$ to be 0.5 moles or more and 1 mole or less relative to 1 mole of $LiNH_2$. For example, the following formula (14) shows this combination. According to the combination shown in the following formula (14), the theoretical hydrogen storage rate is 7.08 mass %, and thus the hydrogen storage rate becomes far higher than in the case shown in the formula (12).

$$3MgH_2 + 4LiNH_2 \Leftrightarrow Mg_3N_2 + 2Li_2NH + 6H_2\uparrow \quad (14)$$

In the backward reaction of the formula (1), i.e., a hydrogen release reaction, it has been confirmed that return to lithium nitride ($Li_3N$) provides 9.3 mass % hydrogen release rate. However, in order to obtain this hydrogen release rate, lithium imide ($Li_2NH$) has to be decomposed to form $Li_3N$. This reaction provides a high hydrogen release rate, but entails a large $\Delta H$ of $-148$ kJ/mole, and thus requires a high temperature. Accordingly, in this case, it is difficult to decrease the hydrogen release temperature.

In this respect, it has been found that, where Mg, which can be nitrided more easily than Li, is combined to produce magnesium nitride ($Mg_3N_2$) and $Li_2NH$, as shown in the formulas (13) and (14), the hydrogen release peak temperature can be decreased while a relatively high hydrogen release rate is maintained.

Specifically, the formula (13) proceeds to release hydrogen in three phases, as shown in the following formulas (15), (16), and (17).

$$3Mg(NH_2)_2 + 3LiH \rightarrow 3MgNH + 3LiNH_2 + 3H_2\uparrow \quad (15)$$

$$3LiNH_2 + 3LiH \rightarrow 3Li_2NH + 3H_2\uparrow \quad (16)$$

$$3MgNH + 2LiH \rightarrow Mg_3N_2 + Li_2NH + 2H_2\uparrow \quad (17)$$

It is thought that decrease in the hydrogen release peak temperature according to the formula (13) is caused by the fact that the hydrogen release reaction between $Mg(NH_2)_2$ and LiH shown in the formula (15) starts at a very low temperature due to a combination of $LiNH_2$ and LiH. Further, according to the present invention, a hydrogen storage matter can have a low hydrogen release peak temperature while a relatively high hydrogen release rate is maintained. It is thought that this is caused by a reaction smoothly proceeding to change magnesium imide (MgNH) produced as shown in the formula (15) into $Mg_3N_2$ as shown in the formula (17).

Such a mixture or the like of a metal hydride and a metal amide compound is preferably nano-structured and organized by an MeM process. In the case of small production, this mechanical milling process may be performed by a planetary ball mill or the like. In the case of mass production, the mechanical milling process may be performed by one of various mixing/crushing methods described later, such as a roller mill, a rotation type mill with inner and outer cylinders, an atrighter, an inner piece type mill, and an airflow crushing type mill.

A mixture or the like of a metal hydride and a metal amide compound is obtained by a mixing/crushing process of a metal hydride and a metal amide compound, which is performed within an inactive gas (such as argon (Ar) or nitrogen ($N_2$)) atmosphere, a hydrogen atmosphere, or a mixture gas atmosphere of an inactive gas and hydrogen. At this time, the pressure of the atmosphere (gas pressure) is preferably set to be not less than atmospheric pressure. With this arrangement, the mixture or the like subjected to the mixing/crushing process can have an increased hydrogen release amount.

A mixture or the like of a metal hydride and a metal amide compound preferably contains a catalyst to enhance the hydrogen absorption and release function. A preferable example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

The catalyst loadage is preferably set to be 0.1 mass % or more and 20 mass % or less of a mixture or the like of a metal hydride and a metal amide. If the catalyst loadage is less than 0.1 mass %, the effect of promoting the hydrogen generation reaction cannot be obtained. On the other hand, if the catalyst loadage is more than 20 mass %, reactions between reaction substances, such as metal hydrides, are hindered, or the hydrogen release rate per unit mass is decreased.

A catalyst having hydrogen absorption and release function is loaded onto a mixture or the like of a metal hydride and a metal amide compound by any one of the following three methods. Specifically, they are (a) a method in which, when the metal hydride and metal amide compound are mixed and crushed, the catalyst is added so that the catalyst is loaded onto a process object (i.e., the metal hydride, metal amide compound, mixture thereof, or reaction product), (b) a method in which the metal hydride and metal amide compound are mixed and crushed to form a process object, then the catalyst is mixed with the process object so that the catalyst is loaded onto the process object, and (c) a method in which, before the metal hydride and metal amide compound are mixed and crushed, the catalyst having hydrogen absorption and release function is loaded onto at least one of the metal hydride and metal amide compound by a mixing/crushing process or the like.

(Preparation of $Mg(NH_2)_2$)

$Mg(NH_2)_2$ was prepared, as follows. Specifically, within a high-purity Ar glove box, 1 g of $MgH_2$ was introduced into a mill container (with an inner volume of 250 cm$^3$) made of high chromium steel. Then, the interior of the mill container was vacuum-exhausted, and a predetermined amount of ammonia gas $NH_3(g)$ was supplied into the mill container to set a molar ratio not less than that shown in the following formula (18). Then, the mill container was sealed, and a milling process was performed within atmospheric atmosphere at room temperature and at a rotational speed of 250 rpm for a predetermined time to form the substance. The hydrogen amount in the reaction gas and an XRD measurement were utilized to confirm production of $Mg(NH_2)_2$ within the mill container after the milling process. Table 4 shows source materials used according to the present invention.

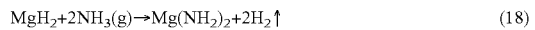
$MgH_2 + 2NH_3(g) \rightarrow Mg(NH_2)_2 + 2H_2\uparrow$ (18)

TABLE 4

| Source material (chemical formula) | Purity(%) | Manufacturer etc. |
| --- | --- | --- |
| Magnesium hydride($MgH_2$) | 95 | Dealt by Azmax Co., Ltd. |
| Lithium hydride(LiH) | 95 | Manufactured by Sigma-Aldrich Co., Ltd. |
| Lithium amide($LiNH_2$) | 95 | Manufactured by Sigma-Aldrich Co., Ltd. |

TABLE 4-continued

| Source material (chemical formula) | Purity(%) | Manufacturer etc. |
| --- | --- | --- |
| Titanium trichloride($TiCl_3$) | 99.999 | Manufactured by Sigma-Aldrich Co., Ltd. |

PRESENT EXAMPLES 41 TO 47

Table 5 shows the arranged compositions of the starting materials of the present examples 41 to 47 described below. Predetermined source materials selected from the group consisting of LiH, $MgH_2$, $LiNH_2$, and $Mg(NH_2)_2$ were weighed within a high-purity Ar glove box, to have a predetermined composition containing two metal elements, as shown in Table 5. Titanium trichloride ($TiCl_3$) was also weighed within the box to set it at 1.0 mole % of the total molar quantity of the metal components of the starting materials. They were then introduced into a mill container having a high chromium steel valve. Then, the interior of the mill container was vacuum-exhausted, and high-purity hydrogen was supplied into the mill container to set the pressure inside the mill container at 1 MPa. Then, a milling process was performed by a planetary ball mill apparatus (manufactured by Fritsch Co., Ltd., P5) within atmospheric atmosphere at room temperature and at a rotational speed of 250 rpm for two hours. The sample thus milled was taken out from the mill container within the high-purity Ar glove box after the interior of the mill container was vacuum-exhausted and filled with Ar.

TABLE 5

| Sample name | LiH/Mg(NH$_2$)$_2$ Molar ratio | Source material combination ratio (molar ratio) | | | | Hydrogen release peak temperature (° C.) |
| --- | --- | --- | --- | --- | --- | --- |
| | | LiH | Mg(NH$_2$)$_2$ | MgH$_2$ | LiNH$_2$ | |
| Present example 41 | 2.7 | 8 | 3 | 0 | 0 | 192 |
| Present example 42 | 2.0 | 2 | 1 | 0 | 0 | 209 |
| Present example 43 | 3.0 | 3 | 1 | 0 | 0 | 199 |
| Present example 44 | 4.0 | 4 | 1 | 0 | 0 | 215 |
| Present example 45 | 1.5 | 1.5 | 1 | 0 | 0 | 220 |
| Present example 46 | 1.0 | 1 | 1 | 0 | 0 | 225 |
| Present example 47 | 5.0 | 5 | 1 | 0 | 0 | 226 |
| Comparative example 41 | — | 1 | 0 | 0 | 1 | 240 |
| Comparative example 42 | — | 0 | 1 | 1 | 0 | 317 |

COMPARATIVE EXAMPLES 41 AND 42

Table 5 also shows the arranged compositions of the starting materials of the comparative examples 41 and 42. In order for each of a metal hydride and a metal amide compound to contain one metal, LiH and $LiNH_2$ were weighed for the comparative example 41, and $MgH_2$ and $Mg(NH_2)_2$ were weighed for the comparative example 42, within a high-purity Ar glove box, to have a predetermined composition, as shown in Table 5. $TiCl_3$ was also weighed within the box to set it at 1.0 mole % of the total molar quantity of the metal components of the starting materials. They were then introduced into a mill container having a high chromium steel valve. Then, the interior of the mill container was vacuum-exhausted, and high-purity hydrogen was supplied into the mill container to set the pressure inside the mill container at 1 MPa. Then, a milling process was performed by a planetary ball mill apparatus within atmospheric atmosphere at room temperature and at a rotational speed of 250 rpm for two hours. The sample thus milled was taken out from the mill container within the high-purity Ar glove box after the interior of the mill container was vacuum-exhausted and filled with Ar.

(Sample Assessment)

Each sample fabricated as described above was heated at a temperature-up rate of 5° C./minute, using a TG-MASS apparatus (thermal weight and mass analysis apparatus) disposed within a high-purity Ar glove box, and desorption gas from the sample at this time was collected and analyzed.

(Result)

Figure 11:
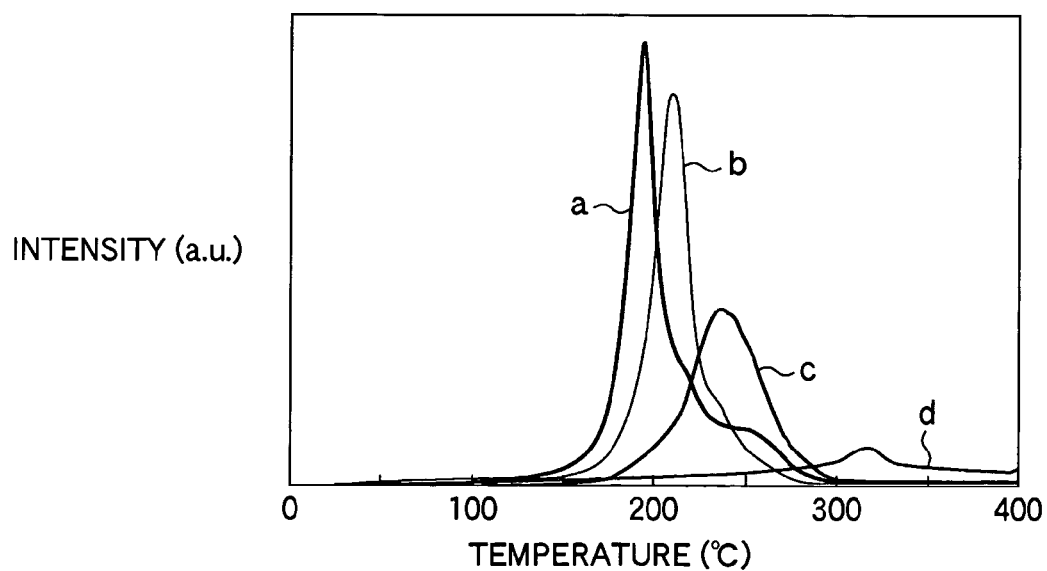
FIG. 11 is a view showing emission spectrum lines of desorption gas due to heating of present examples 51 and 52 and comparative examples 51 and 52, obtained by a TG-MASS apparatus.

FIG. 11 is a view showing the emission spectrum of desorption hydrogen due to heating by the TG-MASS apparatus, i.e., explaining the relationship between the temperature and hydrogen emission intensity. In FIG. 11, a characteristic line a denotes the present example 41, a characteristic line b denotes the comparative example 42, a characteristic line c denotes the comparative example 41 and a characteristic line d denotes the comparative example 42. Further, Table 5 shows, for each sample, the peak temperature (° C.) (which will be referred to as "hydrogen release peak temperature") of the hydrogen emission spectrum curve.

As shown in FIG. 11, as regards the hydrogen release peak temperature, the present example 41 rendered 192° C. and the present example 42 rendered 209° C., while the comparative example 41 rendered 239° C. and the comparative example 42 rendered 317° C. Accordingly, it was confirmed that the present examples 41 and 42 decreased the hydrogen release peak temperature as compared to the comparative examples 41 and 42. Further, as shown in Table 5, it was confirmed that the present examples 43 to 47 also decreased the hydrogen release peak temperature as compared to the comparative example 51.

Furthermore, it was confirmed that the present examples 41 to 45, which had a molar ratio of LiH and $Mg(NH_2)_2$ within a range of 1.5 to 4, rendered a decreased hydrogen release peak temperature. In addition, the present examples 41 and 43, which had a molar ratio of LiH and $Mg(NH_2)_2$ within a range of 2.5 to 3.5, rendered a further decreased hydrogen release peak temperature.

PRESENT EXAMPLES 48 TO 52

Table 6 shows the arranged compositions of the starting materials of the present examples 48 to 52 described below. Predetermined source materials selected from the group consisting of LiH, $MgH_2$, $LiNH_2$, and $Mg(NH_2)_2$ were weighed within a high-purity Ar glove box, to have a predetermined composition containing two metal elements, as shown in Table 6. Titanium trichloride ($TiCl_3$) was also weighed within the box to set it at 1.0 mole % of the total molar quantity of the metal components of the starting materials. They were then introduced into a mill container having a high chromium steel valve. Then, the interior of the mill container was vacuum-exhausted, and high-purity hydrogen was supplied into the mill container to set the pressure inside the mill container at 1 MPa. Then, a milling process was performed by a planetary ball mill apparatus (manufactured by Fritsch Co., Ltd., P5) within atmospheric atmosphere at room temperature and at a rotational speed of 250 rpm for two hours. The sample thus milled was taken out from the mill container within the high-purity Ar glove box after the interior of the mill container was vacuum-exhausted and filled with Ar.

TABLE 6

| Sample name | $MgH_2$/ $LiNH_2$ Molar ratio | Source material combination ratio (molar ratio) | | Hydrogen release peak temperature (° C.) |
|---|---|---|---|---|
| | | $MgH_2$ | $LiNH_2$ | |
| Present example 48 | 0.75 | 3 | 4 | 213 |
| Present example 49 | 0.50 | 1 | 2 | 221 |
| Present example 50 | 1.00 | 1 | 1 | 225 |
| Present example 51 | 2.00 | 2 | 1 | 228 |
| Present example 52 | 3.00 | 3 | 1 | 235 |

As shown in Table 6, the present examples 48 to 52 using $MgH_2$ and $LiNH_2$ also decreased the hydrogen release peak temperature as compared to the comparative examples 41 and 42. Further, it was confirmed that the present examples 48 to 51, which had a molar ratio of $MgH_2$ and $LiNH_2$ within a range of 0.5 to 2, rendered a further decreased hydrogen release peak temperature. In addition, the present examples 48 to 50, which had a molar ratio of $MgH_2$ and $LiNH_2$ within a range of 0.5 to 1, remarkably rendered this effect.

Next, an explanation will be given of a manufacturing method for a metal amide compound preferably applied to the hydrogen storage matter described above. A metal amide compound can be formed by a reaction of a metal hydride with ammonia ($NH_3$). In this case, the metal hydride is exemplified by lithium hydride (LiH), sodium hydride (NaH), potassium hydride (KH), rubidium hydride (RbH), cesium hydride (CsH), magnesium hydride ($MgH_2$), calcium hydride ($CaH_2$), beryllium hydride ($BeH_2$), strontium hydride ($SrH_2$), barium hydride ($BaH_2$), scandium hydride ($ScH_2$), lanthanum hydride ($LaH_2$, $LaH_3$), titanium hydride ($TiH_2$), vanadium hydride (VHX), yttrium hydride ($YH_3$, $YH_2$), zirconium hydride ($ZrH_2$), and neodymium hydride ($NdH_3$, $NdH_2$). Further, a mixture of two or more metal hydrides selected from these metal hydrides can be preferably used.

Particularly, the metal hydride preferably contains a hydride of an alkaline metal or alkaline earth metal. Because this arrangement allows a metal amide compound obtained by a reaction to have a good hydrogen release characteristic.

The metal hydride is preferably miniaturized by predetermined mechanical crushing, whereby a metal amide compound having a good hydrogen release characteristic can be obtained by a reaction with $NH_3$. When a crushing process is performed for a metal hydride element, or a mixing/crushing process is performed for a plurality of metal hydrides, it is preferable to add a crushing agent, such as an inorganic carrier, composed carrier, vegetable carrier, or organic solvent, in order to efficiently miniaturize a metal hydride.

For example, a reaction between LiH and $NH_3$ is expressed by the following formula (19). A reaction between $MgH_2$ and $NH_3$ is expressed by the following formula (20). A reaction between $CaH_2$ and $NH_3$ is expressed by the following formula (21).

$$LiH+NH_3 \rightarrow LiNH_2+H_2\uparrow \qquad (19)$$

$$MgH_2+2NH_3 \rightarrow Mg(NH_2)_2+2H_2\uparrow \qquad (20)$$

$$CaH_2+2NH_3 \rightarrow Ca(NH_2)_2+2H_2\uparrow \qquad (21)$$

Liquid ammonia ($NH_3$(liq)) is preferably used as $NH_3$. In this case, as a matter of course, the reaction temperature is maintained to be not more than the $NH_3$ boiling point (about −33° C.). It is preferable to sufficiently agitate $NH_3$(liq) to increase the reaction efficiency.

On the other hand, where ammonia gas ($NH_3(g)$) is used, it is preferable to disperse a metal hydride into one of various organic inactive solvents, such as saturated fat hydrocarbons, e.g., pentane, hexane, and cyclohexane; aromatic hydrocarbons, e.g., benzene and toluene; alkyl halides, e.g., chloroform; and ethers, and then agitate this solvent in $NH_3(g)$ to cause a reaction. With this arrangement, the metal hydride can uniformly perform the reaction. These solvents may be used by selecting one of them or mixing two or more of them. After the reaction, the solvent is vaporized to isolate the product.

As shown in the formulas (19) to (21), it suffices if $NH_3$ is used by the number of moles corresponding to the chemical equivalent relative to 1 mole of a metal hydride. However, $NH_3$ is preferably set to be excessive in order to promote the reaction progress.

It is also preferable to mix a metal hydride with a metal element or alloy that reacts with $NH_3$. Such a metal element or alloy is exemplified by Li, Na, K, Be, Mg, and Ca. For example, a reaction between Li and $NH_3$ is expressed by the following formula (22).

$$2Li + 2NH_3 \rightarrow 2LiNH_2 + H_2 \uparrow \qquad (22)$$

Where a metal hydride is mixed with a metal element or alloy, an effect is obtained such that a metal amide compound to be composed becomes unstable, and thus the decomposition temperature of the metal amide compound is decreased. It should be noted however that, if no metal hydride is present, the reaction of such a metal element or metal alloy with $NH_3$ may require a high temperature and high-pressure (for example, in the case of metal Mg). Accordingly, this condition is not preferable, because the operation thereof is difficult in practical application, and the energy efficiency thereof is not good.

The reaction of the metal amide compound described above may be performed by any one of a batch manner, semi-batch manner, and continuous manner. Then, a metal amide compound thus composed is mixed with a predetermined metal hydride, and a hydrogen storage matter having a good hydrogen release characteristic can be thereby obtained.

PRESENT EXAMPLE 61

Within a high-purity argon (Ar) glove box, 10 g (0.24 moles) of $CaH_2$ (manufactured by Aldrich Co., Ltd., with a purity of 95%) was fed into a stainless steel micro-reactor of 400 cm$^3$ and the micro-reactor was airtightly closed. Then, the micro-reactor was cooled by a dry ice-methanol freezing medium to a temperature lower than the boiling point of $NH_3$. Then, about 10 g (about 0.60 moles) of $NH_3$(liq) was supplied from a cylinder into the micro-reactor, and they were continuously agitated for five hours.

Thereafter, the micro-reactor was returned to room temperature, and the pressure of the reaction gas containing $NH_3$ (g) was measured. Further, the reaction gas was sampled in a certain amount, and the component thereof was analyzed by a gas chromatograph (manufactured by Shimadzu Corporation, GC9A, TCD detector, column: Molecular Sieve 5A). As a result of measurement of the hydrogen amount in the sample gas, the yield of $Ca(NH_2)_2$ (solid) was 82%. The reaction product or $Ca(NH_2)_2$ thus obtained was easy to collect from the micro-reactor within the high-purity Ar glove box.

PRESENT EXAMPLE 62

Within a high-purity Ar glove box, 6 g (0.24 moles) of $MgH_2$ (manufactured by Aldrich Co., Ltd., with a purity of 95%) was weighed and caused to react with $NH_3$(liq) under the same conditions as those of the present example 61. The hydrogen amount in a sample gas was measured and, as a result, the yield of $Mg(NH_2)_2$ was 72%.

PRESENT EXAMPLE 63

Within a high-purity Ar glove box, 5 g (0.12 moles) of $CaH_2$ and 1.6 g (0.24 moles) of metal Li were fed into a stainless steel micro-reactor of 400 cm$^3$ and the micro-reactor was airtightly closed. Then, the micro-reactor was cooled by a dry ice-methanol freezing medium, and about 10 g (about 0.60 moles) of $NH_3$(liq) was supplied from a cylinder into the micro-reactor, and they were continuously agitated for five hours. Thereafter, the micro-reactor was returned to room temperature, and the pressure of a generated gas was measured and sampled. The hydrogen amount in the sample reaction gas was analyzed by a gas chromatograph, and, as a result, the yield of a mixture of $Ca(NH_2)_2$ and $LiNH_2$ (solid corresponding to $Ca_{0.5}Li(NH_2)_2$) was 83%.

PRESENT EXAMPLE 64

Within a high-purity Ar glove box, 3.1 g (0.12 moles) of $MgH_2$ and 1.6 g (0.24 moles) of metal Li were weighed and caused to react with $NH_3$(liq) under the same conditions as those of the present example 63. The hydrogen amount in a sample of the reaction gas was analyzed, and, as a result, the yield of a mixture of $Mg(NH_2)_2$ and $LiNH_2$ (solid corresponding to $Mg_{0.5}Li(NH_2)_2$) was 75%.

PRESENT EXAMPLE 65

Within a high-purity Ar glove box, 2 g of $CaH_2$ was weighed and introduced into a mill container (with an inner volume of 250 cm$^3$) having a high chromium steel valve. Then, the interior of the mill container was vacuum-exhausted, and Ar was supplied to set the pressure therein at 1 MPa. Then, a milling process was performed by a planetary ball mill apparatus (manufactured by Fritsch Co. Ltd., P5) at room temperature and at a revolution speed of 250 rpm for 30 minutes to miniaturize the source material powder. Then, the interior of the mill container was vacuum-exhausted, and a mixture gas of Ar and 10-vol % $NH_3$ was supplied into the mill container to set the pressure inside the mill container at 1 MPa. Then, a milling process was performed by the same planetary ball mill apparatus at room temperature and at a revolution speed of 250 rpm for two hours. After the milling process, a gas sample was taken out from the mill container, and the interior of the mill container was vacuum-exhausted. This reaction operation using the $NH_3$ mixture gas was repeated five times, and the reaction gas was collected from the mill container after each milling process. The hydrogen amount in each reaction gas thus collected was measured and the yield thereof was calculated. As a result, the final yield of $Ca(NH_2)_2$ was 83%.

PRESENT EXAMPLE 66

Within a high-purity Ar glove box, 2 g of $MgH_2$ was weighed and finely crushed within Ar at 1 MPa as in the present example 65, and was then caused to react with a mixture gas of Ar and 10-vol % $NH_3$ for ten hours (two hours by five times). The reaction gas was sampled and the hydrogen amount therein was measured. As a result, the final yield of Mg(NH$_2$)$_2$ was 75%.

PRESENT EXAMPLE 67

Within a high-purity Ar glove box, 1.5 g (0.036 moles) of CaH$_2$ and 0.48 g (0.072 moles) of metal Li were weighed and finely crushed within Ar at 1 MPa as in the present example 65, and were then caused to react with a mixture gas of Ar and 10-vol % NH$_3$ for ten hours (two hours by five times). The reaction gas was sampled and the hydrogen amount therein was measured. As a result, the final yield of a reaction product or mixture of Ca(NH$_2$)$_2$ and LiNH$_2$ (solid corresponding to Ca$_{0.5}$Li(NH$_2$)$_2$) was 84%.

PRESENT EXAMPLE 68

Within a high-purity Ar glove box, 1.32 g (0.051 moles) of MgH$_2$ and 0.68 g (0.102 moles) of metal Li were weighed and finely crushed within Ar at 1 MPa as in the present example 65, and were then caused to react with a mixture gas of Ar and 10-vol % NH$_3$ for ten hours (two hours by five times). The reaction gas was sampled and the hydrogen amount therein was measured. As a result, the final yield of a reaction product or mixture of Mg(NH$_2$)$_2$ and LiNH$_2$ (solid corresponding to Mg$_{0.5}$Li(NH$_2$)$_2$) was 77%.

Next, an explanation will be given of various hydrogen storage matters which can enhance the hydrogen release characteristic by setting a predetermined specific surface area. In general, the hydrogen storage matters of this kind are categorized into two material families. The first material family includes a material comprising a mixture, complex product, or reaction product (mixture or the like) of a metal hydride and a metal amide compound, and miniaturized by a predetermined mechanical crushing process. The second material family includes a material obtained by hydrogenating a material containing a metal imide compound. It is also preferable for materials included in the second material family to be miniaturized by a predetermined mechanical crushing process.

At first, the first material family will be explained. In this family, a combination of a metal hydride and a metal amide compound is exemplified by a combination of lithium hydride (LiH) and lithium amide (LiNH$_2$), a combination of LiH and magnesium amide (Mg(NH$_2$)$_2$), and a combination of magnesium hydride (MgH$_2$) and LiNH$_2$. As regards basic characteristics, these materials differ in hydrogen release temperature, and also in specific surface area value for decreasing the hydrogen release temperature.

As described later in detail, in the case of a combination of LiH and LiNH$_2$, if it has a specific surface area of 15 m$^2$/g or more determined by a BET method, the hydrogen release temperature is rapidly decreased. In other words, it is possible to make the hydrogen release temperature very low by setting the specific surface area to be 15 m$^2$/g or more. In order to increase the hydrogen release rate, the specific surface area is more preferably set to be 30 m$^2$/g or more. This is adopted on the condition that the hydrogen release rate should be 3 mass % or more.

In the case of a combination of LiH and Mg(NH$_2$)$_2$, in order to decrease the hydrogen release temperature, the specific surface area determined by a BET method is set to be 7.5 m$^2$/g or more. Further, in order to increase the hydrogen release rate, the specific surface area is preferably set to be 15 m$^2$/g or more.

The hydrogen release reaction between LiH and Mg(NH$_2$)$_2$ is expressed by the following formulas (23) and (24).

$$2LiH + Mg(NH_2)_2 \Leftrightarrow Li_2NH + MgNH + 2H_2 \quad (23)$$

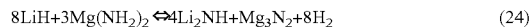

$$8LiH + 3Mg(NH_2)_2 \Leftrightarrow 4Li_2NH + Mg_3N_2 + 8H_2 \quad (24)$$

Looking at the formulas (23) and (24), the formula (23) shows that 2 moles of LiH is the chemical equivalent relative to 1 mole of Mg(NH$_2$)$_2$, wherein the theoretical hydrogen storage rate is 5.48 mass %. On the other hand, the formula (24) shows that 2.67 moles of LiH is the chemical equivalent relative to 1 mole of Mg(NH$_2$)$_2$, wherein the theoretical hydrogen storage rate is 6.85 mass %. Accordingly, depending on the composition ratio between Mg(NH$_2$)$_2$ and LiH, the reaction dominantly taking place can be changed and the hydrogen storage rate can be also changed.

Next, the formula (24) will be considered by dividing it into the following formulas (25a) and (25b)

$$6LiH + 3Mg(NH_2)_2 \Leftrightarrow 3Li_2NH + 3MgNH + 6H_2 \quad (25a)$$

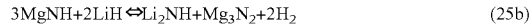

$$3MgNH + 2LiH \Leftrightarrow Li_2NH + Mg_3N_2 + 2H_2 \quad (25b)$$

In this case, the formula (25a) is obtained by tripling the coefficients on the substances in the formula (23), and thus it is substantially the same as the formula (23). The formula (25b) shows a reaction between magnesium imide (MgNH) produced in the formula (25a) and LiH.

Accordingly, the formula (24) means that, if LiH is set to be more than the stoichiometric ratio relative to Mg(NH$_2$)$_2$ to cause the reaction show in the formula (23), part of produced MgNH reacts with LiH excessively added, and a reaction thereby proceeds to produce magnesium nitride (Mg$_3$N$_2$).

In light of this fact, where the mixture ratio of LiH relative to 1 mole of Mg(NH$_2$)$_2$ is set to be less than 2, Mg(NH$_2$)$_2$ is excessive relative to LiH, so the formula (23) dominantly proceeds at this time. Further, where the mixture ratio of LiH relative to 1 mole of Mg(NH$_2$)$_2$ is set at the stoichiometric ratio of 2, the formula (23) also dominantly proceeds. However, even if the mixture ratio of LiH relative to Mg(NH$_2$)$_2$ is set in accordance with the formula (23), the mixture state (disperse state) or the like of MgNH and LiH affects it in practice. Consequently, it may happen that produced MgNH reacts with LiH and the reaction shown in the formula (24) thereby proceeds, while part of Mg(NH$_2$)$_2$ is left without being involved in the reaction.

On the other hand, where the mixture ratio of LiH relative to 1 mole of Mg(NH$_2$)$_2$ is set to be more than 2 and less than 2.67, LiH is excessive relative to Mg(NH$_2$)$_2$ for the formula (23), but LiH is insufficient relative to Mg(NH$_2$)$_2$ for the formula (24). In this case, if the mixture ratio is close to 2, the formula (23) dominantly proceeds, and part of produced MgNH changes into Mg$_3$N$_2$. As the mixture ratio becomes closer to 2.67, the formula (24) comes to more dominantly proceeds. Further, where the mixture ratio of LiH relative to 1 mole of Mg(NH$_2$)$_2$ is set at the stoichiometric ratio of 2.67 or where the mixture ratio is set to be more than 2.67, the formula (24) dominantly proceeds.

Which one of the formulas (23) and (24) is mainly utilized can be determined, in consideration of, e.g., the hydrogen storage rate, and the reaction cycle characteristic of products for absorbing hydrogen again after releasing hydrogen (i.e., easiness in the reaction from the right side to the left side in the formulas (23) and (24)). Further, it is expected that, where one of LiH and Mg(NH$_2$)$_2$ is set to be excessive relative to the other, the reaction probability of the other substance is increased, so that the hydrogen release is promoted. However, if one of the substances is too excessive, a problem arises in that the hydrogen storage rate for the total amount is decreased.

Accordingly, it is preferable to determine the quantity of each of LiH and Mg(NH$_2$)$_2$ in consideration of the hydrogen storage rate, reaction product utilization rate, and cycle characteristic for hydrogen absorption and release reaction. Specifically, the mixture ratio of LiH relative to 1 mole of Mg(NH$_2$)$_2$ is preferably set to be 1.5 moles or more and 4 moles or less. Further, where the mixture ratio is set to be 2.5 moles or more and 3.5 moles or less in order to mainly proceed with the formula (24), a higher hydrogen storage rate can be maintained as compared to the other range.

In the case of a combination of MgH$_2$ and LiNH$_2$, in order to decrease the hydrogen release temperature, the specific surface area determined by a BET method is set to be 7.5 m$^2$/g or more. Further, in order to increase the hydrogen release rate, the specific surface area is preferably set to be 15 m$^2$/g or more.

The reaction between MgH$_2$ and LiNH$_2$ is expressed by the following formulas (26) and (27).

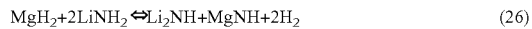
$$MgH_2 + 2LiNH_2 \Leftrightarrow Li_2NH + MgNH + 2H_2 \quad (26)$$

$$3MgH_2 + 4LiNH_2 \Leftrightarrow Mg_3N_2 + 2Li_2NH + 6H_2 \quad (27)$$

Looking at the formulas (26) and (27), the formula (26) shows that 0.5 moles of MgH$_2$ is the chemical equivalent relative to 1 mole of LiNH$_2$, wherein the theoretical hydrogen storage rate is 5.48 mass %. On the other hand, the formula (27) shows that 0.75 moles of LiH is the chemical equivalent relative to 1 mole of LiNH$_2$, wherein the theoretical hydrogen storage rate is 7.08 mass %. Accordingly, depending on the composition ratio between MgH$_2$ and LiNH$_2$, the reaction dominantly taking place can be changed and the hydrogen storage rate can be also changed.

Accordingly, also in the case of a combination of MgH$_2$ and LiNH$_2$, the following arrangement can be adopted as in the case of a combination of LiH and Mg(NH$_2$)$_2$. In this case, it is preferable to determine the quantity of each of MgH$_2$ and LiNH$_2$ in consideration of the hydrogen storage rate, reaction product utilization rate, and cycle characteristic for hydrogen absorption and release reaction. Specifically, MgH$_2$ is preferably set to be excessive, and the mixture ratio of LiH relative to 1 mole of Mg(NH$_2$)$_2$ is preferably set to be 0.5 moles or more and 2 moles or less. Further, where the mixture ratio is set to be 0.5 moles or more and 1 mole or less in order to mainly proceed with the formula (27), a higher hydrogen storage rate can be maintained as compared to the other range.

Next, the second material family will be explained. In this family, a material obtained by hydrogenating a material containing a metal imide compound is exemplified by a material obtained by hydrogenating lithium imide (Li$_2$NH) and a material obtained by hydrogenating mixture or the like of Mg$_3$N$_2$ and Li$_2$NH. Hereinafter, "hydrogenation of a substance" means an operation to cause a reaction of the substance with hydrogen, thereby changing the substance into a state containing hydrogen. For example, hydrogenated Li$_2$NH is obtained by causing Li$_2$NH to react with hydrogen. Although the structure thereof is unclear, the material is not changed into LiNH$_2$ or ammonia (NH$_3$), but reacts with hydrogen to take it therein somehow. When the material is subsequently heated to a predetermined temperature, it releases contained hydrogen and returns to the original form of Li$_2$NH.

In the case of a material obtained by hydrogenating a mixture or the like of Mg$_3$N$_2$ and Li$_2$NH, in order to decrease the hydrogen release temperature, the specific surface area determined by a BET method is set to be 5 m$^2$/g or more. Further, in order to increase the hydrogen release rate, the specific surface area is preferably set to be 10 m$^2$/g or more.

Each of various hydrogen storage matters described above preferably contains a catalyst to enhance the hydrogen absorption and release function. A preferable example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

A catalyst of this kind may be loaded onto a hydrogen storage matter by any one of the following methods. Specifically, in one method, the catalyst is added to the source material powder of each hydrogen storage matter and then mixed and crushed. In another method, the source material powder is mixed and crushed, and then the catalyst is added thereto and further mixed (or crushed and mixed).

For example, a hydrogen storage matter comprising a mixture or the like of a metal hydride and a metal amide compound may be manufactured by any one of the following methods. Specifically, in one method, a predetermined amount of a metal hydride powder, a metal amide compound powder, and a catalyst are crushed and mixed together. In another method, predetermined amounts of a metal hydride powder and a metal amide compound powder are crushed and mixed, and then a catalyst is added to the process object thus obtained, and further mixed. At this time, the crushing and mixing conditions are set to obtain a predetermined specific surface area after the crushing and mixing process.

A material obtained by hydrogenating a mixture or the like of Mg$_3$N$_2$ and Li$_2$NH may be manufactured by a method in which LiNH$_2$ powder and Mg$_3$N$_2$ are crushed and mixed, and then turned into an imide and hydrogenated. Alternatively, the material may be manufactured by a method in which LiNH$_2$ powder is crushed and then turned into an imide, and Li$_2$NH thus obtained and MgH$_2$ are crushed and mixed and then hydrogenated.

A hydrogen storage matter of the material families described above is subjected to a mechanical crushing process, which may be performed by processing the source material powder in one of various well known crushing means, such as a ball mill apparatus, a roller mill, a rotation type mill with inner and outer cylinders, an atrighter, an inner piece type mill, and an airflow crushing type mill.

(Fabrication of LiH+LiNH$_2$ Family Sample)

Within a high-purity argon (Ar) glove box, LiH, LiNH$_2$, and titanium trichloride (TiCl$_3$) (each manufactured by Aldrich Co., Ltd., with a purity of 95%) were weighed at a molar ratio of 1:1:0.02 to set the total amount at 1.3 g, and introduced into a mill container (250 cm$^3$) having a high chromium steel valve. Then, the interior of the mill container was vacuum-exhausted, and high-purity Ar was supplied into the mill container to set the pressure inside the mill container at 1 MPa. Then, a milling process was performed by a planetary ball mill apparatus (manufactured by Fritsch Co., Ltd., P5) at room temperature and at 60 to 250 rpm for 3 to 360 minutes to form a plurality of samples with different values of the specific surface area. Then, after the interior of the mill container was vacuum-exhausted and filled with Ar, the mill container was opened and each sample was taken out within the high-purity Ar glove box.

(Fabrication of LiH+Mg(NH$_2$)$_2$ Family Sample)

(a) Fabrication of Mg(NH$_2$)$_2$

Within a high-purity Ar glove box, 2 g of MgH$_2$ (manufactured by Azmax Co., Ltd., with a purity of 95%) was introduced into a mill container (with an inner volume of 250 cm$^3$)

made of high chromium steel. Then, the interior of the mill container was vacuum-exhausted, and ammonia gas ($NH_3$ (g)) was supplied into the mill container at 2 moles or more relative 1 mole of $MgH_2$ to cause the reaction shown in the following formula (28). Then, the mill container was sealed, and a milling process was performed by a planetary ball mill apparatus within atmospheric atmosphere at room temperature and at a rotational speed of 250 rpm for a predetermined time. Then, the hydrogen amount in the reaction gas was measured and the crushed product was measured by XRD measurement to confirm production of $Mg(NH_2)_2$.

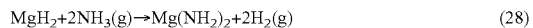

(b) Mixing and Crushing of $Mg(NH_2)_2$ and LiH

LiH and $Mg(NH_2)_2$ fabricated as described above were mixed at a molar ratio of 8:3, and were weighed within a high-purity Ar glove box to set the total amount at 1.3 g, and introduced into a mill container (250 cm$^3$) having a high chromium steel valve. Then, the interior of the mill container was vacuum-exhausted, and high-purity Ar was supplied into the mill container to set the pressure inside the mill container at 1 MPa. Then, a milling process was performed by a planetary ball mill apparatus at room temperature and at 250 rpm for 3 to 360 minutes to form a plurality of samples with different values of the specific surface area. Then, after the interior of the mill container was vacuum-exhausted and filled with Ar, the mill container was opened and each sample was taken out within the high-purity Ar glove box.

(Fabrication of $MgH_2+LiNH_2$ Family Sample)

Within a high-purity argon (Ar) glove box, $MgH_2$ and $LiNH_2$ were weighed at a molar ratio of 3:4 to set the total amount at 1.3 g, and introduced into a mill container (250 cm$^3$) having a high chromium steel valve. Then, the interior of the mill container was vacuum-exhausted, and high-purity Ar was supplied into the mill container to set the pressure inside the mill container at 1 MPa. Then, a milling process was performed by a planetary ball mill apparatus at room temperature and at 250 rpm for 3 to 360 minutes to form a plurality of samples with different values of the specific surface area. Then, after the interior of the mill container was vacuum-exhausted and filled with Ar, the mill container was opened and each sample was taken out within the high-purity Ar glove box.

(Fabrication and Hydrogenation of $Mg_3N_2+Li_2NH$ Family Sample)

Within a high-purity Ar glove box, $Li_2NH$ fabricated as described above and $Mg_3N_2$ (manufactured by Aldrich Co., Ltd., with a purity of 95%) were weighed at a molar ratio of 4:1 to set the total amount at 1.3 g, and introduced into a mill container (250 cm$^3$) having a high chromium steel valve. Then, the interior of the mill container was vacuum-exhausted, and high-purity Ar was supplied into the mill container to set the pressure inside the mill container at 1 MPa. Then, a milling process was performed by a planetary ball mill apparatus at room temperature and at 250 rpm for 3 to 360 minutes to form a plurality of samples with different values of the specific surface area. Then, after the interior of the mill container was vacuum-exhausted and filled with Ar, the mill container was opened and each sample was taken out within the high-purity Ar glove box. Then, each sample thus milled was transferred into a stainless steel reaction container (50 cm$^3$) within the high-purity Ar glove box. Then, after the interior of the stainless steel container was vacuum-exhausted, high-purity hydrogen was supplied therein and the sample was hydrogenated by maintaining it at 220° C. and at 3 MPa for twelve hours.

(Method for Measuring BET Specific Surface Area)

Each sample fabricated as described above was measured in terms of BET specific surface area by a multipoint type BET measurement apparatus (manufactured by Micromeritics Co., Ltd., ASAP2400) using nitrogen gas.

(Measurement of DTA Endothermic Peak Temperature Due to Hydrogen Release)

10 mg of each sample fabricated as described above was weighed, and heated at a temperature-up rate of 5° C./minute to measure a DTA curve by a TG/DTA apparatus (manufactured by Seiko Instruments, Inc., TG/DTA300) disposed within high-purity Ar. Then, based on the DTA curve thus obtained, the endothermic peak temperature due to hydrogen release was measured and then used as a hydrogen release temperature.

(Measurement of Hydrogen Release Amount)

A TG curve was formed by TG/DTA measurement from room temperature to 400° C. using the TG/DTA apparatus. Then, a mass decrease rate of the TG curve from 30° C. to 250° C. was calculated and then used as a hydrogen release rate.

(Test Result of $LiH+LiNH_2$ Family Sample)

FIG. 12 is a view showing the DTA curves of four samples A to D selected from these samples fabricated as described above. As crushing conditions, the sample A used 250 rpm and 3 minutes, the sample B used 250 rpm and 10 minutes, the sample C used 250 rpm and 30 minutes, and the sample D used 250 rpm and 120 minutes. The values of the specific surface area of the samples A to D were 11.6 m$^2$/g, 19.9 m$^2$/g, 34.8 m$^2$/g, and 40.5 m$^2$/g, respectively. As shown in FIG. 12, with increase in the crushing time, the specific surface area increased due to progress of crushing. Further, with increase in the specific surface area, the hydrogen release temperature (the valley bottom temperature of the endothermic reaction shown by black points in FIG. 14) is shifted toward a low temperature side. It should be noted that the sample A is out of the scope of the present invention, while the samples B to D are within the scope of the present invention.

Figure 13:
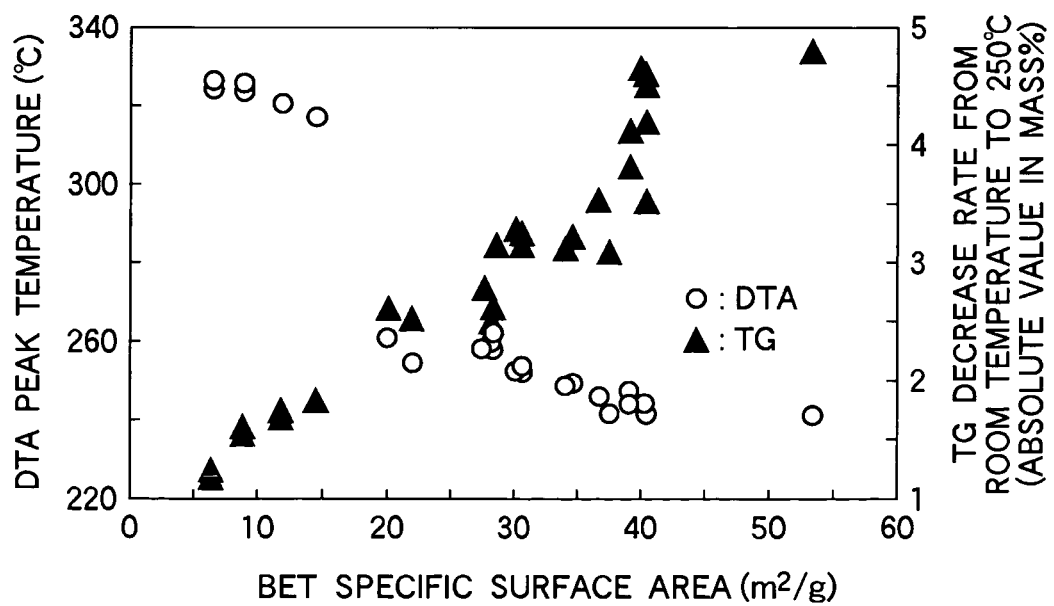
FIG. 13 is a graph showing the relationship of the hydrogen release temperature and hydrogen release rate relative to the specific surface area of hydrogen storage matters comprising a lithium hydride and a lithium amide.

FIG. 13 is a graph showing the relationship of the hydrogen release temperature and hydrogen release rate relative to the specific surface area of these samples. As shown in FIG. 13, as regards the $LiH+LiNH_2$ family hydrogen storage matter, it was confirmed that, where the BET specific surface area was 15 m$^2$/g or more, the hydrogen release temperature was rapidly decreased from around 320° C. to 270° C. or less, and the hydrogen release rate became 2 mass % or more, as compared to a case where the BET specific surface area was less than 15 m$^2$/g. Further, it was confirmed that, where the BET specific surface area was 30 m$^2$/g or more, the hydrogen release temperature became 260° C. or less, i.e., the temperature was further decreased, and the hydrogen release rate exceeded 3 mass %.

(Test Result of $LiH+Mg(NH_2)_2$ Family Sample)

Figure 14:
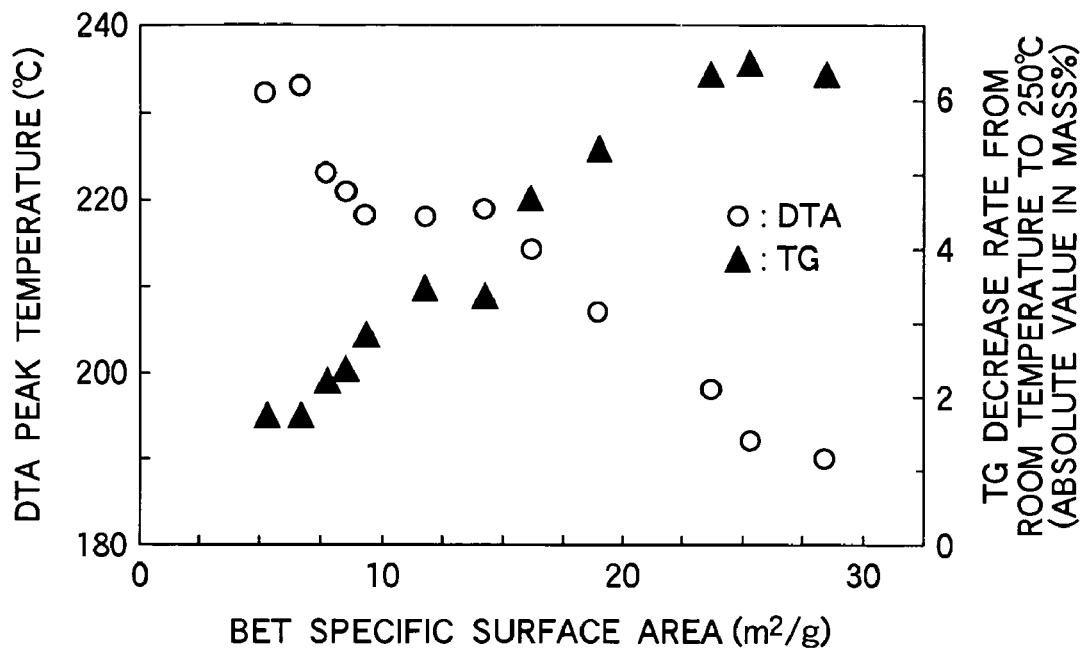
FIG. 14 is a graph showing the relationship of the hydrogen release temperature and hydrogen release rate relative to the specific surface area of hydrogen storage matters comprising a lithium hydride and a magnesium amide.

FIG. 14 is a graph showing the relationship of the hydrogen release temperature and hydrogen release rate relative to the specific surface area of these samples. As regards the $LiH+Mg(NH_2)_2$ family hydrogen storage matter, it was confirmed that, where the BET specific surface area was 7.5 m$^2$/g or more, the hydrogen release temperature was decreased from above 230° C. to 230° C. or less, and the hydrogen release rate became 2 mass % or more, as compared to a case where the BET specific surface area was less than 7.5 m$^2$/g. Further, it was confirmed that, where the BET specific surface area was 15 m$^2$/g or more, the hydrogen release temperature became 220° C. or less, i.e., the temperature was further decreased, and the hydrogen release rate exceeded 3 mass %.

(Test Result of $MgH_2$+$LiNH_2$ Family Sample)

Figure 15:
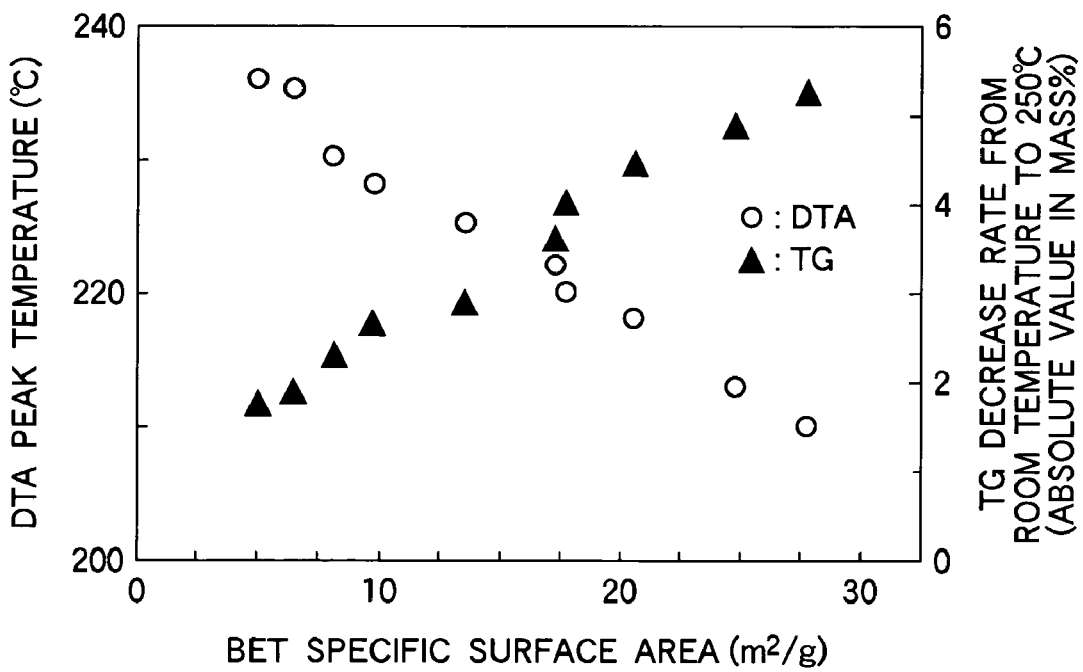
FIG. 15 is a graph showing the relationship of the hydrogen release temperature and hydrogen release rate relative to the specific surface area of hydrogen storage matters comprising a magnesium hydride and a lithium amide.

FIG. 15 is a graph showing the relationship of the hydrogen release temperature and hydrogen release rate relative to the specific surface area of these samples. As regards the $MgH_2$+$LiNH_2$ family sample, it was confirmed that, where the BET specific surface area was 7.5 $m^2$/g or more, the hydrogen release temperature was decreased from above 230° C. to 230° C. or less, and the hydrogen release rate became 2 mass % or more, as compared to a case where the BET specific surface area was less than 7.5 $m^2$/g. Further, it was confirmed that, where the BET specific surface area was 15 $m^2$/g or more, the hydrogen release temperature became 220° C. or less, i.e., the temperature was further decreased, and the hydrogen release rate exceeded 3 mass %.

(Test Result of Hydrogenated $Mg_3N_2$+$Li_2NH$ Family Sample)

Figure 16:
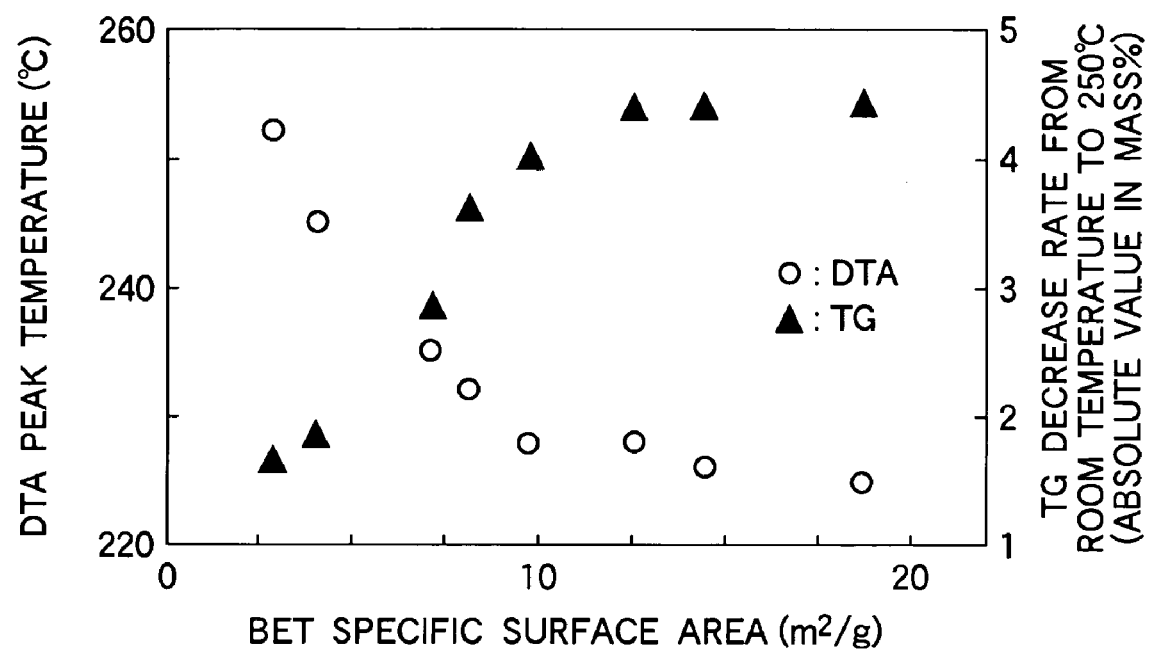
FIG. 16 is a graph showing the relationship of the hydrogen release temperature and hydrogen release rate relative to the specific surface area of hydrogen storage matters prepared by hydrogenating a crushed mixture of a magnesium nitride and a lithium imide.

FIG. 16 is a graph showing the relationship of the hydrogen release temperature and hydrogen release rate relative to the specific surface area of these samples. As regards the hydrogen storage matter prepared by hydrogenating a crushed mixture of $Mg_3N_2$+$Li_2NH$, it was confirmed that, where the BET specific surface area was 5 $m^2$/g or more, the hydrogen release temperature was decreased from above 240° C. to 240° C. or less, and the hydrogen release rate became 2 mass % or more, as compared to a case where the BET specific surface area was less than 5 $m^2$/g. Further, it was confirmed that, where the BET specific surface area was 10 $m^2$/g or more, the hydrogen release temperature became 230° C. or less, i.e., the temperature was further decreased, and the hydrogen release rate exceeded 3 mass %.

Figure 17A:
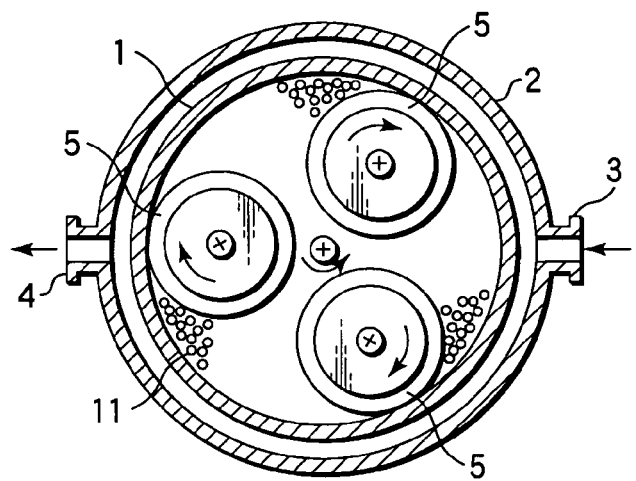
FIG. 17A is a sectional plan view schematically showing the structure of a first manufacturing apparatus.
Figure 17B:
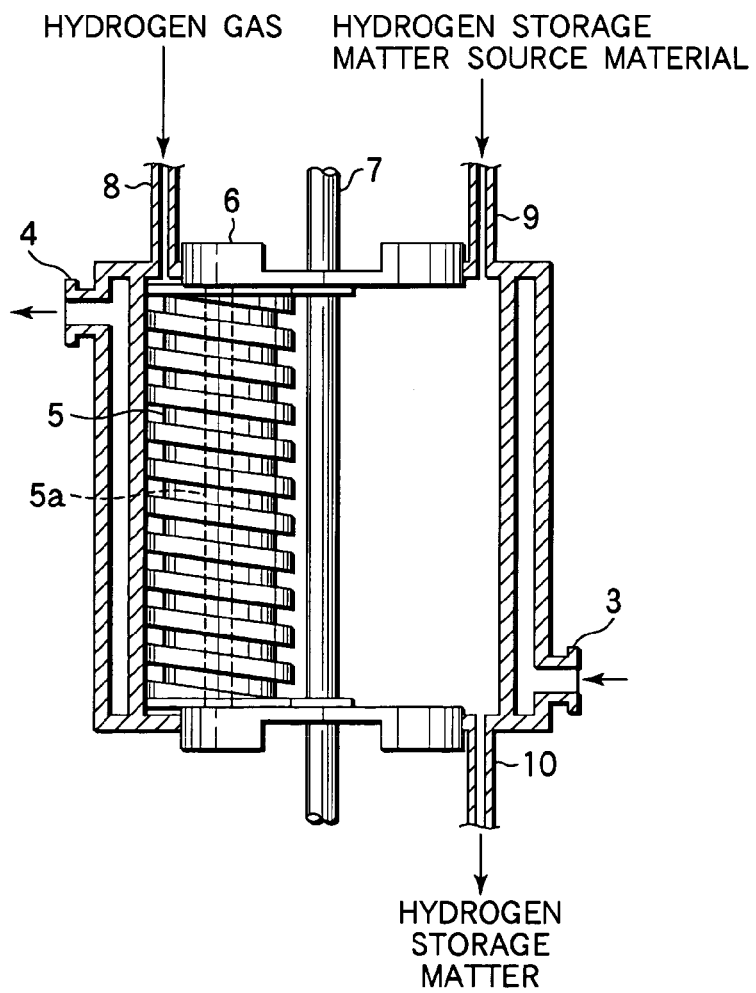
FIG. 17B is a sectional side view schematically showing the structure of the first manufacturing apparatus.

Next, an explanation will be given of a manufacturing apparatus for a hydrogen storage matter. FIG. 17A is a sectional plan view schematically showing the structure of a first manufacturing apparatus. FIG. 17B is a sectional side view schematically showing the structure of the first manufacturing apparatus. This manufacturing apparatus for a hydrogen storage matter is a mill of the high-speed centrifugal roller type. The apparatus includes a cylindrical crushing container 1 surrounded by a water-cooling jacket 2. The water-cooling jacket 2 has a cooling water supply port 3 and a cooling water drain port 4.

Within the crushing container 1, three crushing rollers 5 are disposed along the inner wall of the crushing container 1 such that the longitudinal direction of the rotational axis of each roller aligns with the longitudinal direction of the crushing container 1. Each of the crushing rollers 5 has a spiral groove formed on the peripheral surface, and a rotary shaft 5a extending in the longitudinal direction of the crushing container 1. The opposite ends of the crushing rollers 5 are rotatably supported by a pair of bearing assemblies 6. A rotary shaft 7 is disposed to penetrate the center of the pair of bearing assemblies 6 and crushing container 1. The bearing assemblies 6 are rotated by a drive mechanism (not shown), so that the three crushing rollers 5 integrally perform revolution along the inner wall of the crushing container 1. Further, each of the crushing rollers 5 performs on-axis rotation about the rotary shaft 5a.

The crushing container 1 has, on one end side, a hydrogen introduction port 8 for introducing hydrogen into the crushing container 1, and a source material introduction port 9 for introducing a hydrogen storage matter source material into the crushing container 1. Further, the crushing container 1 has, on the other end side, a material output port 10 for outputting a hydrogen storage matter obtained by crushing the hydrogen storage matter source material.

When the hydrogen storage matter manufacturing apparatus thus structured is used, hydrogen is first supplied through the hydrogen introduction port 8 into the crushing container 1, and the interior of the crushing container 1 is held at a predetermined pressure. In this state, an opening/closing mechanism (not shown) is opened, and a predetermined amount of hydrogen storage matter source material is introduced through the source material introduction port 9 into the crushing container 1.

In this state, the opening/closing mechanism is closed, and crushing of the hydrogen storage matter source material is started. For this crushing, a drive mechanism (not shown) is used to cause on-axis rotation of each of the three crushing rollers 5 attached to the bearing assemblies 6 in a direction shown by an arrow in FIG. 26A, and also cause revolution of the crushing rollers 5 along the inner wall of the crushing container 1 in a direction opposite to the on-axis rotation direction. At this time, cooling water is supplied into the water-cooling jacket 2 to cool the crushing container 1. When the crushing rollers 5 make on-axis rotation and revolution, the hydrogen storage matter source material 11 (see FIG. 17A) is mechanically crushed by compressive force and shearing force between the inner wall of the crushing container 1 and the crushing rollers 5.

In this case, the interior of the crushing container 1 is set to have a hydrogen atmosphere at a predetermined pressure. While the hydrogen storage matter source material 11 is miniaturized by mechanical crushing within the hydrogen atmosphere, hydrogen enters the hydrogen storage matter being miniaturized. Consequently, hydrogen is stored in the surface of the miniaturized hydrogen storage matter and between the crystal grains thereof. After predetermined crushing is finished, a hydrogen storage matter thus obtained is output through the material output port 10.

As a matter of course, the hydrogen storage matter may be a mixture of a metal hydride and a metal amide compound, as described above. Alternatively, the hydrogen storage matter may be a carbonaceous material, such as graphite, amorphous carbon, activated charcoal, carbon nanotube, or fullerene. In this case, there are two types of hydrogen entering form, one of which involves carbon-hydrogen covalent bonds, and the other does not involves the covalent bonds. Of them, hydrogen involving no covalent bonds can be mainly taken out in a reversible manner, and thus is effective as storage hydrogen. Graphite has a larger hydrogen storage function among the carbonaceous materials described above, and thus is preferably used. Since graphite crystals form a lamellar structure, a large amount of hydrogen can be stored in the surface and between the layers thereof during a crushing process performed within a hydrogen atmosphere.

According to this manufacturing apparatus, when a hydrogen storage matter source material is crushed, the crushing rollers 5 make on-axis rotation and revolution. In this case, the hydrogen storage matter source material is crushed with high energy generated by compressive force and shearing force between the inner wall of the crushing container 1 and the crushing rollers 5. Consequently, it is possible to form a hydrogen storage matter with high hydrogen storage ability. In addition, because of its crushing mechanism, the apparatus does not entail such restrictions on the crushing amount that are caused in planetary ball mills, and thus the apparatus can adequately meet mass production.

In the first manufacturing apparatus, the source material introduction port 9 and material output port 10 may be provided with a hydrogen storage matter source material introducing mechanism and a hydrogen storage matter output mechanism (both of them are not shown), respectively, which can be held at the same hydrogen pressure as the hydrogen pressure inside the crushing container 1. In this case, a hydrogen storage matter source material can be continuously introduced into the crushing container 1, and the crushed hydrogen storage matter can be continuously output from the crushing container 1.

A metal component having the function of dissociating hydrogen molecules to hydrogen atoms may be added in the middle of mechanically crushing a hydrogen storage matter source material, to increase the hydrogen storage amount. In order to perform such metal component addition, for example, a metal component introduction port may be formed on the same end side of the crushing container 1 as that of the source material introduction port 9. Further, this introduction port may be connected to a metal component container which can store a metal component of this kind and maintain a hydrogen atmosphere inside. In this case, an opening/closing mechanism is disposed to open and close the interface between the metal component container and crushing container 1. When this arrangement is used, the hydrogen pressure inside the crushing container 1 is measured, and the metal component container is set to have the same hydrogen pressure as that inside the crushing container 1. Then, the opening/closing mechanism is opened, and the metal component is introduced into the crushing container 1. An example of such a metal component having the function described above is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

In the first manufacturing apparatus, the crushing container 1 is stationary, while the crushing rollers 5 make on-axis rotation and revolution to perform crushing. Further, the crushing container 1 itself may be additionally rotated. In this case, the crushing container 1 is preferably rotated in a direction opposite to the revolution direction of the crushing rollers 5, so as to perform crushing with higher energy. Alternatively, the crushing rollers 5 may be configured to make only on-axis rotation, with the crushing container 1 being rotated. The groove formed on the crushing rollers 5 is not limited to a spiral, and it may be circular or in another shape.

Figure 18:
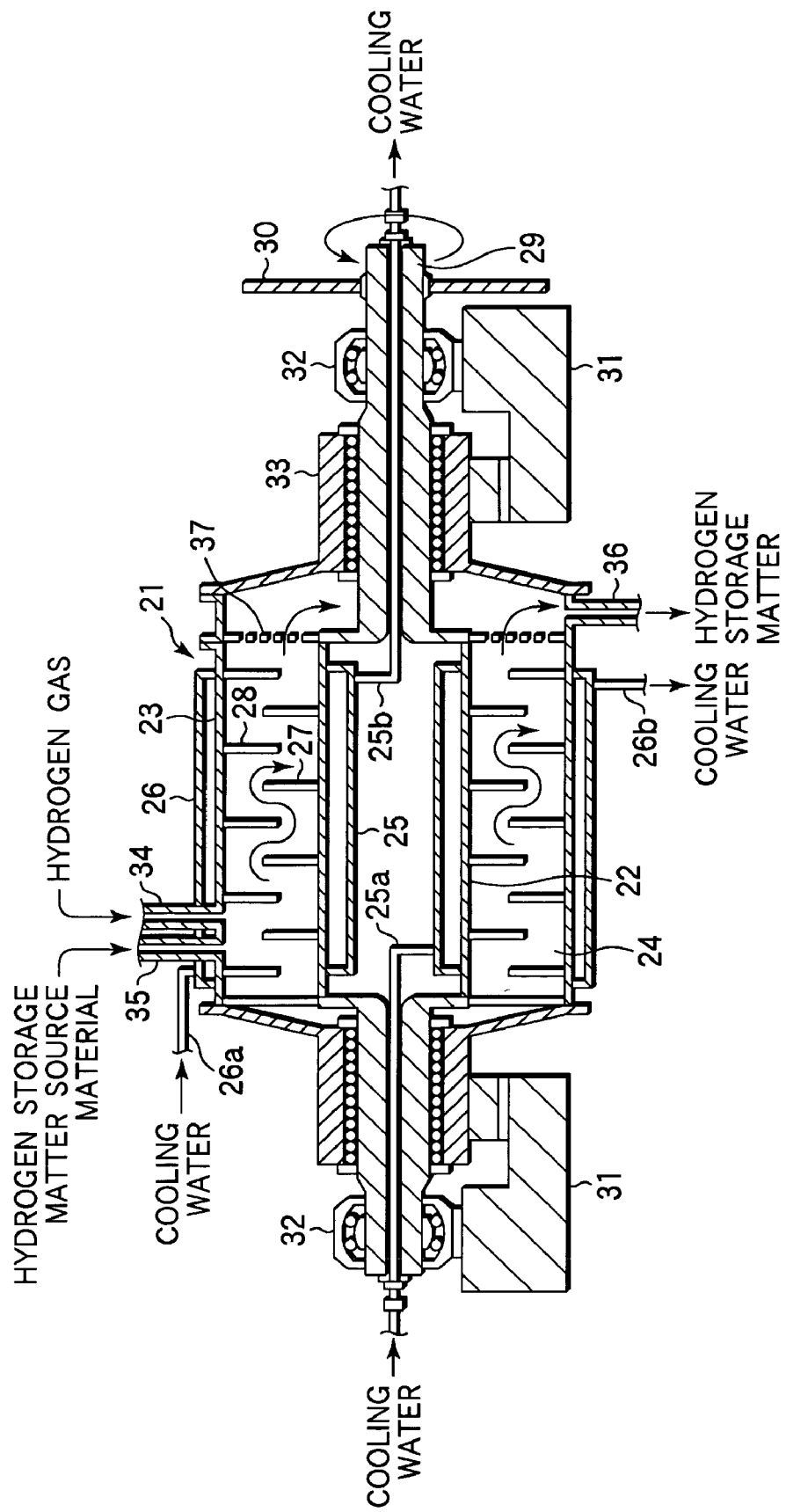
FIG. 18 is a sectional view schematically showing the structure of a second manufacturing apparatus.

FIG. 18 is a sectional view schematically showing a second manufacturing apparatus. This manufacturing apparatus for a hydrogen storage matter is formed of a rotation type mill with inner and outer cylinders. The apparatus includes a crushing container 21 in which an inner cylinder 22 and an outer cylinder 23 are coaxially disposed to form an annular crushing chamber 24 between the inner cylinder 22 and outer cylinder 23. The inner cylinder 22 is provided with a water-cooling jacket 25 disposed inside for the inner cylinder, while the outer cylinder 23 is provided with a water-cooling jacket 26 disposed outside for the outer cylinder. The inner cylinder water-cooling jacket 25 is connected to a cooling water supply tube 25a and a cooling water drain tube 25b. The outer cylinder water-cooling jacket 26 is connected to a cooling water supply tube 26a and a cooling water drain tube 26b.

The inner cylinder 22 of the crushing container 21 has a plurality of agitation fins 27 vertically extending from the outer surface. The outer cylinder 23 has a plurality of agitation fins 28 vertically extending from the inner surface. These agitation fins 27 and 28 are used to agitate a hydrogen storage matter within the annular crushing chamber 24.

Rotary shafts 29 are respectively fixed to the opposite ends of the inner cylinder 22 and extending in the longitudinal direction of the inner cylinder 22. Each of the rotary shafts 29 is provided with a drive sprocket 30 fixed thereon, through which the inner cylinder 22 is rotated by a drive mechanism (not shown) in a direction shown by an arrow in FIG. 18. The rotary shafts 29 are rotatably supported by a stationary pedestal 31 through bearings 32. On the other hand, the outer cylinder 23 is fixed to the stationary pedestal 31, and bearings 33 are disposed between the outer cylinder 23 and rotational shafts.

Near one end side of the crushing container 21, the outer cylinder 23 has, at the top, a hydrogen introduction port 34 for introducing hydrogen into the crushing container 21, i.e., into the annular crushing chamber 24, and a source material introduction port 35 for introducing a hydrogen storage matter source material into the annular crushing chamber 24. Further, near the other end side of the crushing container 21, the outer cylinder 23 has, at the bottom, a material output port 36 for outputting a hydrogen storage matter, obtained by crushing the hydrogen storage matter source material, from the annular crushing chamber 24 inside the crushing container 21. The annular crushing chamber 24 has a separation mesh plate 37 near the material output port 36.

Figure 19:
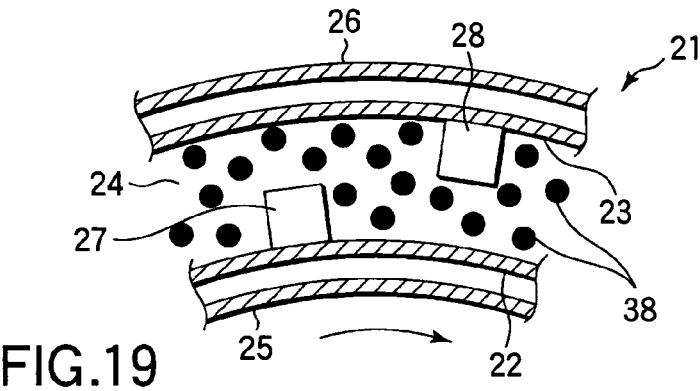
FIG. 19 is a view schematically showing a crushing operation performed by the second manufacturing apparatus.

When the hydrogen storage matter manufacturing apparatus thus structured is used, crushing media or crushing balls 38 are placed in advance in the annular crushing chamber 24 of the crushing container 21, as shown in FIG. 19. Then, hydrogen is supplied through the hydrogen introduction port 34 into the annular crushing chamber 24 of the crushing container 21, and the interior of the annular crushing chamber 24 is held at a predetermined pressure. In this state, an opening/closing mechanism (not shown) is opened, and a predetermined amount of hydrogen storage matter source material is introduced through the source material introduction port 35 into the annular crushing chamber 24.

In this state, the opening/closing mechanism is closed, and crushing of the hydrogen storage matter source material is started. For this crushing, a drive mechanism (not shown) is used to rotate the inner cylinder 22 in the arrow direction through the drive sprocket 30 and rotary shafts 29. At this time, cooling water is supplied into the water-cooling jackets 25 and 26 to cool the inner cylinder 22 and outer cylinder 23.

Figure 28:
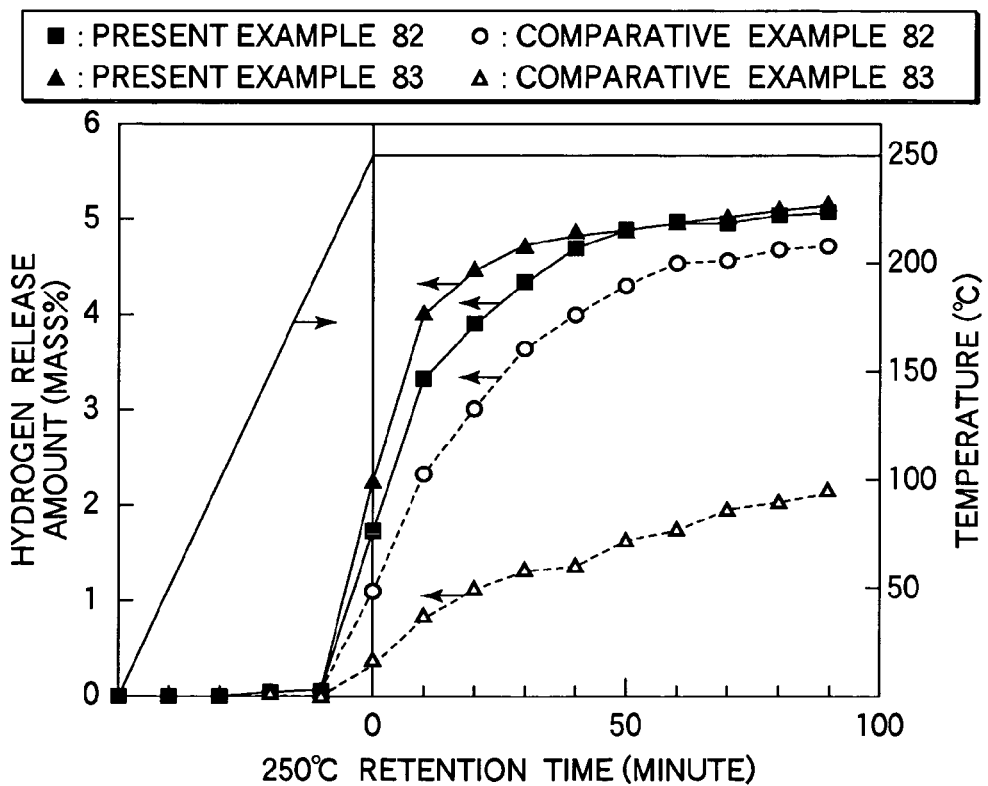
FIG. 28 is a graph showing the relationship between the temperature and hydrogen release amount according to present examples 82 and 83 and comparative examples 82 and 83.

When the inner cylinder 22 is rotated, the crushing balls 38 are moved around by the agitation fins 27 and 28, as shown in FIG. 28. With the energy of the crushing balls thus moved, the hydrogen storage matter source material is mechanically crushed, and moved toward the material output port 36, as shown in FIG. 18. A hydrogen storage matter thus formed is output through the separation mesh plate 37 and then through the material output port 36.

In this case, the interior of the annular crushing chamber 24 is set to have a hydrogen atmosphere at a predetermined pressure. While the hydrogen storage matter source material is miniaturized by mechanical crushing within the hydrogen atmosphere, hydrogen enters the hydrogen storage matter being miniaturized. Consequently, hydrogen is stored in the surface and/or internal portion of the miniaturized hydrogen storage matter. The internal portion includes portions between crystal grains, between layers, and in defects.

According to this second manufacturing apparatus, when a hydrogen storage matter source material is crushed, a relative rotational shift is caused between the inner cylinder 22 and outer cylinder 23 to move around the crushing media or crushing balls 38. In this case, the hydrogen storage matter source material is crushed with high energy generated at this time, so a hydrogen storage matter with high hydrogen storage ability can be formed. In addition, because of its crushing mechanism, the apparatus does not entail such restrictions on the crushing amount that are caused in planetary ball mills, and thus the apparatus can adequately meet mass production.

Also in the second manufacturing apparatus, the source material introduction port 35 and material output port 36 may be provided with a hydrogen storage matter source material introducing mechanism and a hydrogen storage matter output mechanism (both of them are not shown), respectively, which can be held at the same hydrogen pressure as the hydrogen pressure inside the annular crushing chamber 24. In this case, a hydrogen storage matter source material can be continuously introduced into the annular crushing chamber 24, and the crushed hydrogen storage matter can be continuously output from the annular crushing chamber 24.

A metal component having the function of dissociating hydrogen molecules to hydrogen atoms may be added in the middle of mechanically crushing a hydrogen storage matter source material. In this case, a method basically the same as in the first manufacturing apparatus can be adopted.

In the second manufacturing apparatus, only the inner cylinder 22 is rotated. Alternatively, it may be arranged such that only the outer cylinder 23 is rotated. Further, it may be arranged such that both of the inner cylinder 22 and outer cylinder 23 are rotated in opposite directions. In this case, the agitation force is increased, so the hydrogen storage matter source material is crushed with higher energy.

Figure 20:
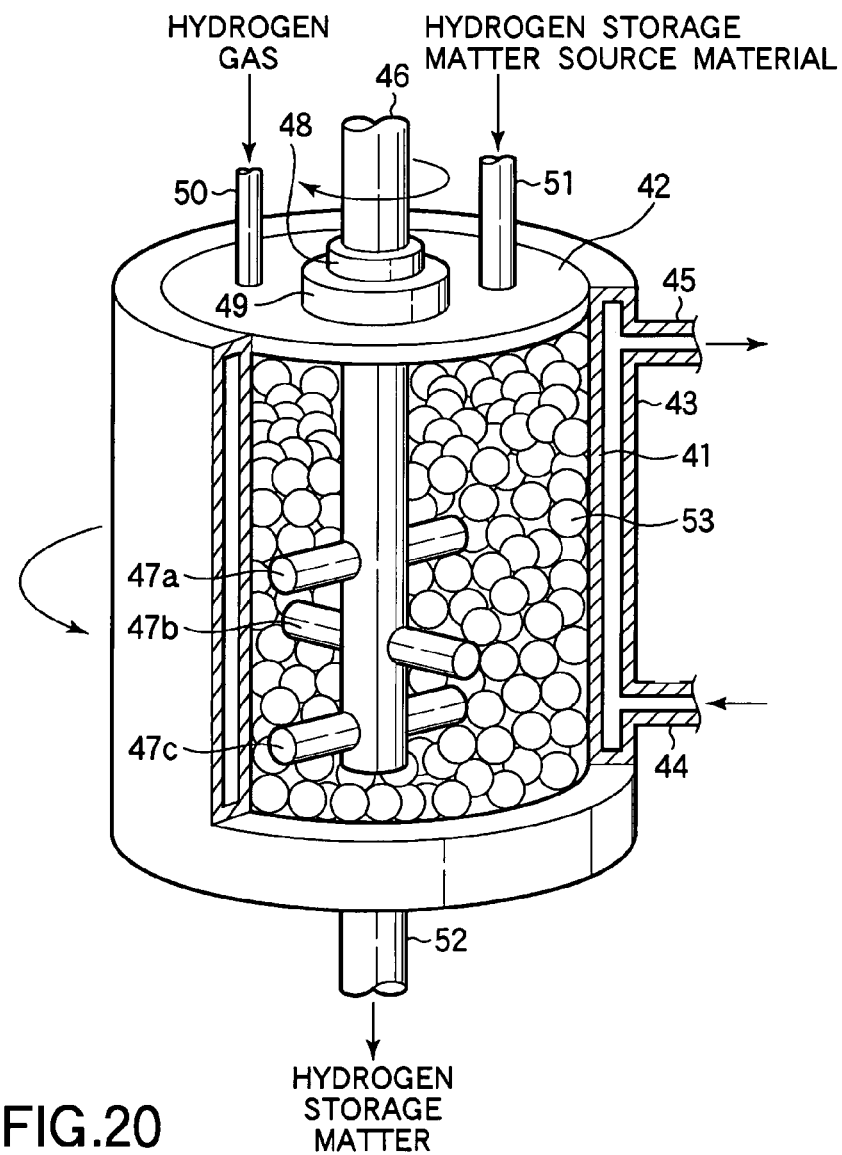
FIG. 20 is a partially cutout perspective view schematically showing the structure of a third manufacturing apparatus.

FIG. 20 is a partially cutout perspective view showing a third manufacturing apparatus. This manufacturing apparatus for a hydrogen storage matter is of the atrighter type. The apparatus includes a cylindrical crushing container 41 with the longitudinal direction vertically extending. The crushing container 41 is rotatable by a drive mechanism (not shown) in a direction shown by an arrow, while a pair of end side members 42 covering the open ends on the opposite sides are stationary. The crushing container 41 is surrounded by a water-cooling jacket 43, which has a cooling water supply port 44 and a cooling water drain port 45.

At the center of the crushing container 41, a rotary shaft 46 is inserted in the longitudinal direction of the crushing container 41. The rotary shaft 46 is provided with three impellers 47*a*, 47*b*, and 47*c* disposed in this order from the upper side and extending perpendicularly to the rotary shaft 46. These impellers 47*a*, 47*b*, and 47*c* are arranged such that two impellers adjacent to each other extend perpendicularly to each other. The rotary shaft 46 is rotated along with the impellers 47*a*, 47*b*, and 47*c* by a drive mechanism (not shown) in a direction shown by an arrow, which is opposite to the rotation direction of the crushing container 41. In FIG. 20, reference symbols 48 and 49 denote a gas seal and a bearing, respectively.

The upper end side member 42 has a hydrogen introduction port 50 for introducing hydrogen into the crushing container 41, and a source material introduction port 51 for introducing a hydrogen storage matter source material into the crushing container 41. Further, the lower end side member 42 has a material output port 52 for outputting a hydrogen storage matter, obtained by crushing the hydrogen storage matter source material, from the crushing container 41.

When the hydrogen storage matter manufacturing apparatus thus structured is used, crushing media or crushing balls 53 are placed in advance in the crushing container 41, as shown in FIG. 20. Then, hydrogen is supplied through the hydrogen introduction port 50 into the crushing container 41, and the interior of the crushing container 41 is held at a predetermined pressure. In this state, an opening/closing mechanism (not shown) is opened, and a predetermined amount of hydrogen storage matter source material is introduced through the source material introduction port 51 into the crushing container 41.

In this state, the opening/closing mechanism is closed, and crushing of the hydrogen storage matter source material is started. For this crushing, a drive mechanism (not shown) is used to rotate the crushing container 41 in the arrow direction, and also rotate the rotary shaft 46 along with the impellers 47*a*, 47*b*, and 47*c* in a direction opposite to the crushing container 41. At this time, cooling water is supplied into the water-cooling jacket 43 to cool the crushing container 41.

When the crushing container 41 and impellers 47*a*, 47*b*, and 47*c* are rotated, the crushing balls 53 are moved around. With the energy of the crushing balls 53 thus moved, the hydrogen storage matter source material is mechanically crushed.

In this case, the interior of the crushing container 41 is set to have a hydrogen atmosphere at a predetermined pressure. While the hydrogen storage matter source material is miniaturized by mechanical crushing within the hydrogen atmosphere, hydrogen enters the hydrogen storage matter being miniaturized. Consequently, hydrogen is stored in the surface of the miniaturized hydrogen storage matter and between the crystal grains thereof. After predetermined crushing is finished, a hydrogen storage matter thus obtained is output through the material output port 52.

According to this third manufacturing apparatus, when a hydrogen storage matter source material is crushed, the crushing container 41 and impellers 47*a*, 47*b*, and 47*c* are rotated to move around the crushing media or crushing balls 53. In this case, the hydrogen storage matter source material is crushed with high energy generated at this time, so a hydrogen storage matter with high hydrogen storage ability can be formed. In addition, because of its crushing mechanism, the apparatus does not entail such restrictions on the crushing amount that are caused in planetary ball mills, and thus the apparatus can adequately meet mass production.

Also in the third manufacturing apparatus, the source material introduction port 51 and material output port 52 may be provided with a hydrogen storage matter source material introducing mechanism and a hydrogen storage matter output mechanism (both of them are not shown), respectively, which can be held at the same hydrogen pressure as the hydrogen pressure inside the crushing container 41. In this case, a hydrogen storage matter source material can be continuously introduced into the crushing container 41, and the crushed hydrogen storage matter can be continuously output from the crushing container 41.

A metal component having the function of dissociating hydrogen molecules to hydrogen atoms may be added in the middle of mechanically crushing a hydrogen storage matter source material. In this case, a method basically the same as in the first manufacturing apparatus can be adopted.

Figure 21:
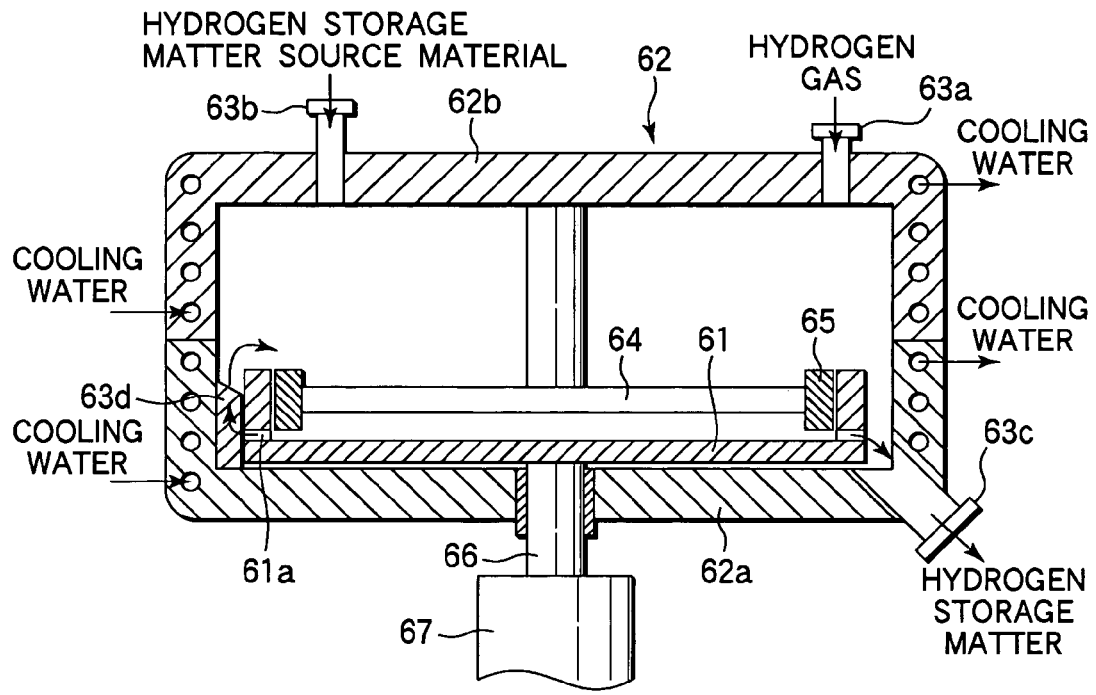
FIG. 21 is a sectional view schematically showing the structure of a fourth manufacturing apparatus.

FIG. 21 is a sectional view schematically showing a fourth manufacturing apparatus. This manufacturing apparatus includes a bottomed cylindrical crushing container 61 and a housing 62. The crushing container 61 has, at a lower portion of the sidewall, an outlet port 61*a* for outputting a hydrogen storage matter obtained by crushing a hydrogen storage matter source material. The housing 62 is configured to accommodate the crushing container 61 and maintain a predetermined gas atmosphere therein.

The housing 62 includes a lower shell 62*a* and a lid 62*b*, wherein the lower shell 62*a* is fixed to a frame or the like (not shown) of the manufacturing apparatus, while the lid 62*b* is movable up and down by an elevating mechanism (not shown). When the lid 62*b* is pushed onto the lower shell 62*a* by a predetermined force, the lower shell 62*a* is airtightly sealed by the lid 62*b* with, e.g., a copper seal ring (not shown) interposed therebetween. For example, a clamp or the like may be used to clamp the lower shell 62*a* and lid 62*b* from outside, thereby airtightly sealing the contact surfaces.

The lower shell 62a and lid 62b have a jacket structure in which cooling water can be circulated. The lid 62b has a hydrogen introduction port 63a for introducing hydrogen into the housing 62, and a source material introduction port 63b for introducing a hydrogen storage matter source material into the crushing container 61 while maintaining a hydrogen atmosphere inside the housing 62. On the other hand, the lower shell 62a has a material output port 63c for outputting part of a hydrogen storage matter discharged from the crushing container 61 through outlet ports 61a. Further, the lower shell 62a has a circulation blade 63d for returning, into the crushing container 61, part of the hydrogen storage matter discharged from the crushing container 61 through the outlet ports 61a.

Inside the crushing container 61, two inner pieces 65 each having a columnar curved surface (see FIG. 31 described later) are supported by a holder member 64, such that a predetermined gap is formed between the columnar curved surface and the sidewall inner surface of the crushing container 61. The number of inner pieces 65 is not limited to two, and it may be one, three, or more. The holder member 64 is attached to the lid 62b and moved up and down along with the lid 62b.

The crushing container 61 is connected to a motor 67 by a pivot shaft 66, which airtightly penetrates the bottom of the lower shell 62a. The crushing container 61 is rotated by the motor 67, while the gap width between the crushing container 61 and inner pieces 65 is substantially unchanged. It may be arranged such that the holder member 64 is not fixed to the lid 62b, but rotatably penetrates the lid 62b, while the crushing container 61 is rotatable or not rotatable.

When the hydrogen storage matter manufacturing apparatus thus structured is used, hydrogen is first supplied through the hydrogen introduction port 63a into the housing 62 to replace gas inside the housing 62 with hydrogen, and the interior of the housing 62 is preferably held at a predetermined positive pressure. Then, the motor 67 is operated at a predetermined rotational speed, and preferably set at a stable rotational speed. In this state, a predetermined amount of hydrogen storage matter source material is introduced through the source material introduction port 63b into the crushing container 61.

Figure 22:
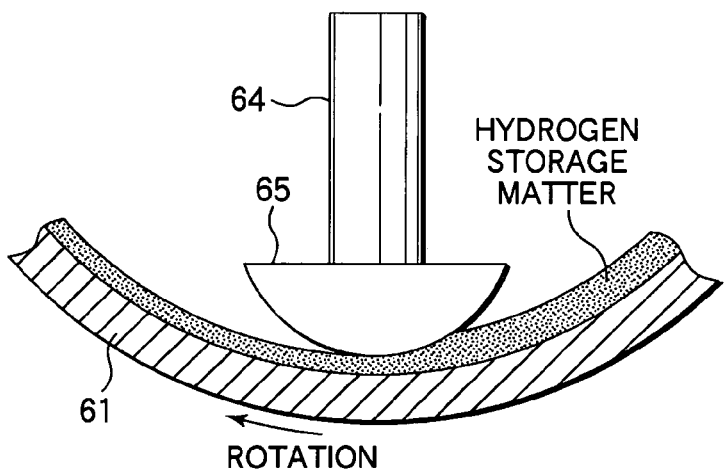
FIG. 22 is a view showing a crushing manner performed by the fourth manufacturing apparatus.

FIG. 22 is an explanation view schematically showing a part of the crushing container 61 from above to show a crushing manner performed on the hydrogen storage matter source material introduced into the crushing container 61. The hydrogen storage matter source material introduced into the housing 62 is moved toward the sidewall of the crushing container 61 by airflow generated by rotation of the crushing container 61 and collision with the bottom of the crushing container, and pinched between the sidewall of the crushing container 61 and inner pieces 65. At this time, the hydrogen storage matter source material receives compressive force and shearing force and is mechanically and finely crushed. The magnitude of the compressive force and shearing force can be changed by adjusting the rotational speed of the crushing container 61, and the amount of hydrogen storage matter source material introduced at a time. According to this inner piece type manufacturing apparatus for a hydrogen storage matter, the hydrogen storage matter source material is crushed with high energy generated by rotation of the crushing container 61, so a hydrogen storage matter with high hydrogen storage ability can be formed.

The sidewall of the crushing container 61 has the outlet ports 61a on the lower side, and the finely crushed hydrogen storage matter (including the hydrogen storage matter source material) is gradually discharged from the crushing container 61 through the outlet ports 61a. Some part of the hydrogen storage matter thus discharged from the crushing container 61 is stirred up by the synergy of the circulation blade 63d disposed in the housing 62 with airflow generated within the housing 62, and is returned to the crushing container 61 and further subjected to the crushing process. Other part of the hydrogen storage matter thus discharged from the crushing container 61 is output from the housing 62 through the material output port 63c, and collected in a collection container or the like (not shown). If a hydrogen storage matter tends to be deposited on the sidewall inner surface of the crushing container 61, a member for scraping such deposit may be disposed.

When no hydrogen storage matter is output from the material output port 63c any more, a predetermined amount of hydrogen storage matter source material is introduced again through the source material introduction port 63b into the crushing container 61 to repeat the process described above.

The hydrogen storage matter source material is introduced into the crushing container 61 by a batch manner as described above, but this is not limiting. Also in this manufacturing apparatus, the source material introduction port 63b and material output port 63c may be provided with a hydrogen storage matter source material introducing mechanism and a hydrogen storage matter output mechanism (both of them are not shown), respectively, which can be held at the same hydrogen pressure as the hydrogen pressure inside the housing 62. In this case, a hydrogen storage matter source material can be continuously introduced into the crushing container 61 so that a certain amount of hydrogen storage matter is always present in the crushing container 61, and the crushed hydrogen storage matter can be continuously output from the housing 62.

As described above, also in the fourth manufacturing apparatus, because of its crushing mechanism, the apparatus does not entail such restrictions on the crushing amount that are caused in planetary ball mills, and thus the apparatus can adequately meet mass production. A metal component having the function of dissociating hydrogen molecules to hydrogen atoms may be added in the middle of mechanically crushing a hydrogen storage matter source material. In this case, a method basically the same as in the first manufacturing apparatus can be adopted.

Next an explanation will be given of a hydrogen storage matter fabricated by the various manufacturing apparatuses described above. The following explanation will be directed to results obtained where graphite was used as a hydrogen storage matter (present examples 71 to 74 and a comparative example 71), and results obtained where a mixture of a lithium hydride and a metal amide compound was used as a hydrogen storage matter (present examples 75 to 78 and a comparative example 72).

PRESENT EXAMPLE 71

The present example 71 employed a manufacturing apparatus for a hydrogen storage matter, which was a mill of the high-speed centrifugal roller type, basically the same as that shown in FIGS. 17A and 17B. However, this apparatus had a rotatable crushing container as well as rotatable crushing rollers. The crushing container had an inner volume of 5 L, and the inner wall and rollers were made of zirconia. The container and rollers were rotatable in the same direction or opposite directions, but the present example used rotation in opposite directions. The crushing container was set at a rotational speed of 250 rpm, the crushing rollers was set at a rotational speed of 2,000 rpm, and the input amount of graphite powder was set at 50 g.

PRESENT EXAMPLE 72

The present example 72 employed a manufacturing apparatus for a hydrogen storage matter, which was a rotation type mill with inner and outer cylinders, basically the same as that shown in FIG. 18. However, this apparatus had a rotatable outer cylinder as well as a rotatable inner cylinder. The inner cylinder and outer cylinder were disposed to have a common rotational axis horizontally extending. The inner cylinder had an outer diameter of φ152 mm, the outer cylinder had an inner diameter of φ254 mm, and an annular crushing chamber having a length of 510 mm was formed between the inner cylinder and outer cylinder. Crushing balls (with a diameter of 10 mm) made of zirconia were contained in the annular crushing chamber at an apparent filling ratio of 80%. The inner cylinder outer surface and outer cylinder inner surface were provided with a plurality of plate-like agitation fins. The inner cylinder and outer cylinder were rotated in opposite directions each at a rotational speed of about 120 rpm. The input amount of graphite powder was set at 530 g.

PRESENT EXAMPLE 73

Figure 29:
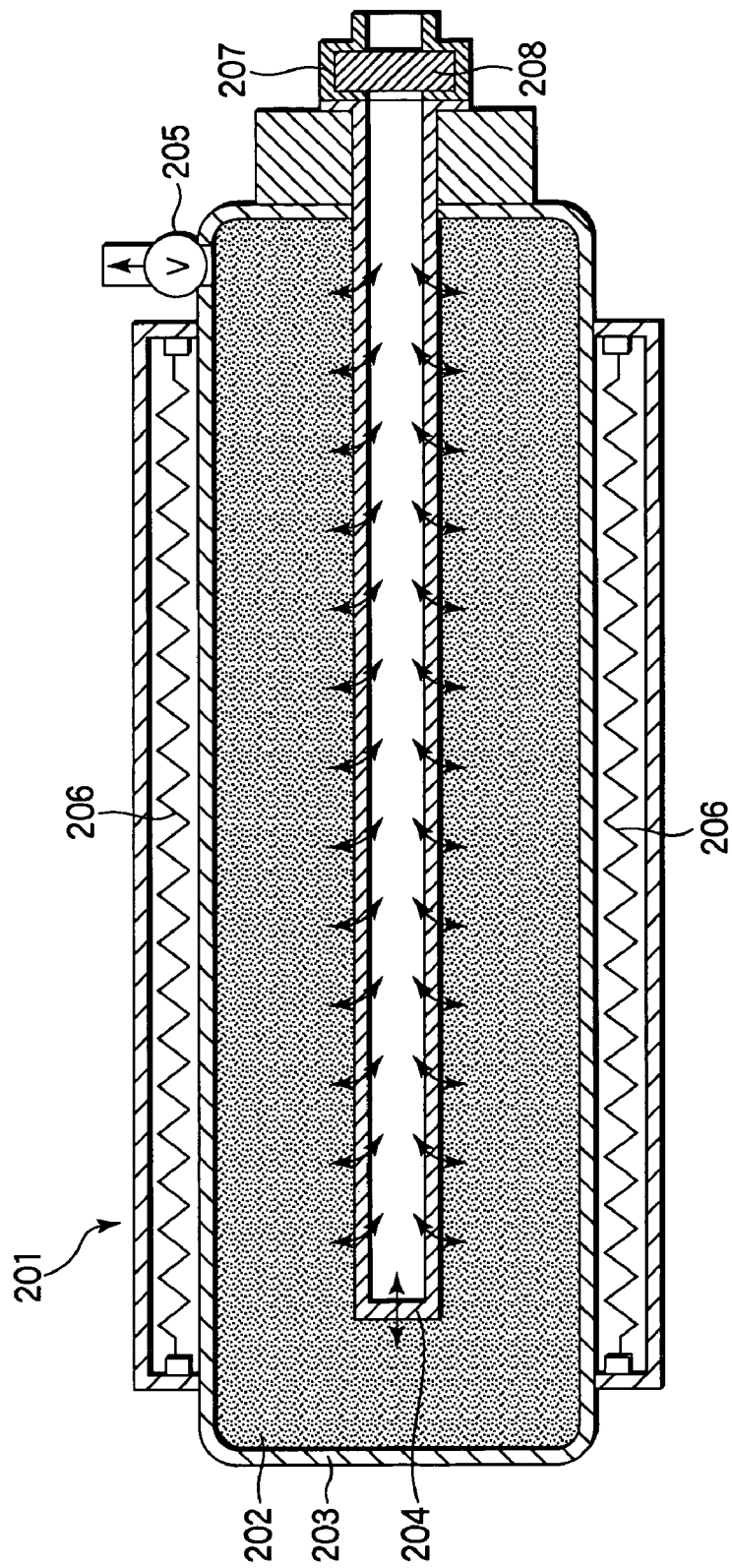
FIG. 29 is a sectional view schematically showing the structure of a first hydrogen storage matter packing container.

The present example 73 employed a manufacturing apparatus for a hydrogen storage matter, which was of the atrighter type, basically the same as that shown in FIG. 29. This apparatus had a crushing container with a volume of 5.4 L, and the crushing balls made of zirconia with a diameter of 5 mm. The impellers and crushing container were rotated in opposite directions, with the impellers at a rotational speed of 250 rpm and the crushing container at a rotational speed of 60 rpm. The input amount of graphite powder was set at 500 g.

PRESENT EXAMPLE 74

The present example 74 employed a manufacturing apparatus for a hydrogen storage matter, which was an inner piece type mill, basically the same as that shown in FIG. 21. This apparatus had a crushing container with a volume of 10 L, and two inner pieces made of zirconia. While a hydrogen atmosphere at 1 MPa was maintained inside the housing, the crushing container was set at a rotational speed of 1,500 rpm, and the input amount of graphite powder was set at 500 g.

COMPARATIVE EXAMPLE 71

In the comparative example 71, 2 g of graphite powder was introduced into a mill container made of zirconia with an inner volume of 250 cm$^3$. Then, the interior of the mill container was vacuum-exhausted, and hydrogen was supplied into the mill container to set the pressure inside the mill container at 1 MPa. Then, mechanically crushing was performed by a planetary ball mill apparatus (manufactured by Fritsch Co., Ltd., P5) at room temperature or 20° C. and at a revolution speed of 250 rpm for a predetermined time. As crushing balls, 60 balls (φ10 mm) made of zirconia and having almost the same composition and hardness as those of the container were used. The mill container had connection valves for performing hydrogen introduction and vacuum-exhaust, and a sample introduction valve for adding a metal or alloy having the function of dissociating hydrogen molecules to hydrogen atoms.

(Items Common to Present Examples 71 to 74 and Comparative Example 71)
(Sample and Processes Before and After Mechanical Crushing)

Graphite powder (artificial graphite manufactured by Kishida Chemical Co., Ltd. with an average particle diameter of 36 μm) was put in each of the crushing containers described above. Then, the interior of the crushing container (or the interior of the housing in the case of the present example 74) was vacuum-exhausted, and hydrogen was supplied into the crushing container to set the pressure inside the crushing container at 1 MPa. Then, milling was performed by the corresponding manufacturing apparatus at room temperature or 20° C. for a predetermined time to mechanically crush the graphite powder. At this time, "G1 7N" was used as hydrogen.

(Sample Output)

Each sample thus milled was transferred within a maintained hydrogen atmosphere into a container having a valve and attached to the output portion of the corresponding manufacturing apparatus for a hydrogen storage matter. Then, the interior of the container was vacuum-exhausted, and high-purity argon (Ar) was supplied thereinto. At this time, "α2 6N" was used as Ar.

(Measurement of Hydrogen Release Amount)

Graphite contained in a heating container, which had been vacuum-exhausted, was heated by an electric furnace from room temperature to 900° C. at a temperature-up rate of 10° C./minute. Gas emitted from the graphite was cooled to 20° C., and the gas pressure was measured by a pressure gauge and the gas was collected in a gas cylinder. The emitted gas was introduced through a tube into a gas chromatograph (manufactured by Shimadzu Corporation, GC9A, TCD detector, column: Molecular Sieve5A), and the hydrogen amount therein was measured. In order to define a value of the hydrogen storage amount, the hydrogen amount thus measured was divided by the graphite amount before heating.

(Measurement of Average Particle Diameter)

Before and after the milling, each sample was dispersed in ethanol, and the average particle diameter thereof was measured by an LA-920 manufactured by HORIBA Co., Ltd.

(Test Result)

Figure 23:
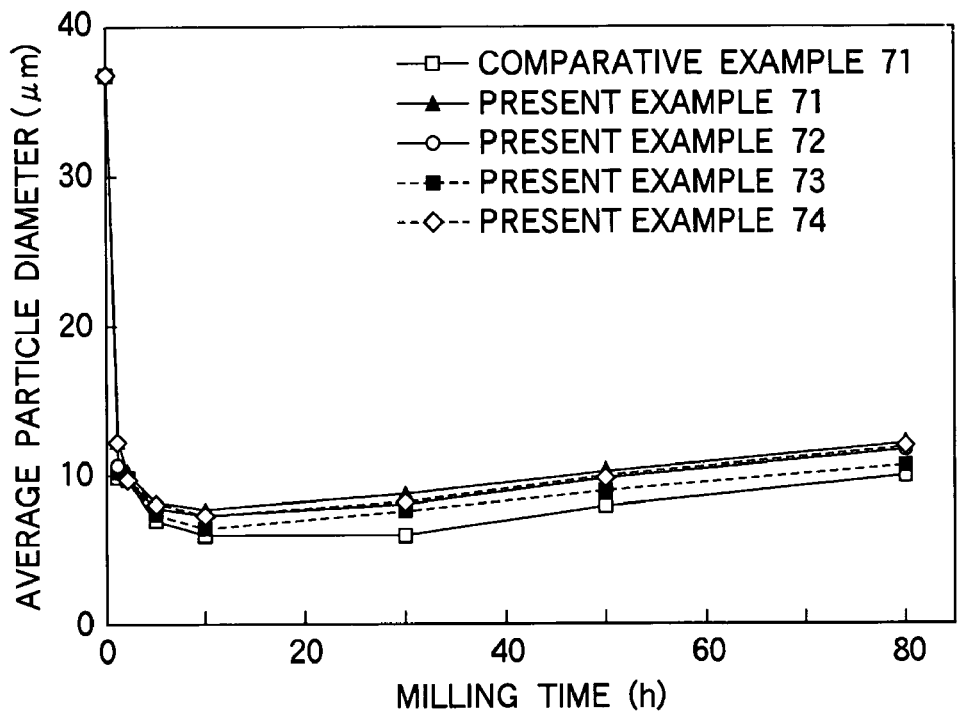
FIG. 23 is a graph showing the relationship between the milling time and the average particle diameter of hydrogen storage matters according to present examples 71 to 74 and a comparative example 71.
Figure 24:
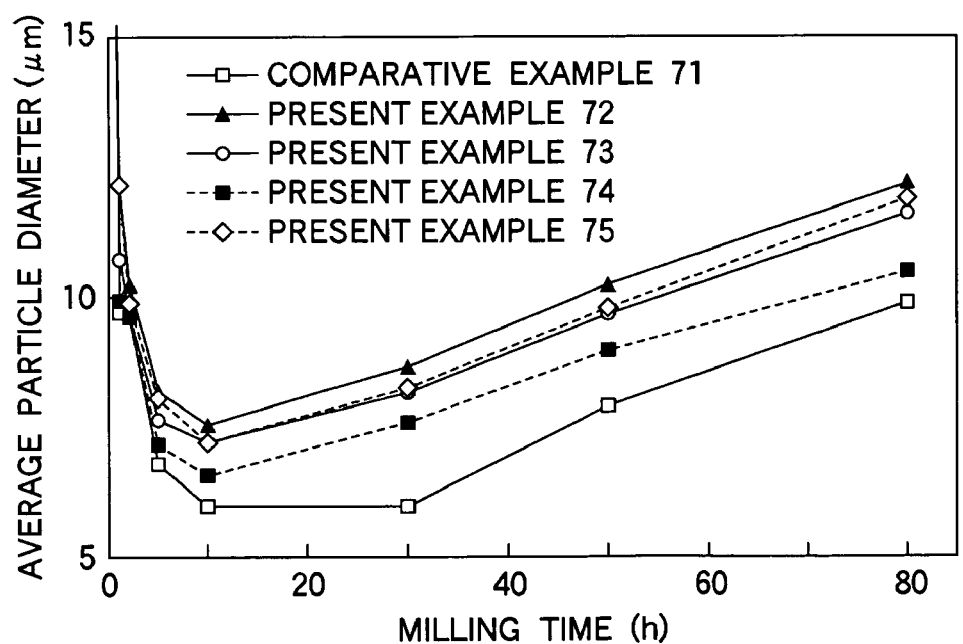
FIG. 24 is an enlarged graph showing the relationship between the milling time and the average particle diameter of hydrogen storage matters shown in FIG. 23.

FIG. 23 is a graph showing the relationship between the milling time of each manufacturing apparatus and the average particle diameter of hydrogen storage matters. FIG. 24 is an enlarged view of the graph shown in FIG. 23. As shown in FIGS. 23 and 24, the comparative example 71 using a planetary ball mill rendered an increase in the average particle diameter (agglomeration), due to a mechanochemical phenomenon, when the milling time became 30 hours or more. On the other hand, the present example 71 using a roller mill, the present example 72 using a rotation type mill with inner and outer cylinders, the present example 73 using an atrighter, and the present example 74 using an inner piece type mill rendered an increase in the average particle diameter, due to effects given by compressive force and shearing force, when the milling time became 10 hours or more, which was shorter than that obtained by the comparative example 71 using a planetary ball mill.

Figure 25:
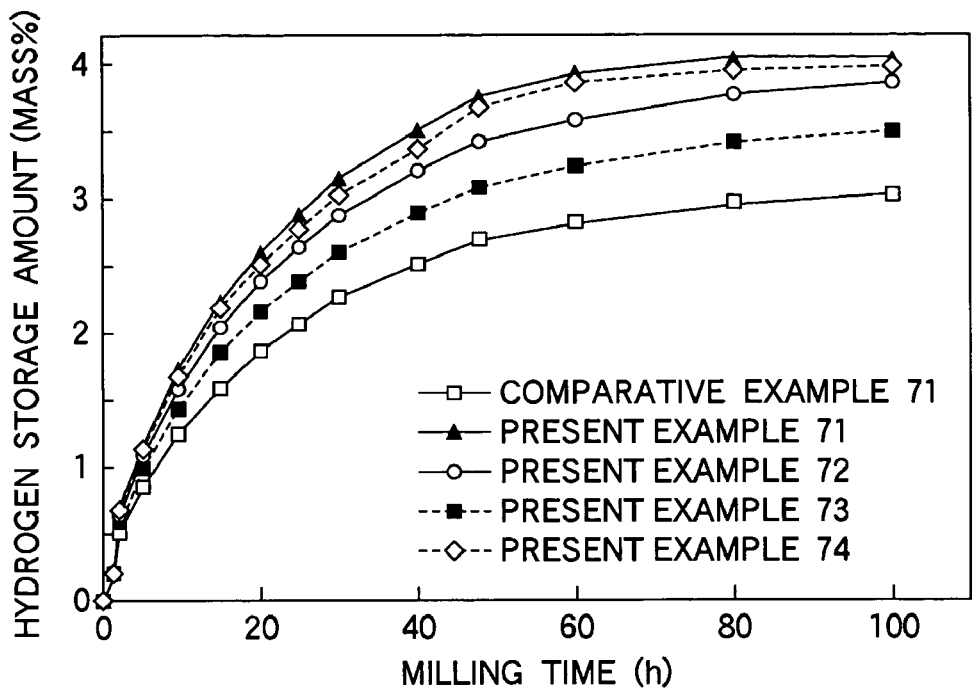
FIG. 25 is a graph showing the relationship between the milling time and the hydrogen storage amount according to present examples 71 to 74 and a comparative example 71.

FIG. 25 is a graph showing the measurement result concerning the hydrogen release amount of the hydrogen storage matters formed as described above. As shown in FIG. 25, it was confirmed that the apparatuses according to the present examples 71 to 74 provided a larger hydrogen storage amount, i.e., increased the hydrogen storage amount, as compared to the planetary ball mill, although, as described above, the present examples 71 to 74, which used a roller mill, a rotation type mill with inner and outer cylinders, an atrighter, and an inner piece type mill, respectively, rendered an increase in the average particle diameter in a shorter time than that of the comparative example 71 using a planetary ball mill. Further, the planetary ball mill is difficult to increase the scale, and is not suitable for industrialization. In contrast, it has been confirmed that the apparatuses according to the present examples are suitable for industrialization, and make it possible to perform mass production of hydrogen storage matters.

PRESENT EXAMPLES 75 TO 178 AND COMPARATIVE EXAMPLES 72

(Source Material Preparation and Crushing Process (Hydrogen Charge Process))

As starting materials, lithium amide ($LiNH_2$ with a purity of 95%, manufactured by Sigma-Aldrich Co., Ltd.) and lithium hydride (LiH with a purity of 95%, manufactured by Sigma-Aldrich Co., Ltd.) were weighed at a molar ratio of 1:1 within a high-purity Ar atmosphere glove box. Further, as a catalyst, chromium chloride ($CrCl_3$, manufactured by Sigma-Aldrich Co., Ltd.) was also weighed relative to the Li total amount at an atomic ratio of 0.05:1 within the box. Their total amount was set at 100 g. The source material was transferred to an airtight source material container, and introduced into a manufacturing apparatus for a hydrogen storage matter (a roller mill for the present example 75; an rotation type mill with inner and outer cylinders for the present example 76; an atrighter for the present example 77; an inner piece type mill for the present example 78; an airflow crushing type mill for the present example 109; and a planetary ball mill for the comparative example 72). At this time, the interior of the manufacturing apparatus was set to have a high-purity Ar atmosphere, so that the source material was not exposed to air. For each apparatus, a crushing and mixing process was performed for different predetermined times, and then a hydrogen storage matter thus obtained was transferred to a sample container having a vacuum atmosphere formed therein, so that the hydrogen storage matter was not exposed to air (Measurement of Hydrogen Release Amount)

A hydrogen storage matter contained in a reaction container, which had been vacuum-exhausted, was heated by an electric furnace from room temperature to 250° C. at a temperature-up rate of 10° C./minute, and retained at 250° C. for 90 minutes. During retention at 250° C., the emitted gas pressure was adjusted to be 20 kPa or less by a buffer container, and the emitted gas was collected in a gas cylinder when a predetermined time elapsed from the start of retention at 250° C. The gas thus collected was cooled to 20° C., and the emitted gas pressure was measured by a pressure gauge. Further, the collected gas was introduced through a tube into a gas chromatograph (manufactured by Shimadzu Corporation, GC9A, TCD detector, column: Molecular Sieve5A), and the hydrogen amount therein was measured. In order to define a value of the hydrogen storage rate, the hydrogen amount thus measured was divided by the mass of the hydrogen storage matter before heating.

(Test Result)

Figure 26:
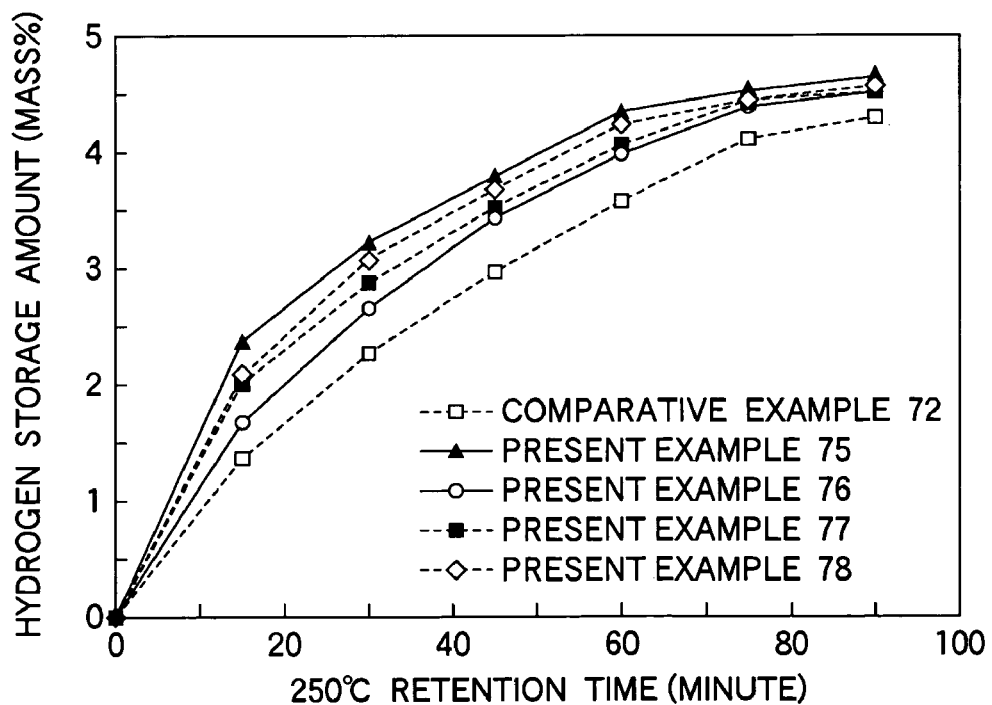
FIG. 26 is a graph showing the relationship between the 250° C. retention time and the hydrogen storage amount (cumulative value) according to present examples 75 to 78 and a comparative example 72.

FIG. 26 is a graph showing the relationship between the 250° C. retention time and the hydrogen storage rate of hydrogen storage matters. In FIG. 26, the hydrogen storage rate is shown by a cumulative value. Further, in FIG. 26, the hydrogen storage rate does not involve hydrogen released until the temperature reached 250° C., because the amount of hydrogen released from the hydrogen storage matter until 250° C. was far smaller than the amount of hydrogen released from the start of retention at 250° C. As shown in FIG. 26, it was confirmed that the hydrogen storage matters manufactured according to the present examples 75 to 78 had a hydrogen storage rate close to or more than that of the hydrogen storage matter manufactured according to the comparative example 72. It should be noted that the present examples 75 to 78 used a roller mill, a rotation type mill with inner and outer cylinders, an atrighter, an inner piece type mill, and an airflow crushing type mill, respectively, which are manufacturing apparatuses suitable for mass production, while the comparative example 72 used a planetary ball mill, which is unsuitable for mass production.

For various hydrogen storage matters described above, it is important that a hydrogen storage matter precursor (i.e., a substance to be a hydrogen storage matter by absorbing hydrogen) has high hydrogen absorption ability. This also helps to improve the cycle characteristic of a hydrogen storage matter in the hydrogen absorption and release reaction. Accordingly, an explanation will be given of a hydrogen storage matter precursor and a manufacturing method for the same.

At first, a hydrogen storage matter precursor comprising lithium imide ($Li_2NH$) will be explained, for example. As shown in the following formula (29), $Li_2NH$ reacts with hydrogen and thereby changes to a complex of lithium amide ($LiNH_2$) and lithium hydride (LiH), which is used as a hydrogen storage matter. When the complex of $LiNH_2$ and LiH thus formed is heated at a predetermined temperature, it releases hydrogen ($H_2$) and thereby changes to $Li_2NH$. In other words, the chemical reaction shown in the following formula (29) is a so-called reversible disproportionation reaction, in which a reaction reversibly proceeds between different substances. This reaction cycle can be repeated.

$$LiNH_2 + LiH \Leftrightarrow Li_2NH + H_2 \qquad (29)$$

As shown in the formula (29), $Li_2NH$ can be composed by a method of mixing $LiNH_2$ and LiH and heating the mixture at a predetermined temperature. However, a method of mixing solid materials brings about problems such that a fine complex of $LiNH_2$ and LiH is difficult to make, and the crushing and mixing time is prolonged. In light of this, according to the present invention, $Li_2NH$ is composed without utilizing a reaction between $LiNH_2$ and LiH.

As a specific manufacturing method for $Li_2NH$, there is a method of thermally decomposing $LiNH_2$, as shown in the following formula (30).

$$2LiNH_2 \rightarrow Li_2NH + NH_3 \qquad (30)$$

$Li_2NH$ composed by this method excels in uniformity of composition and organization, and thus makes it possible by a reaction between this $Li_2NH$ and hydrogen to provide a hydrogen storage matter formed of a uniform and fine complex of $LiNH_2$ and LiH.

$Li_2NH$ thus composed is preferably provided with a catalyst loaded thereon to enhance the hydrogen absorption/release function. An example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys. These metal compounds are exemplified by halide, such as chloride, oxide, nitride, and other compounds.

Such a catalyst may be loaded onto $Li_2NH$ by a method exemplified by the following methods. Specifically, in one method, the catalyst is added to an atmosphere for composing $Li_2NH$. In another method, composed $Li_2NH$ is exposed to a reagent atmosphere (liquid or vapor) of the catalyst so that the catalyst is adsorbed onto the surface of $Li_2NH$. In another method, fine powder of the catalyst is added to composed $Li_2NH$ and they are mixed. The catalyst loadage is preferably set to be 0.1 mass % or more and 20 mass % or less of $Li_2NH$. If the catalyst loadage is less than 0.1 mass %, the effect thereof cannot be obtained. On the other hand, if the catalyst loadage is more than 20 mass %, reactions between reaction substances, such as $Li_2NH$, are hindered, or the hydrogen release rate per unit mass is decreased.

The metal imide compound is not limited to $Li_2NH$, and it may be another metal imide compound, such as sodium imide ($Na_2NH$), magnesium imide ($MgNH$), or calcium imide ($CaNH$). These various metal imide compounds may be used as a single compound or a mixture of two or more compounds. A manufacturing method for $Na_2NH$ can be performed similarly to the formula (30). Further, a manufacturing method for $MgNH$ can be performed as shown in the following formula (31). A manufacturing method for $CaNH$ can be performed similarly to the formula (31).

$$Mg(NH_2)_2 \rightarrow MgNH + NH_3 \quad (31)$$

(Fabrication of Samples According to Present Examples 81 to 83)

As starting materials, $LiNH_2$ (with a purity of 95%), LiH (with a purity of 95%), titanium trichloride ($TiCl_3$), and chromium trichloride ($CrCl_3$) (all manufactured by Sigma-Aldrich Co., Ltd.) were used. These source materials were also used in comparative examples 81 to 83.

$LiNH_2$ of the starting materials was subjected to a heating process at 450° C. in vacuum to form $Li_2NH$. Then, this $Li_2NH$ was subjected to a crushing process by a planetary ball mill apparatus (manufactured by Fritsch Co., Ltd., P5) to fabricate a sample according to the present example 81. For this crushing process, 1 g of $Li_2NH$ powder and a predetermined number of high chromium steel balls were put in a mill container (with a volume of 250 $cm^3$) made of high chromium steel. Then, the interior of the mill container was vacuum-exhausted, and argon (Ar; grade: α2) was supplied into the mill container to set the pressure inside the mill container at 1 MPa. Then, the crushing process was performed at room temperature or 20° C. and at 250 rpm for 15 minutes. A sample according to the present example 82 had a composition combining $Li_2NH$ and $TiCl_3$ at a mass ratio of 100:5. A sample according to the present example 83 had a composition combining $Li_2NH$, $TiCl_3$, and $CrCl_3$ at a mass ratio of 100:4:1. The samples according to the present examples 82 and 83 were also prepared by a crushing and mixing process using a planetary ball mill apparatus, as in the present example 81. In order to minimize the influence of oxidation and moisture adsorption on each sample after the crushing and mixing process, the sample was taken out within a glove box having an Ar (with a purity of 99.995%) atmosphere, and transferred to a reaction container, which was then used for a hydrogen charge process and a hydrogen discharge experiment in an Ar atmosphere, as described later. Table 7 shows conditions for fabricating the present examples 81 to 83.

(Fabrication of Samples According to Comparative Examples 81 to 83)

$LiNH_2$ and LiH were weighed to be the same mole and to set the total amount at 1 g, and subjected to a crushing and mixing process using the same planetary ball mill apparatus as in the present examples 81 to 83. In order to form the atmosphere inside the mill container at this time, the interior of the mill container was vacuum-exhausted, and hydrogen (with a purity of 99.995%) was supplied into the mill container to set the pressure inside the mill container at 1 MPa. The comparative example 81 contained no catalyst, and used a crushing and mixing process time of 120 minutes. The comparative example 82 was prepared by combining the total amount of $LiNH_2$ and LiH with $TiCl_3$ at a mass ratio of 100:5, and used a crushing and mixing process time of 120 minutes. The comparative example 83 had the same composition as that of the comparative example 82, and used a crushing and mixing process time of 15 minutes. In order to minimize the influence of oxidation and moisture adsorption on each sample after the crushing and mixing process, the sample was taken out within a glove box having an Ar (with a purity of 99.995%) atmosphere, and transferred to a reaction container, which was then used for a hydrogen discharge experiment in an Ar atmosphere, as described later. Table 7 also shows conditions for fabricating the comparative examples 81 to 83.

TABLE 7

| | Composition (mass ratio) | | | | | Mixing Time (minute) |
|---|---|---|---|---|---|---|
| | $LiNH_2$ | $Li_2NH$ | LiH | $TiCl_3$ | $CrCl_3$ | |
| Present example 81 | 100 | — | — | — | — | 15 |
| Present example 82 | 100 | — | — | 5 | — | 15 |
| Present example 83 | 100 | — | — | 4 | 1 | 15 |
| Comparative example 81 | — | 74.28 | 25.72 | — | — | 120 |
| Comparative example 82 | — | 74.28 | 25.72 | 5 | — | 120 |
| Comparative example 83 | — | 74.28 | 25.72 | 5 | — | 15 |

(Hydrogen Charge Process of Present Examples 81 to 83)

The interior of the reaction container was vacuum-exhausted and set to have a hydrogen atmosphere at 3 MPa. The reaction container was maintained in this state at 180° C. for 8 hours to perform a hydrogen charge process on each of the present examples 81 to 83, i.e., a process of transforming it into a hydrogen storage matter of $LiNH_2$ and LiH. Then, the interior of the reaction container was further vacuum-exhausted.

(Measurement of Hydrogen Release Amount from Present Examples 81 to 83 and Comparative Examples 121 to 123)

After being vacuum-exhausted, the reaction container containing each sample of hydrogen storage matters fabricated according to the present examples 81 to 83 and comparative examples 81 to 83 was heated by an electric furnace from room temperature to 250° C. at a temperature-up rate of 5° C./minute, and retained at 250° C. for 90 minutes. During retention at 250° C., the emitted gas pressure from the reaction container was adjusted to be 20 kPa or less by a buffer container. The emitted gas was collected in a gas collection cylinder at different temperatures and 250° C. The gas thus collected was cooled to 20° C., and the emitted gas pressure was measured by a pressure gauge. Further, the collected gas was introduced through a tube into a gas chromatograph (manufactured by Shimadzu Corporation, GC9A, TCD detector, column: Molecular Sieve5A), and the hydrogen amount therein was measured. In order to define a value of the hydrogen release amount, the hydrogen amount thus measured was divided by the mass of the sample before heating.

Figure 27:
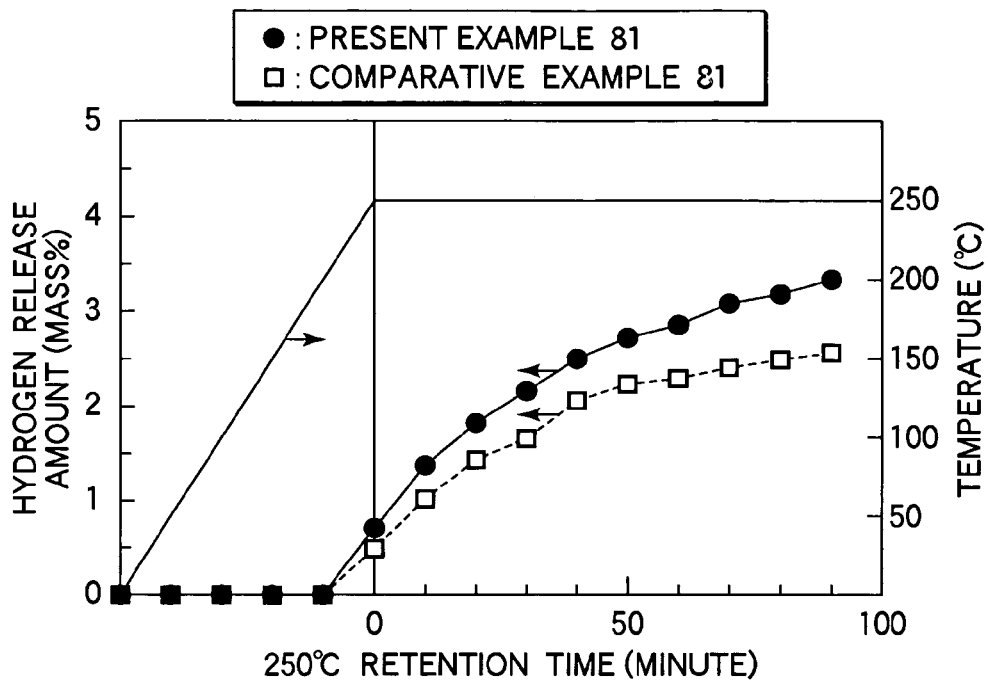
FIG. 27 is a graph showing the relationship between the temperature and hydrogen release amount according to a present example 81 and a comparative example 81.

FIGS. 27 and 28 are graphs showing the relationship of the hydrogen release amount relative to the process temperature and time. As shown in FIG. 27, making a comparison between the present example 81 and comparative example 81 both containing no catalyst, the present example 81 rendered a hydrogen release amount larger than that of the comparative example 81. Further, the present example 81 rendered a hydrogen release rise gradient steeper than that of the comparative example 81, which means that the present example 81 had a higher hydrogen release rate. Accordingly, it has been confirmed that a complex of $LiNH_2$ and LiH fabricated using $Li_2NH$ obtained by $LiNH_2$ thermal decomposition can provide a better hydrogen release characteristic, as compared to a complex of $LiNH_2$ and LiH obtained from a solid mixture. Further, the present example 81 used a crushing time of 15 minutes, while the comparative example 81 used a crushing and mixing process of 120 minutes. Accordingly, the fabrication method for the sample according to the present example 81 can shorten the crushing and mixing process time.

As shown in FIG. 28, making a comparison between the present example 82 and comparative example 82 having the same composition, the present example 82 rendered a hydrogen release amount larger than that of the comparative example 82. Further, the present example 82 rendered a hydrogen release rise quicker than that of the comparative example 82, which means that the present example 82 started hydrogen release at a lower temperature than that of the comparative example 82. Accordingly, it has been confirmed that a complex of $LiNH_2$ and LiH fabricated using $Li_2NH$ obtained by $LiNH_2$ thermal decomposition can provide a better hydrogen release characteristic. The present examples 82 and 83 rendered a better hydrogen release characteristic than the present example 81, which is thought to be due to effects of the catalyst. The present examples 82 and 83 rendered a slight difference in the hydrogen release characteristic, which is thought to be due to the difference in the catalyst composition. As shown by a comparison between the comparative example 82 and comparative example 83, in a method of crushing and mixing solid materials, the length of the crushing and mixing process time has a considerable influence on the hydrogen release characteristic.

Next, an explanation will be given of a packing container for packing (storing) a powder type hydrogen storage matter, a hydrogen discharging method for a hydrogen storage matter packed in a packing container, and a hydrogen charging method for a hydrogen storage matter precursor after hydrogen discharge. Specifically, hereinafter, "packing container" means a container having the functions not only of packing a hydrogen storage matte, but also of performing hydrogen charge and discharge for the packed hydrogen storage matter.

FIG. 29 is a sectional view schematically showing the structure of a packing container 201. The packing container 201 includes a tank 203, an inner distribution tube 204, a safety valve 205, a heater 206, an outer distribution tube 207, and a filter 208, wherein a hydrogen storage matter 202 is packed in the tank 203.

The tank 203 has a structure to accommodate the hydrogen storage matter 202, which is airtight except for an opening portion to distribute hydrogen. The tank 203 is not limited to a specific one, as long as it is formed of a material and shape to withstand a pressure of several MPa used for charging hydrogen into the hydrogen storage matter 202. However, the tank 203 is preferably formed of a material and shape to withstand a pressure of up to 10 MPa. With this arrangement, even if a pressure increase is caused by abrupt hydrogen release, the tank 203 has a sufficient strength to ensure the safety. In FIG. 29, the tank 203 has a circular cylinder shape with round edges. However, where the tank 203 is disposed in automobiles, it may have a shape conforming to, e.g., a rear seat to remove a useless space.

The tank 203 is provided with the safety valve 205, which is set to be opened at a predetermined pressure (a pressure less than the withstand pressure of the tank 203). This safety valve 205 is not necessarily indispensable, but is preferably disposed for safety. The tank 203 may be provided with an entrance mechanism, such as a port gate to be opened and closed, through which the hydrogen storage matter 202 is transferred. In this case, this mechanism may be arranged to input and output the hydrogen storage matter 202 by a cartridge to and from the tank 203.

The inner distribution tube 204 is a member that forms a flow path for charging hydrogen to the hydrogen storage matter 202, and discharging hydrogen from the hydrogen storage matter 202 to the outside of the tank 203. The inner distribution tube 204 is formed of a porous tube wall that allows hydrogen to pass therethrough and is shaped as a circular cylinder. One end of the tube is connected to the outside of the tank 203 through the opening portion of the tank 203, while the other end is closed. The inner distribution tube 204 is thus inserted into the hydrogen storage matter 202. Since the tube wall of the inner distribution tube 204 allows hydrogen to pass therethrough uniformly as a whole, the hydrogen charge and discharge can be efficiently performed.

The heating means or heater 206 is of the electrothermal type, and is disposed outside the tank 203, so that it can indirectly heat the hydrogen storage matter 202 to a temperature of 80° C. or more through the tank 203. The heater 206 may be arranged to directly heat the hydrogen storage matter 202. The heater 206 is preferably configured to heat up to 250° C. The heater 206 is connected to a power supply (not shown). Further, the power supply is provided with a control system (not shown) to which the hydrogen release amount is fed back, so that the hydrogen release amount can be controlled.

As described above, the packing container 201 has the heater 206, which can be used for heating the hydrogen storage matter 202. When the hydrogen storage matter 202 is heated, the hydrogen absorption or release function of the hydrogen storage matter 202 is activated, so that the hydrogen charge or discharge can be swiftly performed.

The outer distribution tube 207 is formed of a material that does not allow hydrogen to pass therethrough. A filter 208 is disposed in the outer distribution tube 207, and has the function of preventing a reactive gas, such as oxygen or water vapor, other than hydrogen, from flowing in. With this arrangement, it is possible to prevent the hydrogen storage matter from reacting with oxygen or water vapor and deteriorating, so as to maintain the absorption performance.

The filter 208 is made of a substance, such as a palladium alloy (Au: 5%, Ag: 20%, and Pd: 70%), which allows hydrogen to pass therethrough. The filter 208 may be disposed inside the inner distribution tube 204. Further, in place of the filter 208, a film of a substance that allows hydrogen to pass therethrough may be disposed on the inner or outer surface of the inner distribution tube 204. Alternatively, the tube wall of the inner distribution tube 204 may be made of a substance that allows hydrogen to pass therethrough. However, there is a case where such a filter 208 is not required.

The hydrogen storage matter 202 may comprise lithium amide ($LiNH_2$) and lithium hydride (LiH), or lithium imide ($Li_2NH$). In this case, the hydrogen storage matter may be prepared by the following method. Specifically, optimum amounts $LiNH_2$ and LiH are combined and subjected to mechanochemical mixing and crushing by milling within a hydrogen or inactive gas atmosphere, and an optimum amount of a catalyst material is added to the mixture. However, the preparation method thereof is not necessarily limited to this method.

Another hydrogen storage matter may be used, as long as the hydrogen absorption or release function thereof can be activated at 80° C. or more. For example, the hydrogen storage matter may comprise a metal amide and a metal amide compound, a metal hydride, an alanate family material, e.g., $NaAlH_4$, or a carbon family material, e.g., carbon nanotube, other than the lithium family materials. The hydrogen storage matter 202 may have a form of, e.g., powder, granules, or molded pieces.

The hydrogen storage matter 202 preferably contains a catalyst component to enhance the hydrogen absorption and release function. An example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

Next, an explanation will be given of a hydrogen charge and discharge operation using the packing container 201, where the hydrogen storage matter 202 comprises a material containing $LiNH_2$ and LiH as the main components. Where the hydrogen storage matter 202 comprises a material containing a lithium family storage material as the main component, the hydrogen storage matter 202 is preferably set at a temperature within a range of 100 to 250° C. to efficiently perform the hydrogen charge and discharge.

Specifically, when hydrogen is charged into the hydrogen storage matter 202, the hydrogen storage matter 202 is first heated by the heater 206 and retained at a temperature of, e.g., 120° C., with which the hydrogen storage matter 202 can sufficiently exercise the hydrogen absorption function. Hydrogen is supplied at a predetermined pressure by a compressor (not shown) connected to the outer distribution tube 207, and is further supplied through the inner distribution tube 204 and charged into the hydrogen storage matter 202. During this charge process, the hydrogen storage matter 202 causes a reaction shown in the following formula (32).

$$Li_2NH + H_2 \rightarrow LiNH_2 + LiH \quad (32)$$

On the other hand, when hydrogen is discharged from the packing container 201, the hydrogen storage matter 202 is first heated by the heater 206 and retained at a temperature of, e.g., 200° C., with which the hydrogen storage matter 202 can sufficiently exercise the hydrogen release function. With this heating, hydrogen is released from the hydrogen storage matter 202, and sent through the distribution tube 204 to the outer distribution tube 207. During this discharge process, the hydrogen storage matter 202 causes a reaction shown in the following formula (33).

$$LiNH_2 + LiH \rightarrow Li_2NH + H_2 \quad (33)$$

As described above, the packing container 201 is arranged to heat the hydrogen storage matter 202, so that both the hydrogen discharge process and charge process can be performed in a very short time. Further, as compared to hydrogen storage alloys or the like, lithium family materials have a larger hydrogen storage rate per unit weight, and thus the packing container 201 can have a larger hydrogen storage rate per unit mass. Taking advantage of these features, the packing container 201 can be utilized for a hydrogen supply apparatus disposed in fuel cell type automobiles and so forth, a buffer tank for stationary fuel cells, and a storing container system of hydrogen stations, and further can be generally applied to hydrogen storage apparatuses used in a hydrogen energy society expected to come in future.

Figure 30:
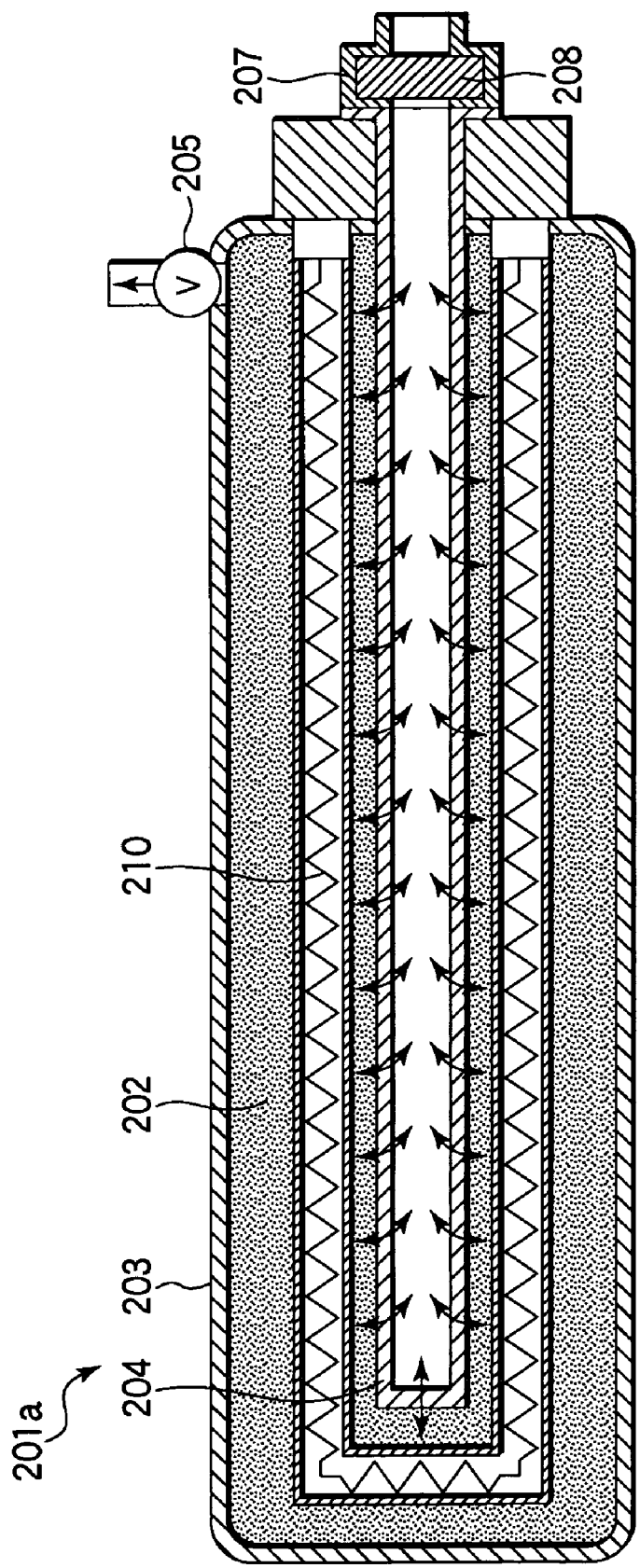
FIG. 30 is a sectional view schematically showing the structure of a second hydrogen storage matter packing container.

Next, a second packing container will be explained. FIG. 30 is a sectional view schematically showing the structure of a second packing container 201a. The packing container 201 described above has a structure in which the heater 206 is disposed outside the tank 203. In contrast, the second packing container 201a has a structure in which a heater 210 is disposed inside the tank 203, while the other parts are the same as those of the packing container 201. Accordingly, repetitive descriptions on the other parts will be omitted.

The heater 210 is of the electrothermal type, and has the same function as in the heater 206. Since the heater 210 is disposed in the tank 203, the temperature of the hydrogen storage matter 202 can be easily controlled to improve the hydrogen charge and discharge efficiency. The heater 210 may be provided with heat transmission fins around it to improve the thermal conductivity. Also in the packing container 201a, the heater 210 is connected to a power supply (not shown). Further, the power supply is provided with a control system (not shown) to which the hydrogen release amount is fed back, so that the hydrogen release amount can be controlled.

Figure 31:
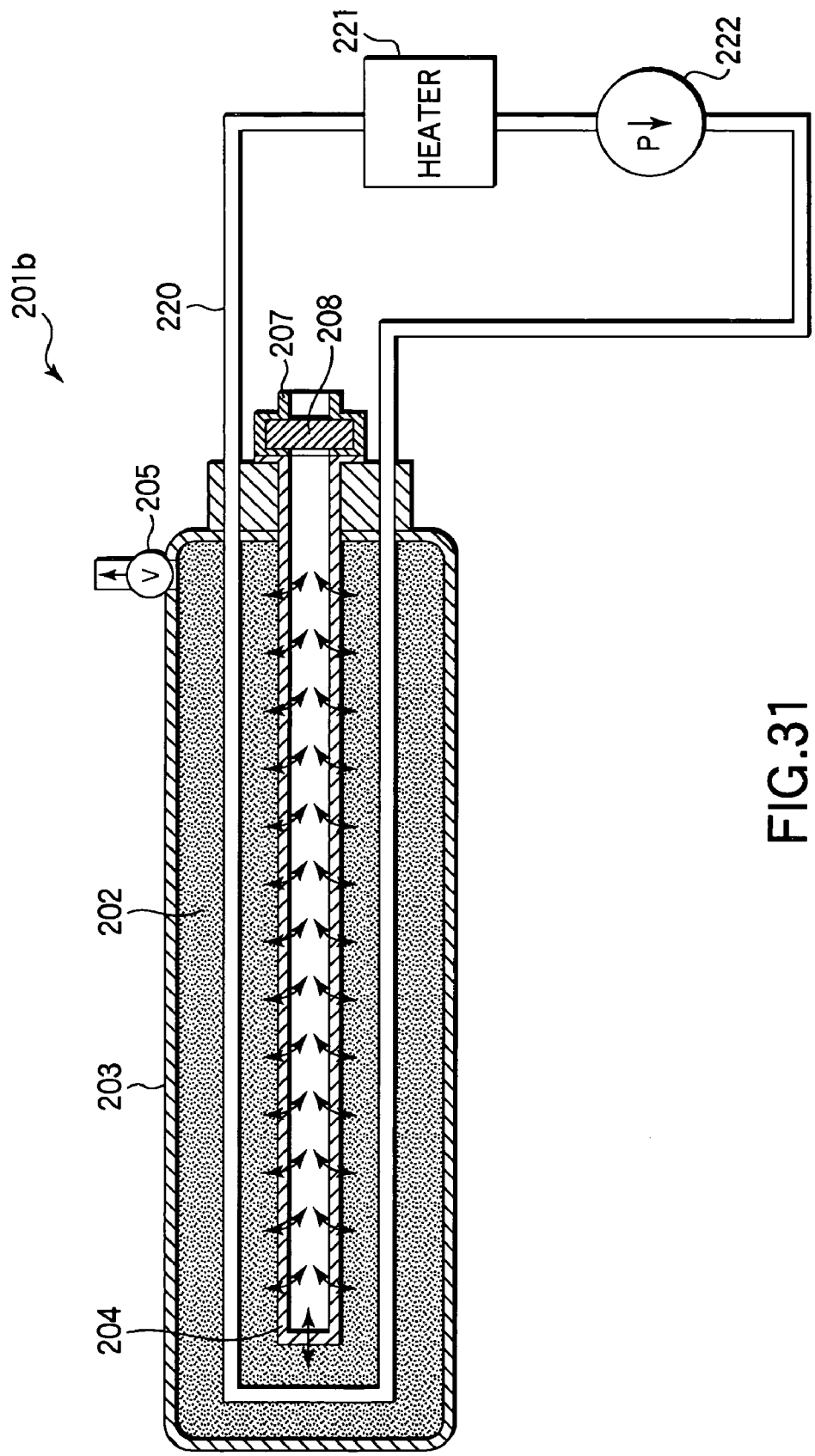
FIG. 31 is a sectional view schematically showing the structure of a third hydrogen storage matter packing container.

Next, a third packing container will be explained. FIG. 31 is a sectional view schematically showing the structure of a third packing container 201b. The packing container 201 has a structure in which the heater 206 is disposed outside the tank 203. On the other hand, the packing container 201b has the following structure in place of the heater 206. Specifically, this structure includes a circulation pipe 220 to circulate a heat medium (not shown), having a boiling point of 100° C. or more, between the outside and inside of the tank 203. A heater 221 is disposed to heat the heat medium, and a circulation pump 222 is disposed to supply the heat medium by a pressure into the circulation pipe 220.

The heater 221 is of the electrothermal type, and is connected to a power supply (not shown) disposed as an external system. Further, the power supply is provided with a control system (not shown) to which the hydrogen release amount is fed back, so that the hydrogen release amount can be controlled. With this arrangement, the hydrogen storage matter 202 can be efficiently heated, so that the hydrogen discharge and charge process can be performed in a short time. Where this heating means is used, the heat medium is held at a temperature not more than the boiling point. The circulation pipe 220 may be provided with heat transmission fins around it to improve the thermal conductivity.

Figure 32:
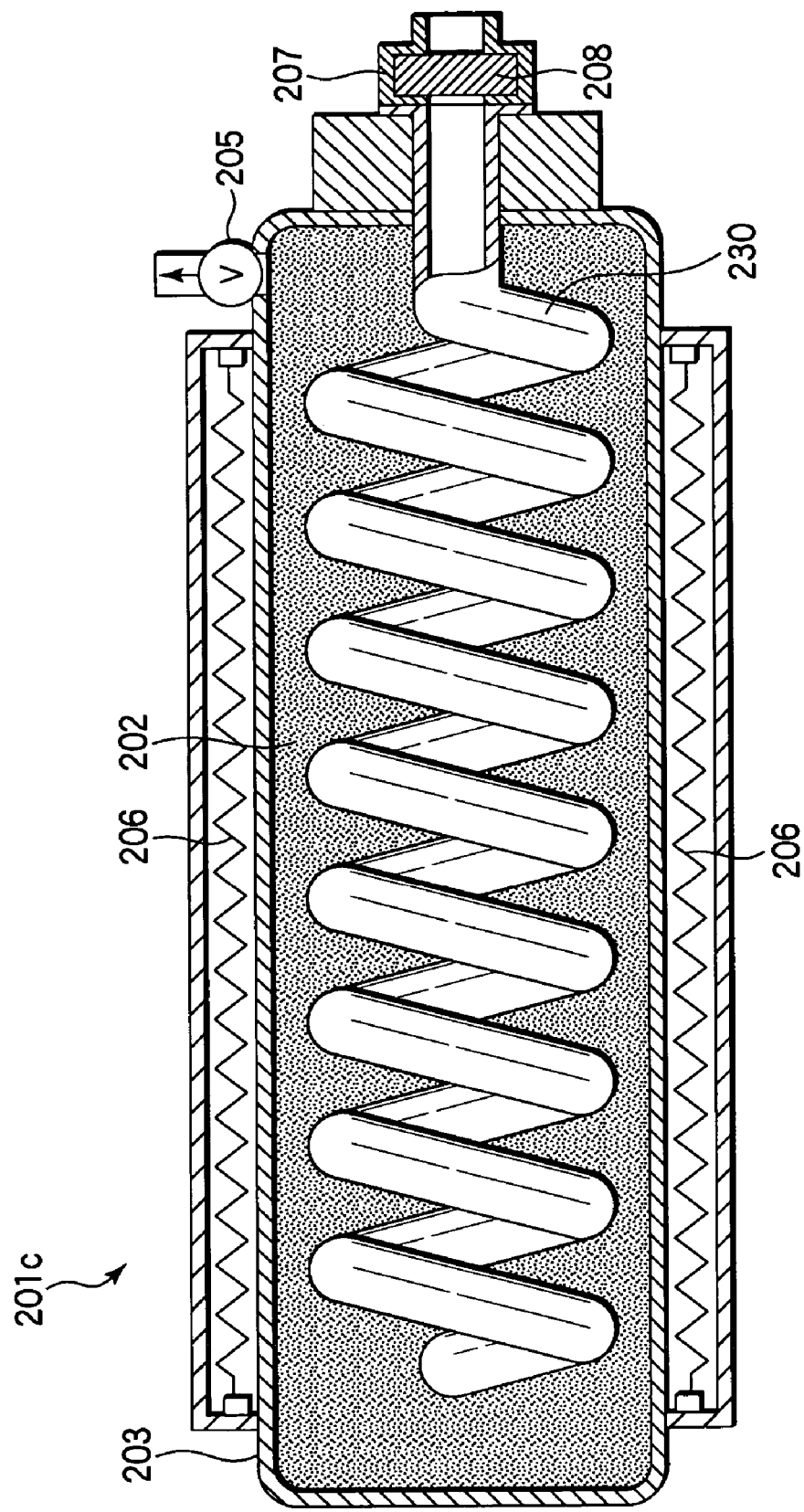
FIG. 32 is a sectional view schematically showing the structure of a fourth hydrogen storage matter packing container.

Next, a fourth packing container will be explained. FIG. 32 is a sectional view schematically showing the structure of a fourth packing container 201c. The packing container 201 has a structure which includes the inner distribution tube 204 having a circular cylinder shape. On the other hand, the packing container 201c has a structure which includes a spiral inner distribution tube 230 in place of the tube 204. In this case, the inner distribution tube 230 has a larger surface area, so the hydrogen discharge and charge process for the hydrogen storage matter can be more efficiently performed.

Figure 33:
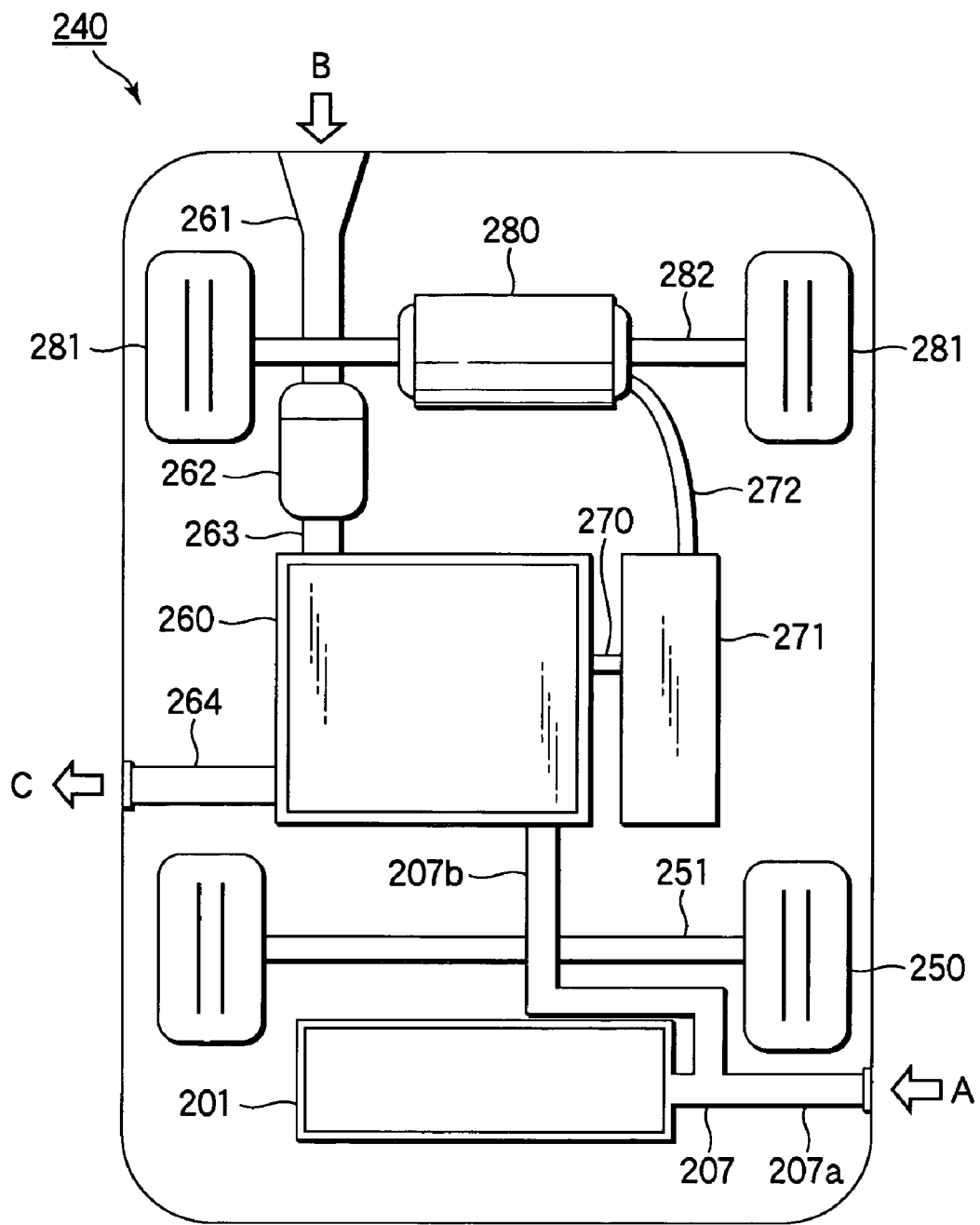
FIG. 33 is a view schematically showing the structure of a movable body equipped with a hydrogen storage matter packing container.

The packing container 201 or the like described above may be disposed in a movable body or fuel cell type automobile. In this case, it is possible to realize a light-weight fuel cell type automobile, which can drive over a long distance only with one supply. FIG. 33 is an explanation view schematically showing an automobile 240 equipped with the packing container 201.

The packing container 201 comes to have a high temperature, and thus is preferably covered with a heat insulator disposed outside. The tank 203 of the packing container 201 may be provided with an entrance mechanism to input and output the hydrogen storage matter 202. In this case, the mechanism may be arranged to perform the input and output while the packing container 201 is settled in the automobile 240. Alternatively, the mechanism may be arranged to perform the input and output at a separate place while the packing container 201 is detached from the automobile 240.

The outer distribution tube 207 of the packing container 201 is divided into an outer distribution tube 207a for hydrogen charge and an outer distribution tube 207b for hydrogen discharge. Each of the outer distribution tube 207a for hydrogen charge and the outer distribution tube 207b for hydrogen discharge is provided with a lid, valve, or the like (not shown) to close the tube. The outer distribution tube 207b for hydrogen discharge is extended beyond a rear shaft 251 of rear tires 250 and connected to a fuel cell 260.

An oxygen inhale tube 261 is connected to a compressor 262 on a side opposite to the packing container 201. A pressurized supply tube 263 is disposed to connect the fuel cell 260 and compressor 262 on a side opposite to the oxygen inhale tube 261. The fuel cell 260 has a water drain tube 264.

The fuel cell 260 is connected to a battery 271 through electrical leads 270 to transmit the generated power. The battery 271 is connected to a motor 280 through electrical leads 272. A front shaft 282 is rotatably connected to the motor 280 to transmit the power of the motor 280 to front tires 281. In FIG. 33, for the sake of simplicity, the front shaft 282 is shown as being directly attached to the motor 280, but a mechanism including pulleys and a clutch is actually disposed to transmit the power of the motor 280 to the front tires 281.

Next, an operation of the automobile 240 will be explained. When hydrogen is replenished to the automobile 240, a hydrogen station or the like having a hydrogen replenishing system is used. The packing container 201 is heated to an optimum temperature, and hydrogen is supplied by pressure through the outer distribution tube 207a in a direction shown by an arrow A in FIG. 33. At this time, the outer distribution tube 207b is closed. Consequently, hydrogen is charged into the hydrogen storage matter (or hydrogen storage matter precursor) in the packing container 201.

When the automobile 240 is driven, while the outer distribution tube 207a is closed, the hydrogen storage matter in the packing container 201 is heated to an optimum temperature by the heating means of the container 201. Hydrogen thus discharged from the packing container 201 is supplied through the outer distribution tube 207b into the fuel cell 260. On the other hand, the compressor 262 is activated so that oxygen (air) is supplied from the oxygen inhale tube 261 through the pressurized supply tube 263 into the fuel cell 260, in a direction shown by an arrow B in FIG. 33. The fuel cell 260 is thus operated to accumulate power in the battery 271. At this time, water produced by the reaction is exhausted outside through the water drain tube 264. The power accumulated in the battery 271 is used to drive the motor 280, thereby rotating the front shaft 282 and front tires 281. Consequently, the automobile 240 is driven.

Movable bodies equipped with the packing container 201 are not limited to fuel cell type automobiles, and they may be hydrogen engine automobiles. Further, movable bodies are not limited to automobiles, and they may be other vehicles, such as auto-bicycles, ships, and air planes.

Next, an explanation will be given of a gas refining apparatus for refining hydrogen discharged from and charged into the packing container 201 or the like described above. In summary, this gas refining apparatus has a structure in which a filter is disposed in a flow path for a gas. The gas comprises hydrogen gas ($H_2$) containing ammonia ($NH_3(g)$) and/or water (water vapor; $H_2O(g)$), or a mixture thereof with one or more inactive gases selected from the group consisting of helium (He), neon (Ne), argon (Ar), and nitrogen ($N_2$). The filter comprises an alkaline metal hydride and/or an alkaline earth metal hydride.

The alkaline metal hydride and alkaline earth metal hydride are preferably exemplified by lithium hydride (LiH), magnesium hydride ($MgH_2$), calcium hydride ($CaH_2$), and a mixture thereof.

For example, it is thought that, where the filter is made of LiH, $H_2O(g)$ is removed by a reaction shown in the following formula (34), and hydroxide thereby produced further causes a reaction shown in the following formula (35) and generates $H_2$. These reactions can proceed at a high reaction rate even where $H_2O(g)$ is present in a trace amount. Accordingly, this arrangement is preferable to remove a small amount of $H_2O(g)$ present as an impurity.

$$LiH + H_2O \rightarrow LiOH + H_2 \tag{34}$$

$$LiH + LiOH \rightarrow Li_2O + H_2 \tag{35}$$

When the gas passes through the filter, $NH_3(g)$ present as an impurity reacts with LiH, i.e., the filter component, as shown in the following formula (36), and produces lithium amide ($LiNH_2$) and $H_2$. Accordingly, this arrangement is effective to remove $NH_3(g)$ so as to prevent $NH_3(g)$ from flowing into and poisoning a fuel cell. This reaction can sufficiently proceed at room temperature or about 20° C., and thus can sufficiently proceed by remaining heat given from, e.g., the packing container 201 or the like. $LiNH_2$, i.e., a reaction product, can be left in the filter by replacing LiH, so that it is not exhausted from the filter. Where another alkaline metal hydride or alkaline earth metal hydride is used in place of LiH, it also provides effects of the same kind, and particularly $CaH_2$ or $MgH_2$ provides good effects.

$$LiH + NH_3(g) \rightarrow LiNH_2 + H_2 \tag{36}$$

$LiNH_2$ or the like produced by removing $NH_3(g)$ may regenerate $NH_3(g)$ by a reaction shown in the following formula (37) or the like. In order to prevent this, the filter is preferably held at a temperature of 70° C. or less. Lithium oxide ($Li_2O$) is a stable substance, and thus does not emit another gas as long as the filter is held at 70° C. or less.

$$2LiNH_2 \rightarrow Li_2NH + NH_3 \tag{37}$$

Where LiH is changed to $LiNH_2$, the reaction with $NH_3(g)$ can hardly take place, and thus the filter is preferably exchanged for new one comprising LiH at a suitable timing. An example of this method is to dispose the filter in the flow path to be exchangeable at predetermined intervals. For example, the filter can be exchanged by a rotation system, such as a revolver, or a detachable system, such as an inserting and ejecting system.

An inactive gas, such as He, has merits such that it is inactive with lithium hydride and can selectively remove $H_2O(g)$ without producing any other impurity component. Accordingly, the inert gas is effective to prevent $H_2O(g)$ from flowing into and poisoning a fuel cell. Accordingly, this gas refining apparatus can prolong the service life of the fuel cell and hydrogen storage matter.

The alkaline metal hydride or alkaline earth metal hydride packed in the filter is preferably provided with a catalyst. An example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof.

The catalyst loadage is preferably set to be 0.1 mass % or more and 20 mass % or less of the alkaline metal hydride and/or alkaline earth metal hydride. Where such a catalyst is loaded on the alkaline metal hydride or the like, absorption of $NH_3(g)$ or the like is promoted to prevent poisoning of a fuel cell.

The filter preferably comprises a column having a circular cylinder shape, and LiH, CaH$_2$, or MgH$_2$ granules having a diameter of 3 mm or less packed therein. If the granules have a diameter more than 3 mm, the surface area to come into contact with gas becomes insufficient. Where the filling ratio of LiH or the like in the column is 60% or less, it is difficult to realize sufficient refining when the gas flow velocity is high, but it is possible to realize sufficient refining when the gas flow velocity is low. Hereinafter, the filling ratio of granular solid LiH or the like in the column means an occupied volume including an excluded volume relative to the column volume.

In order to promote a reaction between H$_2$O(g) and NH$_3$(g), the filter preferably comprises one or more (carrier) selected from the group consisting of molecular sieves, activated charcoal, activated alumina, silica gel, and clay minerals having a large surface area; and LiH, CaH$_2$, MgH$_2$, or the like loaded thereon by immersion, mixing, or deposition. Particularly, of the clay minerals, halloysite family clay minerals (such as attapulgite and sepiolite) are preferably used. Each of these carriers can solely perform adsorption of H$_2$O(g) and NH$_3$(g), and thus is particularly preferable. LiH or the like may be loaded onto a carrier by the following process. Specifically, for example, LiH is dispersed in a predetermined solution, which is then immersed in the carrier and dried. Alternatively, a mixture of a carrier and granular LiH described above may be packed in the column.

The hydrogen storage matter packed in a packing container combined with the gas refining apparatus may contain a metal hydride and a metal amide compound. In this case, at first, a metal imide compound used as a hydrogen storage matter precursor is preferably composed without utilizing a reaction between a metal hydride and a metal amide. For example, a metal imide compound produced by thermal decomposition of a metal amide compound is preferably used.

The gas refining apparatus described above can not only prevent NH$_3$(g) poisoning of a fuel cell, but also solve the following problems. Specifically, in the case of hydrogen compression storage using high-pressure cylinders or cooling storage using liquid hydrogen, H$_2$O(g) may be immixed during a process or handling and poison a fuel cell. The gas refining apparatus is preferably applied to a hydrogen generation apparatus for a stationary fuel cell or a hydrogen generation apparatus for a fuel cell vehicle. The gas refining apparatus may be integrally structured with a hydrogen generation apparatus. In this case, the gas refining apparatus can provide a further improved performance.

Next, a more detailed explanation will be given of a gas refining apparatus, where the apparatus is combined with a packing container containing Li$_2$NH used as a hydrogen storage matter precursor, which may generate NH$_3$(g).

Figure 34:
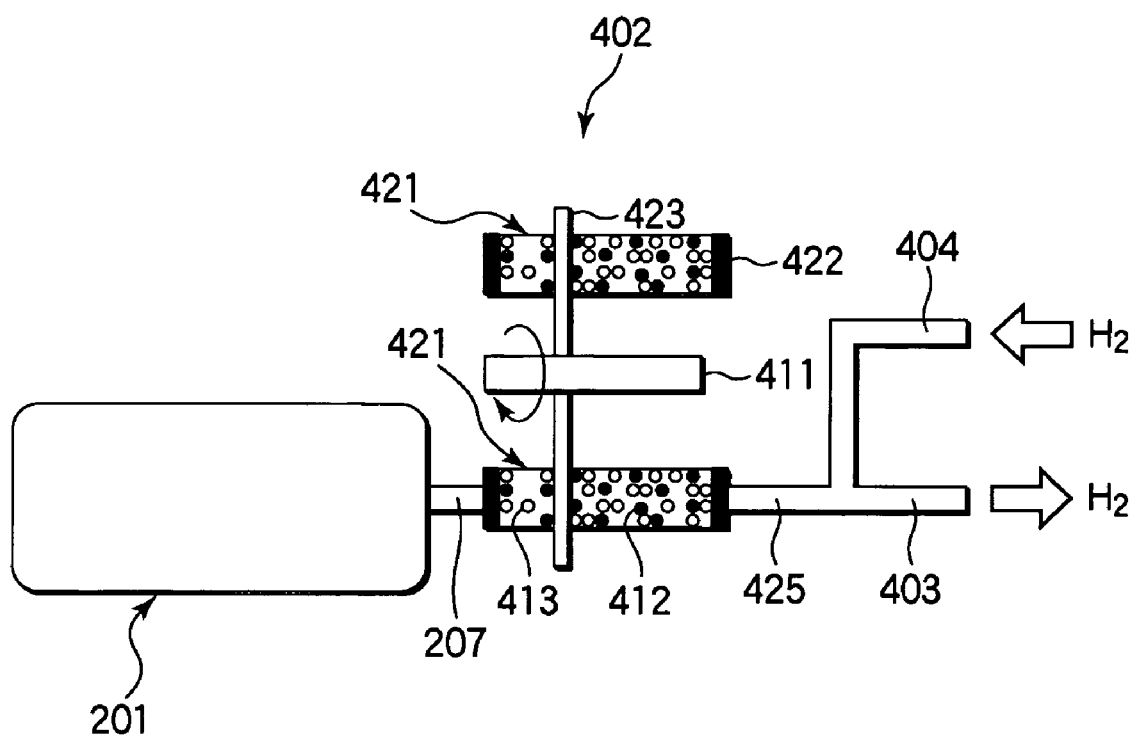
FIG. 34 is a view showing a combination arrangement of a hydrogen storage matter packing container with a gas refining apparatus.

FIG. 34 is a view showing a combination arrangement of the packing container 201 with a gas refining apparatus 402. The gas refining apparatus 402 includes a plurality of cylindrical filters 421 rotatable about a pivot shaft 411, and a connecting member 423 connecting and supporting the filters 421. For example, a predetermined number of molecular sieves 412 and LiH granules 413 are packed in the filters 421. Further, each of the filters 421 is provided with porous anti-scattering members 422 at opposite ends to prevent the molecular sieves 412 or the like contained therein from scattering.

Specifically, each of the filters 421 includes a column having a diameter of 0.6 cm and a length of 300 cm, and a mixture contained therein and comprising LiH granules 413 and molecular sieves 412 both having a grain size diameter prepared by a 30-mesh count. Such a long column is used in a constant diameter and in a coiled state.

An outer distribution tube 207 extending from the packing container 201 can be airtightly connected to one end of one of the filters 421. Further, a gas tube 425 supported by a frame or the like (not shown) and divided into a gas charge tube 404 and a gas discharge tube 403 can be airtightly connected to this one of the filters 421. The filters 421 can be used in turn by rotating the connecting member 432 about the pivot shaft 411.

Li$_2$NH packed in the packing container 201 reacts with H$_2$, as shown in the following formula (38), and changes into a complex of LiNH$_2$ and LiH serving as a hydrogen storage matter. When the complex of LiNH$_2$ and LiH thus obtained is heated at a predetermined temperature, it releases H$_2$ and changes into Li$_2$NH. In other words, the chemical reaction shown in the following formula (38) is a so-called reversible disproportionation reaction, in which a reaction reversibly proceeds between different substances. This reaction cycle can be repeated.

$$Li_2NH + H_2 \Leftrightarrow LiNH_2 + LiH \quad (38)$$

As shown in the formula (38), Li$_2$NH can be composed by a method of mixing LiNH$_2$ and LiH and heating the mixture at a predetermined temperature. However, a method of mixing solid materials brings about problems such that a fine complex of LiNH$_2$ and LiH is difficult to make, and the crushing and mixing time is prolonged. In light of this, Li$_2$NH is preferably composed without utilizing a reaction between LiNH$_2$ and LiH. As a specific manufacturing method for Li$_2$NH, there is a method of thermally decomposing LiNH$_2$, as shown in the following formula (39).

$$2LiNH_2 \rightarrow Li_2NH + NH_3(g) \quad (39)$$

Li$_2$NH composed by this method excels in uniformity of composition and organization, and thus makes it possible by a reaction between this Li$_2$NH and hydrogen to provide a hydrogen storage matter formed of a uniform and fine complex of LiNH$_2$ and LiH.

Li$_2$NH thus composed is preferably provided with a catalyst loaded thereon to enhance the hydrogen absorption/release function. An example of the catalyst is one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys. These metal compounds are exemplified by halide, such as chloride, oxide, nitride, and other compounds.

Such a catalyst may be loaded onto Li$_2$NH by a method exemplified by the following methods. Specifically, in one method, the catalyst is added to an atmosphere for composing Li$_2$NH. In another method, composed Li$_2$NH is exposed to a reagent atmosphere (liquid or vapor) of the catalyst so that the catalyst is adsorbed onto the surface of Li$_2$NH. In another method, fine powder of the catalyst is added to composed Li$_2$NH and they are mixed. The catalyst loadage is preferably set to be 0.1 mass % or more and 20 mass % or less of Li$_2$NH. If the catalyst loadage is less than 0.1 mass %, the effect thereof cannot be obtained. On the other hand, if the catalyst loadage is more than 20 mass %, reactions between reaction substances, such as Li$_2$NH, are hindered, or the hydrogen release rate per unit mass is decreased.

Li$_2$NH absorbs H$_2$ and thereby transforms into a complex of LiNH$_2$ and LiH, and, at this time, a side reaction is caused to generate NH$_3$(g). If NH$_3$(g) enters a fuel cell, it poisons the fuel cell and thereby shortens the battery life. Further, if Li$_2$NH contains moisture, Li$_2$NH reacts with H$_2$O(g) and generates NH$_3$(g), which may enter and poison a fuel cell.

Furthermore, if moisture is adsorbed on $Li_2NH$ or the complex of $LiNH_2$ and LiH, the hydrogen absorption/release function may be deteriorated.

As shown in FIG. 34, where the packing container 201 is combined with the gas refining apparatus 402, $H_2O(g)$ and $NH_3(g)$ are absorbed by the molecular sieves 412 and LiH granules packed in the filters 421. At this time, where the filters 421 are held at room temperature (for example, 20° C.), a reaction to release $H_2O(g)$ and $NH_3(g)$ is prevented from proceeding.

Where the LiH granules 413 are changed to $LiNH_2$, the reaction with $NH_3(g)$ can hardly take place. Accordingly, it is preferable to adopt an arrangement such that a filter 421 is automatically exchanged for new one comprising LiH granules 413 at predetermined intervals (for example, 180 minutes) by rotating the connecting member 423. The filters 421 may contain $CaH_2$ or $MgH_2$ in place of the LiH granules 413.

Next, an explanation will be given of assessment results about the characteristic of the filters 421, where the filters 421 had a constant structure, while different hydrogen storage matters were used to generate gas to be supplied to the filters 421 or different gas types were used.

(Hydrogen Generation Sources 1 to 3)

Table 15 shows fabrication conditions for the hydrogen generation sources 1 to 3. $LiNH_2$ (with a purity of 95%, manufactured by Sigma-Aldrich Co., Ltd.) was subjected to a heating process at 450° C. in vacuum to form $Li_2NH$. Then, this $Li_2NH$ was subjected to a crushing process by a planetary ball mill apparatus (manufactured by Fritsch Co., Ltd., P5) to fabricate a sample according to the hydrogen generation source 1. For this crushing process, 1 g of $Li_2NH$ powder and a predetermined number of high chromium steel balls were put in a mill container (with a volume of 250 ml) made of high chromium steel. Then, the interior of the mill container was vacuum-exhausted, and Ar (grade: α2) was supplied into the mill container to set the pressure inside the mill container at 1 MPa. Then, the crushing process was performed at room temperature or 20° C. and at 250 rpm for 15 minutes.

A sample according to the hydrogen generation source 2 had a composition combining $Li_2NH$ thus formed and titanium trichloride ($TiCl_3$, manufactured by Sigma-Aldrich Co., Ltd.) at a mass ratio of 100:5. A sample according to the hydrogen generation source 3 had a composition combining $Li_2NH$, $TiCl_3$, and chromium trichloride ($CrCl_3$, manufactured by Sigma-Aldrich Co., Ltd.) at a mass ratio of 100:4:1. The samples according to the hydrogen generation sources 2 and 3 were also prepared by a crushing and mixing process using a planetary ball mill apparatus, as in the hydrogen generation source 1. In order to minimize the influence of oxidation and moisture adsorption on each sample after the crushing and mixing process, the sample was taken out within a glove box having an Ar (with a purity of 99.995%) atmosphere, and transferred to a reaction container, which was then used for a hydrogen charge process and a hydrogen discharge experiment in an Ar atmosphere, as described later.

The interior of the reaction container was vacuum-exhausted and set to have a hydrogen atmosphere at 3 MPa. The reaction container was maintained in this state at 180° C. for 8 hours to perform a hydrogen charge process on each of the hydrogen generation sources 1 to 3, i.e., a process of transforming it into a hydrogen storage matter of $LiNH_2$ and LiH. Then, the interior of the reaction container was further vacuum-exhausted.

TABLE 8

| | Composition (mass ratio) | | | Mixing time (minute) |
|---|---|---|---|---|
| | | Catalyst | | |
| | $LiNH_2$ | $TiCl_3$ | $CrCl_3$ | |
| Hydrogen generation source 1 | 100 | — | — | 15 |
| Hydrogen generation source 2 | 100 | 5 | — | 15 |
| Hydrogen generation source 3 | 100 | 4 | 1 | 15 |

(Hydrogen Generation Sources 4 to 7)

In place of a hydrogen storage matter, the hydrogen generation source 4 employed a hydrogen generation apparatus comprising a cylinder in which a hydrogen mixture gas containing 10 vol % of $H_2$, 1 vol % of $NH_3(g)$, 1 vol % of $H_2O(g)$, and 88 vol % of Ar was charged at a pressure of 2 atm. Further, the hydrogen generation source 5 to 7 were prepared by replacing Ar of the hydrogen generation source 4 with the same volume of He, Ne, and $N_2$, respectively.

(Fabrication of Filter According to Present Example 91)

12 $cm^3$ of LiH (with a purity 95%, manufactured by Sigma-Aldrich Co., Ltd.) having a grain size diameter prepared by a 30-mesh count, and 5 $cm^3$ of molecular sieves having a 30-mesh diameter (manufactured by Wako Pure Chemical Industries, Ltd.) were mixed and packed into a stainless steel column (manufactured by CL Sciences Inc.) having a diameter of 6 mm and length of 300 cm to form a filter. A plurality of such filters were fabricated. The filters were held at room temperature around 20° C. under the test environment, and thus did not require temperature control. In order to maintain $H_2O(g)$ and $NH_3(g)$ removal performance, the gas refining apparatus 402 shown in FIG. 34 was used, and a filter was automatically exchanged for new one comprising LiH granules at 180-minute intervals.

(Assessment of Filter Performance)

Each of the hydrogen generation sources 1 to 7 described above was connected to a filter fabricated as described above. Gas generated by heating each of the hydrogen generation sources 1 to 3 or gas discharged from the cylinder of each of the hydrogen generation sources 4 to 7 was supplied to the filter. After the gas passed through the filter, the gas composition was analyzed to assess the filter performance.

Specifically, the reaction container containing each of the hydrogen storage matters according to the hydrogen generation sources 1 to 3 was vacuum-exhausted, and then heated by an electric furnace from room temperature to 250° C. at a temperature-up rate of 5° C./minute, and retained at 250° C. for 90 minutes. During retention at 250° C., the emitted gas pressure from the reaction container was adjusted to be 20 kPa or less by a buffer container. The emitted gas was collected in a gas collection cylinder at different temperatures and 250° C. The gas thus collected was cooled to 20° C., and the emitted gas pressure was measured by a pressure gauge. Further, the collected gas was introduced through a tube into a gas chromatograph (manufactured by Shimadzu Corporation, GC9A, TCD detector, column: Molecular Sieve5A), and the $H_2$ amount therein was measured. In order to define a value of the hydrogen release amount, the $H_2$ amount thus measured was divided by the mass of the hydrogen storage matter before heating. Further, the $NH_3(g)$ amount in the sample gas was measured by an FIA (flow injection analysis)

method. Furthermore, the $H_2O(g)$ amount in the sample gas was measured by a micro-moisture measuring unit of the Karl Fischer type.

COMPARATIVE EXAMPLE 91

The comparative example 91 was arranged to use the hydrogen generation sources 1 to 7 without providing the filter described above. In this case, the emitted gas from each of the hydrogen generation sources was directly collected, and the $H_2$ amount, $NH_3(g)$ amount, and $H_2O(g)$ amount therein were measured.

Table 9 shows the $NH_3(g)$ amount in the sample gas, in the case where the emitted gas from each of the hydrogen generation sources 1 to 7 passed through the filter (present example 91), and the case where the emitted gas did not pass through the filter (comparative example 91). As regards the $H_2O(g)$ amount, the Karl Fischer method had a detection limit of about 5 ppm. In the case of the present example 91 using the filter, the $H_2O(g)$ amount in the emitted gas from each of all the hydrogen generation sources 1 to 7 was not more than the detection limit. In the case of the comparative example 91 using no filter, the $H_2O(g)$ amount in the emitted gas from each of the hydrogen generation sources 1 to 3 was not more than the detection limit. Further, in the case of the comparative example 91 using no filter, the $H_2O(g)$ amount in the emitted gas from each of the hydrogen generation sources 4 to 7 was 5,000 ppm. As evidenced by comparison of the present example 91 with the comparative example 91, it was confirmed that, where the same hydrogen generation source was used, the present example 91 rendered a far lower $NH_3(g)$ amount than in the comparative example 91.

TABLE 9

| | | Ammonia amount |
|---|---|---|
| Present example 91 | Hydrogen generation source 1 | 20 |
| | Hydrogen generation source 2 | 2 |
| | Hydrogen generation source 3 | 1.5 |
| | Hydrogen generation source 4 | 100 |
| | Hydrogen generation source 5 | 100 |
| | Hydrogen generation source 6 | 100 |
| | Hydrogen generation source 7 | 100 |
| Comparative example 91 | Hydrogen generation source 1 | 2000 |
| | Hydrogen generation source 2 | 200 |
| | Hydrogen generation source 3 | 10000 |
| | Hydrogen generation source 4 | 10000 |
| | Hydrogen generation source 5 | 10000 |
| | Hydrogen generation source 6 | 10000 |
| | Hydrogen generation source 7 | 10000 |

PRESENT EXAMPLES 92 AND 93

In place of the molecular sieves packed in the filter according to the present example 91, activated alumina (manufactured by Sumitomo Chemical Co., Ltd.) prepared by the same mesh count, and sepiolite clay mineral (Turkish sepiolite, manufactured by TAIHEIYO CEMENT CORPORATION) prepared by the same mesh count were respectively used to fabricate filters. Using each of the filters, the emitted gas from each of the hydrogen generation sources described above was refined. As a result, it was confirmed that the $NH_3(g)$ amount obtained by the filter using activated alumina (the present example 92) was 50 ppm, and the $NH_3(g)$ amount obtained by the filter using sepiolite clay mineral (the present example 93) was about 1 ppm or less.

PRESENT EXAMPLE 94

Further, in addition to LiH packed in the filter according to the present example 91, $TiCl_3$ powder was mixed therewith in an amount corresponding to 3% of the LiH weight. The mixture thus prepared was packed in a column to fabricate a filter, which was then used to perform the same test. As a result, it was confirmed that both of the $NH_3(g)$ amount and $H_2O(g)$ amount were suppressed to be not more than the detection limit.

The embodiments described above are intended only to clarify the technical content of the present invention, and, therefore, the present invention should not be construed as being limited to the embodiments. Various modifications may be made without departing from the spirit of the present invention or the scope of the appended claims.

The present invention can be suitably applicable to fuel cells using hydrogen and oxygen as fuels for power generation, and more specifically to power sources of, e.g., automobiles, power generators for household use, vending machines, mobile phones, cordless home electric appliances including laptop personal computers, and self-supported robotic micromachines, which are present over a broad range of technical fields.

What is claimed is:

1. A hydrogen storage matter containing at least a nano-structured and organized lithium imide compound precursor complex,
    wherein the lithium imide compound precursor complex has been nano-structured and organized by mixing fine powder lithium amide with fine powder lithium hydride at a predetermined ratio to prepare a mixture as a starting material, and then processing the mixture by a predetermined complex formation processing method, and the lithium imide compound precursor complex further comprises, as a catalyst to enhance a hydrogen absorption and release function, one or more of metal simple substances selected from the group consisting of C, B, Mg, V, Ti, Cr, Mn, Fe, Co, Ni, Cu, Zn, Zr, Ru, Rh, Pd, Pt, In, La and Nd, or one or more of alloys or compounds thereof, and has been formed by subjecting a mixture of the fine powder lithium hydride, the fine powder lithium amide, and the catalyst to a mechanical milling process in which the mixture is subjected to repeated microscopic collisions with crushing medium in an atmosphere of an inert gas, hydrogen gas, or nitrogen gas, or a mixed atmosphere thereof.

2. A manufacturing method for a hydrogen storage matter, the method comprising the steps of: preparing a mixture by mixing fine powder lithium amide with fine powder lithium hydride at a predetermined ratio; and then processing the mixture by a predetermined complex formation processing method to form a nano-structured and organized lithium imide compound precursor complex,
    wherein one or more of metal simple substances selected from the group consisting of C, B, Mg, V, Ti, Cr, Mn, Fe, Co, Ni, Cu, Zn, Zr, Ru, Rh, Pd, Pt, In, La and Nd, or one or more of alloys or compounds thereof are added to the mixture as a catalyst to enhance a hydrogen absorption and release function, and said complex formation processing method comprises a mechanical milling process in which the mixture is subjected to repeated microscopic collisions with a predetermined crushing medium in an atmosphere of an inert gas, hydrogen gas, or nitrogen gas, or a mixed atmosphere thereof.

3. A manufacturing method for a hydrogen storage matter containing a metal hydride and a metal amide compound to generate hydrogen by a reaction therebetween, the method comprising the steps of:
reacting a source metal hydride and ammonia with each other to form a metal amide compound; and
mixing a metal hydride with said metal amide compound.

4. The manufacturing method according to claim 3, wherein the hydrogen storage matter comprises a mixture, complex product, or reaction product of the metal hydride and the metal amide compound, which comprises at least two metal elements.

5. The manufacturing method according to claim 4, wherein the hydrogen storage matter further comprises a catalyst to enhance a hydrogen absorption and release function.

6. The manufacturing method according to claim 5, wherein the catalyst comprises one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

7. The manufacturing method according to claim 5, wherein the catalyst is in an amount of 0.1 mass % or more and 20 mass % or less of the mixture, complex product, or reaction product of a metal hydride and a metal amide.

8. The manufacturing method according to claim 4, wherein the metal hydride is lithium hydride, and the metal amide compound contains at least one of or a mixture of magnesium amide and calcium amide.

9. The manufacturing method according to claim 4, wherein the mixture, complex product, or reaction product has been nano-structured and organized by a mechanical milling process.

10. The manufacturing method according to claim 3, wherein the hydrogen storage matter comprises a mixture, complex product, or reaction product of the metal hydride and the metal amide compound, which comprises lithium and magnesium as two metal elements.

11. The manufacturing method according to claim 10, wherein the metal hydride is lithium hydride and the metal amide compound is magnesium amide.

12. The manufacturing method according to claim 11, wherein the lithium hydride is in a ratio of 1.5 moles or more and 4 moles or less relative to 1 mole of the magnesium amide.

13. The manufacturing method according to claim 10, wherein the metal hydride is magnesium hydride and the metal amide compound is lithium amide.

14. The manufacturing method according to claim 13, wherein the magnesium hydride is in a ratio of 0.5 moles or more and 2 moles or less relative to 1 mole of the lithium amide.

15. The manufacturing method according to claim 10, wherein the hydrogen storage matter further comprises a catalyst to enhance a hydrogen absorption and release function.

16. The manufacturing method according to claim 15, wherein the catalyst comprises one or more of metals selected from the group consisting of B, C, Mn, Fe, Co, Ni, Pt, Pd, Rh, Li, Na, Mg, K, Ir, Nd, Nb, La, Ca, V, Ti, Cr, Cu, Zn, Al, Si, Ru, Os, Mo, W, Ta, Zr, In, Hf, and Ag, or one or more of compounds or alloys thereof or hydrogen storage alloys.

17. The manufacturing method according to claim 15, wherein the catalyst is in an amount of 0.1 mass % or more and 20 mass % or less of the mixture, complex product, or reaction product of a metal hydride and a metal amide.

18. The manufacturing method according to claim 3, comprising a step of further adding a predetermined metal element or alloy to the source metal hydride, which is then reacted with ammonia.

19. The manufacturing method according to claim 11, wherein the hydrogen storage matter has a specific surface area of 7.5 $m^2$/g or more determined by a BET method.

20. The manufacturing method according to claim 13, wherein the hydrogen storage matter has a specific surface area of 7.5 $m^2$/g or more determined by a BET method.

21. A hydrogen storage matter formed by hydrogenating a mixture, complex product, or reaction product of magnesium nitride and lithium imide,
wherein the hydrogen storage matter has a specific surface area of 5 $m^2$/g or more determined by a BET method.

22. The hydrogen storage matter according to claim 21, further comprising a catalyst to enhance a hydrogen absorption and release function.

* * * * *